(12) United States Patent
Su et al.

(10) Patent No.: US 9,877,092 B2
(45) Date of Patent: Jan. 23, 2018

(54) METHOD AND NODE FOR ADJUSTING LINE INTERFACE RATE

(71) Applicant: Huawei Technologies Co., Ltd., Shenzhen, Guangdong (CN)

(72) Inventors: Wei Su, Amsterdam (NL); Qiuyou Wu, Shenzhen (CN); Limin Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/880,044

(22) Filed: Oct. 9, 2015

(65) Prior Publication Data

US 2016/0037242 A1   Feb. 4, 2016

Related U.S. Application Data

(63) Continuation of application No. PCT/CN2013/074007, filed on Apr. 10, 2013.

(51) Int. Cl.
*H04Q 11/00* (2006.01)
*H04J 14/02* (2006.01)
*H04L 12/24* (2006.01)

(52) U.S. Cl.
CPC ........ *H04Q 11/0071* (2013.01); *H04J 14/025* (2013.01); *H04L 41/00* (2013.01); *H04Q 2011/0086* (2013.01)

(58) Field of Classification Search
CPC ......... H04Q 11/0071; H04Q 2011/0086; H04J 14/025; H04L 41/00; H04L 12/24
See application file for complete search history.

(56) References Cited

U.S. PATENT DOCUMENTS

2007/0292129 A1   12/2007  Yan et al.
2011/0249684 A1   10/2011  Nagai et al.
(Continued)

FOREIGN PATENT DOCUMENTS

CN   1744448 A       3/2006
CN   101547057 A     9/2009
(Continued)

OTHER PUBLICATIONS

"Spectral grids for WDM applications: DWDM frequency grid", International Telecommunications Union Recommendation ITU-T G.694.1, Feb. 2012, 13 pages.
(Continued)

*Primary Examiner* — Leslie Pascal

(57) ABSTRACT

The present invention provides a method, which including: determining, by a first node, an adjustment requirement for a line interface rate; and according to the adjustment requirement for the line interface rate, adjusting, by the first node, a transport bandwidth of an optical channel (OCh) link, adjusting the number of optical channel transport lanes (OTLs) in an optical channel transport unit (OTUCn) link, and adjusting the number of optical channel data lanes (ODLs) in an optical channel data unit (ODUCn) link, where the OTL is in one-to-one correspondence with the ODL. In embodiments of the present invention, according to an adjustment requirement for a line interface rate, a transport bandwidth of an OCh link is adjusted, the number of OTLs in an OTUCn link is adjusted, and the number of ODLs in an ODUCn link is adjusted, so that the line interface rate can be dynamically adjusted.

8 Claims, 19 Drawing Sheets

---

A fourth node determines an adjustment requirement for a line interface rate, where the fourth node is a 3R node between a source node and a sink node  — 410b

↓

According to the adjustment requirement for the line interface rate, the fourth node adjusts a transport bandwidth of an OCh link, and adjusts the number of OTLs in an OTUCn link  — 420b

(56) References Cited

U.S. PATENT DOCUMENTS

2015/0104178 A1  4/2015  Su et al.
2015/0256250 A1  9/2015  Yan et al.

FOREIGN PATENT DOCUMENTS

| CN | 101873517 A | 10/2010 |
| CN | 102820951 A | 12/2012 |
| CN | 102884808 A | 1/2013 |
| EP | 2 874 332 A1 | 5/2015 |
| WO | WO 2010/139119 A1 | 12/2010 |

OTHER PUBLICATIONS

Takuya Ohara, et al., "OTN Technology for Multi-flow Optical Transponder in Elastic 400G/1T Transmission Era", Optical Fiber Communication Conference and Exposition, Mar. 4, 2012, 3 pages.

METHOD AND NODE FOR ADJUSTING LINE INTERFACE RATE

CROSS-REFERENCE TO RELATED APPLICATIONS

This application is a continuation of International Application No. PCT/CN2013/074007, filed on Apr. 10, 2013, which is hereby incorporated by reference in its entirety.

TECHNICAL FIELD

The present invention relates to the field of communications, and in particular, to a method and a node for adjusting a line interface rate.

BACKGROUND

As a core technology of next-generation transport networks, an optical transport network (Optical transport network, OTN) has abundant operation administration and maintenance capabilities, strong tandem connection monitor capabilities, and other capabilities, and can implement flexible scheduling and management of large-capacity services. In an OTN technology, a standard frame structure is defined to map various customer services. First, an optical channel payload unit (Optical Channel Payload Unit, OPU) overhead is added into a customer service to form an optical channel payload unit k (Optical Channel Payload Unit-k, OPUk), and then the OPUk is encapsulated, and an optical channel data unit (Optical Channel Data Unit, ODU) overhead is added into the OPUk to form an optical channel data unit k (Optical Channel Data Unit-k, ODUk), and next, an optical channel transport unit (Optical Channel Transport Unit, OTU) overhead is added into the ODUk to form an optical channel transport unit k (Optical Channel Transport Unit-k, OTUk), where k=1, 2, 3, 4, which respectively correspond to four fixed rate levels, that is, 2.5 G 10 G 40 G, and 100 G.

With the massive increase of service traffic, the optical transport network faces severe challenges. To fully utilize bandwidth resources of the OTN, technologies such as a flexible optical spectrum allocation technology, a higher-order modulation technology, and a multi-carrier technology have become mandatory technologies of the OTN. However, these technologies cannot completely satisfy actual service transmission requirements. Therefore, a requirement for evolving an OTN line rate from a fixed rate to a variable rate is increasingly urgent, that is, it is expected that the line rate is no longer limited to the foregoing four fixed rate levels, and can be changed flexibly according to an actual service traffic requirement, so as to satisfy a service bearing requirement by using an optimal bandwidth. Therefore, currently, the Study Group 15/International Telecommunication Union-Telecommunication Standardization Sector (Study Group 15/International Telecommunication Union-Telecommunication Standardization Sector SG15/ITU-T) is discussing and formulating an OTUCn signal with a flexible line rate. A bit rate of the OTUCn signal is n times of a reference rate, where n is variable. To implement a flexible line rate, dynamic adjustment of a line interface rate further needs to be studied, where the line interface rate refers to a rate of an OTU signal. However, currently, there is no technology that can dynamically adjust an OTN line interface rate.

SUMMARY

Embodiments of the present invention provide a method and a node for adjusting a line interface rate, which can dynamically adjust the line interface rate.

According to a first aspect, a method for adjusting a line interface rate is provided and includes: determining, by a first node, an adjustment requirement for a line interface rate; and adjusting, by the first node and according to the adjustment requirement for the line interface rate, a transport bandwidth of an optical channel OCh link, adjusting the number of optical channel transport lanes OTLs in an optical channel transport unit OTUCn link, and adjusting the number of optical channel data lanes ODLs in an optical channel data unit ODUCn link, where the OTL is in one-to-one correspondence with the ODL.

With reference to the first aspect, in a first possible implementation manner, the adjusting a transport bandwidth of an OCh link includes: adjusting, by the first node, the number of optical signals in the OCh link; or adjusting, by the first node, a modulation format of an optical signal in the OCh link; or adjusting, by the first node, a spectrum width occupied by an optical signal in the OCh link; or adjusting, by the first node, the number of optical signals in the OCh link, a modulation format of the optical signal, and a spectrum width occupied by the optical signal.

With reference to the first possible implementation manner of the first aspect, in a second possible implementation manner, the adjusting, by the first node and according to the adjustment requirement for the line interface rate, a transport bandwidth of an OCh link, adjusting the number of OTLs in an OTUCn link, and adjusting the number of ODLs in an ODUCn link includes: in a case in which the line interface rate needs to be increased, increasing, by the first node, the transport bandwidth of the OCh link, adding j OTLs into the OTUCn link, and adding j ODLs into the ODUCn link, where j is a positive integer.

With reference to the second possible implementation manner of the first aspect, in a third possible implementation manner, the increasing, by the first node, the transport bandwidth of the OCh link includes: increasing, by the first node, the number of optical signals in the OCh link; or adjusting, by the first node, a modulation format of an optical signal in the OCh link, so as to increase the transport bandwidth of the OCh link; or increasing, by the first node, a spectrum width occupied by an optical signal in the OCh link; or increasing, by the first node, the number of optical signals in the OCh link, increasing a spectrum width occupied by the optical signal, and adjusting a modulation format of the optical signal.

With reference to the third possible implementation manner of the first aspect, in a fourth possible implementation manner, before the increasing, by the first node, the transport bandwidth of the OCh link, the method further includes: sending, by the first node, first OCh protocol signaling and first optical signal configuration information to a second node, where the first OCh protocol signaling is used for requesting increasing the transport bandwidth of the OCh link, and the first optical signal configuration information is used for indicating a configuration of the optical signal; and receiving, by the first node, second OCh protocol signaling from the second node, where the second OCh protocol signaling is used for indicating that increasing the transport bandwidth of the OCh link is agreed.

With reference to the fourth possible implementation manner of the first aspect, in a fifth possible implementation manner, the method further includes: receiving, by the first node, the first OCh protocol signaling and third optical signal configuration information from the second node, where the third optical signal configuration information is used for indicating the configuration of the optical signal; and in a case in which it is determined that the first optical signal configuration information is consistent with the third optical signal configuration information, sending, by the first node, the second OCh protocol signaling to the second node.

With reference to the fourth possible implementation manner of the first aspect or the fifth possible implementation manner of the first aspect, in a sixth possible implementation manner, the first OCh protocol signaling and the second OCh protocol signaling both include the following fields: an OCh control signaling indication, an identifier of the OTUCn link, a sequence identifier of an optical signal used for bearing the OTUCn link and an identifier of a corresponding optical subcarrier, and a response state indication, where the OCh control signaling indication is used for indicating an adjustment manner for the transport bandwidth, and the response state indication is used for indicating whether adjusting the transport bandwidth is agreed.

With reference to any implementation manner of the fourth possible implementation manner of the first aspect to the sixth possible implementation manner of the first aspect, in a seventh possible implementation manner, before the adding j OTLs into the OTUCn link, the method further includes: sending, by the first node, first OTU protocol signaling to the second node, where the first OTU protocol signaling is used for requesting adding the j OTLs into the OTUCn link, and the first OTU protocol signaling carries information of the j OTLs; receiving, by the first node, the second OTU protocol signaling from the second node, where the second OTU protocol signaling is used for indicating that adding the j OTLs into the OTUCn link is agreed; and receiving, by the first node, third OTU protocol signaling from the second node, where the third OTU protocol signaling is used for indicating adding the j OTLs into the OTUCn link.

With reference to the seventh possible implementation manner of the first aspect, in an eighth possible implementation manner of the first aspect, the method further includes: receiving, by the first node, the first OTU protocol signaling from the second node; sending, by the first node, the second OTU protocol signaling to the second node; and sending, by the first node, the third OTU protocol signaling to the second node.

With reference to the seventh possible implementation manner of the first aspect or the eighth possible implementation manner of the first aspect, in a ninth possible implementation manner, the first OTU protocol signaling, the second OTU protocol signaling, and the third OTU protocol signaling all include the following fields: an OTL control signaling indication, the identifier of the OTUCn link, sequence identifiers of the j OTLs in the OTUCn link, and an OTL adjustment response state indication, where the OTL control signaling indication is used for indicating a manner of adjusting the number of OTLs, and the OTL adjustment response state indication is used for indicating whether adjusting the number of OTLs is agreed.

With reference to any implementation manner of the second possible implementation manner to the ninth possible implementation manner of the first aspect, in a tenth possible implementation manner, before the adding j ODLs into the ODUCn link, the method further includes: sending, by the first node, first ODU protocol signaling to a third node, where the first ODU protocol signaling is used for requesting adding the j ODLs into the ODU link, and the first ODU protocol signaling carries information of the j ODLs; receiving, by the first node, the second ODU protocol signaling from the third node, where the second ODU protocol signaling is used for indicating that adding the j ODLs into the ODU link is agreed; and receiving, by the first node, third ODU protocol signaling from the third node, where the third ODU protocol signaling is used for indicating adding the j ODLs into the ODU link.

With reference to the tenth possible implementation manner of the first aspect, in an eleventh possible implementation manner, the first ODU protocol signaling, the second ODU protocol signaling, and the third ODU protocol signaling all include the following fields: an ODL control signaling indication, an identifier of the ODUCn link, sequence identifiers of the j ODLs in the ODUCn link, and an ODL adjustment response state indication, where the ODL control signaling indication is used for indicating a manner of adjusting the number of ODLs, and the ODL adjustment response state indication is used for indicating whether adjusting the number of ODLs is agreed.

With reference to any implementation manner of the second possible implementation manner of the first aspect to the eleventh possible implementation manner of the first aspect, in a twelfth possible implementation manner, after the adding j ODLs into the ODUCn link, the method further includes: increasing, according to the Hitless Adjustment of ODUflex HAO protocol, a bandwidth occupied by a lower-order ODU service on the ODUCn link.

With reference to the first possible implementation manner of the first aspect, in a thirteenth possible implementation manner, the adjusting, by the first node and according to the adjustment requirement for the line interface rate, a transport bandwidth of an OCh link, adjusting the number of OTLs in an OTUCn link, and adjusting the number of ODLs in an ODUCn link includes: in a case in which the line interface rate needs to be decreased, removing, by the first node, j ODLs from the ODUCn link, removing j OTLs from the OTUCn link, and decreasing the transport bandwidth of the OCh link, where j is a positive integer.

With reference to the thirteenth possible implementation manner of the first aspect, in a fourteenth possible implementation manner, before the removing j ODLs from the ODUCn link, the method further includes: sending, by the first node, fourth ODU protocol signaling to a third node, where the fourth ODU protocol signaling is used for requesting removing the j ODLs from the ODU link, and the fourth ODU protocol signaling carries information of the j ODLs; receiving, by the first node, the fifth ODU protocol signaling from the third node, where the fifth ODU protocol signaling is used for indicating that removing the j ODLs from the ODU link is agreed; and receiving, by the first node, sixth ODU protocol signaling from the third node, where the sixth ODU protocol signaling is used for indicating removing the j ODLs from the ODU link.

With reference to the fourteenth possible implementation manner of the first aspect, in a fifteenth possible implementation manner, the fourth ODU protocol signaling, the fifth ODU protocol signaling, and the sixth ODU protocol signaling all include the following fields: an ODL control signaling indication, an identifier of the ODUCn link, sequence identifiers of the j ODLs in the ODUCn link, and an ODL adjustment response state indication, where the ODL control signaling indication is used for indicating a manner of adjusting the number of ODLs, and the ODL adjustment response state indication is used for indicating whether adjusting the number of ODLs is agreed.

With reference to the thirteenth possible implementation manner of the first aspect to the fifteenth possible implementation manner of the first aspect, in a sixteenth possible implementation manner, before the removing j OTLs from the OTUCn link, the method further includes: sending, by the first node, fourth OTU protocol signaling to a second node, where the fourth OTU protocol signaling is used for requesting removing the j OTLs from the OTU link, and the fourth OTU protocol signaling carries information of the j OTLs; receiving, by the first node, the fifth OTU protocol signaling from the second node, where the fifth OTU protocol signaling is used for indicating that removing the j OTLs from the OTU link is agreed; and receiving, by the first node, sixth OTU protocol signaling from the second node, where the sixth OTU protocol signaling is used for indicating removing the j OTLs from the OTU link.

With reference to the sixteenth possible implementation manner of the first aspect, in a seventeenth possible implementation manner, the method further includes: receiving, by the first node, the fourth OTU protocol signaling from the second node; sending, by the first node, the fifth OTU protocol signaling to the second node; and sending, by the first node, the sixth OTU protocol signaling to the second node.

With reference to the sixteenth possible implementation manner of the first aspect or the seventeenth possible implementation manner of the first aspect, in an eighteenth possible implementation manner, the fourth OTU protocol signaling, the fifth OTU protocol signaling, and the sixth OTU protocol signaling all include the following fields: an OTL control signaling indication, an identifier of the OTUCn link, sequence identifiers of the j OTLs in the OTUCn link, and an OTL adjustment response state indication, where the OTL control signaling indication is used for indicating a manner of adjusting the number of OTLs, and the OTL adjustment response state indication is used for indicating whether adjusting the number of OTLs is agreed.

With reference to any implementation manner of the sixteenth possible implementation manner of the first aspect to the eighteenth possible implementation manner of the first aspect, in a nineteenth possible implementation manner, the decreasing the transport bandwidth of the OCh link includes: decreasing, by the first node, the number of optical signals in the OCh link; or adjusting, by the first node, a modulation format of an optical signal in the OCh link, so as to decrease the transport bandwidth of the OCh link; or decreasing, by the first node, a spectrum width occupied by an optical signal in the OCh link; or decreasing, by the first node, the number of optical signals in the OCh link, decreasing a spectrum width occupied by the optical signal, and adjusting a modulation format of the optical signal.

With reference to the nineteenth possible implementation manner of the first aspect, in a twentieth possible implementation manner, before the decreasing the transport bandwidth of the OCh link, the method further includes: sending, by the first node, third OCh protocol signaling and second optical signal configuration information to the second node, where the third OCh protocol signaling is used for requesting decreasing the transport bandwidth of the OCh link, and the second optical signal configuration information is used for indicating a configuration of the optical signal; and receiving, by the first node, fourth OCh protocol signaling from the second node, where the fourth OCh protocol signaling is used for indicating that decreasing the transport bandwidth of the OCh link is agreed.

With reference to the twentieth possible implementation manner of the first aspect, in a twenty-first possible implementation manner of the first aspect, the method further includes: receiving, by the first node, the third OCh protocol signaling and fourth optical signal configuration information from the second node, where the fourth optical signal configuration information is used for indicating the configuration of the optical signal; and in a case in which it is determined that the second optical signal configuration information is consistent with the fourth optical signal configuration information, sending, by the first node, the fourth OCh protocol signaling to the second node.

With reference to the twentieth possible implementation manner of the first aspect or the twenty-first possible implementation manner of the first aspect, in a twenty-second possible implementation manner of the first aspect, the third OCh protocol signaling and the fourth OCh protocol signaling both include the following fields: an OCh control signaling indication, the identifier of the OTUCn link, a sequence identifier of an optical signal used for bearing the OTUCn link and an identifier of a corresponding optical subcarrier, and a response state indication, where the OCh control signaling indication is used for indicating an adjustment manner for the transport bandwidth, and the response state indication is used for indicating whether adjusting the transport bandwidth is agreed.

With reference to any implementation manner of the thirteenth possible implementation manner of the first aspect to the twenty-second possible implementation manner of the first aspect, in a twenty-third possible implementation manner of the first aspect, before the removing j ODLs from the ODUCn link, the method further includes: decreasing, according to the HAO protocol, a bandwidth occupied by a lower-order ODU service on the ODUCn link.

According to a second aspect, a method for adjusting a line interface rate is provided and includes: determining, by a fourth node, an adjustment requirement for a line interface rate, where the fourth node is a 3R node between a source node and a sink node; and adjusting, by the fourth node and according to the adjustment requirement for the line interface rate, a transport bandwidth of an optical channel OCh link, and adjusting the number of optical channel transport lanes OTLs in an optical channel transport unit OTUCn link.

With reference to the second aspect, in a first possible implementation manner, the adjusting a transport bandwidth of an OCh link includes: adjusting, by the fourth node, the number of optical signals in the OCh link; or adjusting, by the fourth node, a modulation format of an optical signal in the OCh link; or adjusting, by the fourth node, a spectrum width occupied by an optical signal in the OCh link; or adjusting, by the fourth node, the number of optical signals in the OCh link, a modulation format of the optical signal, and a spectrum width occupied by the optical signal.

With reference to the first possible implementation manner of the second aspect, in a second possible implementation manner, the adjusting, by the fourth node and according to the adjustment requirement for the line interface rate, a transport bandwidth of an OCh link, and adjusting the number of OTLs in an OTUCn link includes: in a case in which the line interface rate needs to be increased, increasing, by the fourth node, the transport bandwidth of the OCh link, and adding j OTLs into the OTUCn link, where j is a positive integer.

With reference to the second possible implementation manner of the second aspect, in a third possible implementation manner, the increasing the transport bandwidth of the OCh link includes: increasing, by the fourth node, the number of optical signals in the OCh link; or adjusting, by the fourth node, a modulation format of an optical signal in the OCh link, so as to increase the transport bandwidth of the OCh link; or increasing, by the fourth node, a spectrum width occupied by an optical signal in the OCh link; or increasing, by the fourth node, the number of optical signals in the OCh link, increasing a spectrum width occupied by the optical signal, and adjusting a modulation format of the optical signal.

With reference to the third possible implementation manner of the second aspect, in a fourth possible implementation manner, before the increasing the transport bandwidth of the OCh link, the method further includes: sending, by the fourth node, first OCh protocol signaling and fifth optical signal configuration information to a fifth node, where the first OCh protocol signaling is used for requesting increasing the transport bandwidth of the OCh link, and the fifth optical signal configuration information is used for indicating a configuration of the optical signal; and receiving, by the fourth node, second OCh protocol signaling from the fifth node, where the second OCh protocol signaling is used for indicating that increasing the transport bandwidth of the OCh link is agreed.

With reference to the fourth possible implementation manner of the second aspect, in a fifth possible implementation manner, the method further includes: receiving, by the fourth node, the first OCh protocol signaling and sixth optical signal configuration information from the fifth node, where the sixth optical signal configuration information is used for indicating the configuration of the optical signal; and in a case in which it is determined that the fifth optical signal configuration information is consistent with the sixth optical signal configuration information, sending, by the fourth node, the second OCh protocol signaling to the fifth node.

With reference to the fourth possible implementation manner of the second aspect or the fifth possible implementation manner of the second aspect, in a sixth possible implementation manner, before the adding j OTLs into the OTUCn link, the method further includes: sending, by the fourth node, first OTU protocol signaling to the fifth node, where the first OTU protocol signaling is used for requesting adding the j OTLs into the OTUCn link, and the first OTU protocol signaling carries information of the j OTLs; receiving, by the fourth node, second OTU protocol signaling from the fifth node, where the second OTU protocol signaling is used for indicating that adding the j OTLs into the OTUCn link is agreed; and receiving, by the fourth node, third OTU protocol signaling from the fifth node, where the third OTU protocol signaling is used for indicating adding the j OTLs into the OTUCn link.

With reference to the sixth possible implementation manner of the second aspect, in a seventh possible implementation manner, the method further includes: receiving, by the fourth node, the first OTU protocol signaling from the fifth node; sending, by the fourth node, the second OTU protocol signaling to the fifth node; and sending, by the fourth node, the third OTU protocol signaling to the fifth node.

With reference to the first possible implementation manner of the second aspect, in an eighth possible implementation manner, the adjusting, by the fourth node and according to the adjustment requirement for the line interface rate, a transport bandwidth of an OCh link, and adjusting the number of OTLs in an OTUCn link includes: in a case in which the line interface rate needs to be decreased, removing, by the fourth node, j OTLs from the OTUCn link, and decreasing the transport bandwidth of the OCh link, where j is a positive integer.

With reference to the eighth possible implementation manner of the second aspect, in an ninth possible implementation manner, before the removing j OTLs from the OTUCn link, the method further includes: sending, by the fourth node, fourth OTU protocol signaling to the fifth node, where the fourth OTU protocol signaling is used for requesting removing the j OTLs from the OTU link, and the fourth OTU protocol signaling carries information of the j OTLs; receiving, by the fourth node, fifth OTU protocol signaling from the fifth node, where the fifth OTU protocol signaling is used for indicating that removing the j OTLs from the OTU link is agreed; and receiving, by the fourth node, sixth OTU protocol signaling from the fifth node, where the sixth OTU protocol signaling is used for indicating removing the j OTLs from the OTU link.

With reference to the ninth possible implementation manner of the second aspect, in a tenth possible implementation manner, the method further includes: receiving, by the fourth node, the fourth OTU protocol signaling from the fifth node; sending, by the fourth node, the fifth OTU protocol signaling to the fifth node; and sending, by the fourth node, the sixth OTU protocol signaling to the fifth node.

With reference to the ninth possible implementation manner of the second aspect or the tenth possible implementation manner of the second aspect, in an eleventh possible implementation manner, the decreasing the transport bandwidth of the OCh link includes: decreasing, by the fourth node, the number of optical signals in the OCh link; or adjusting, by the fourth node, a modulation format of an optical signal in the OCh link, so as to decrease the transport bandwidth of the OCh link; or decreasing, by the fourth node, a spectrum width occupied by an optical signal in the OCh link; or decreasing, by the fourth node, the number of optical signals in the OCh link, decreasing a spectrum width occupied by the optical signal, and adjusting a modulation format of the optical signal.

With reference to the eleventh possible implementation manner of the second aspect, in a twelfth possible implementation manner, before the decreasing the transport bandwidth of the OCh link, the method further includes: sending, by the fourth node, third OCh protocol signaling and seventh optical signal configuration information to the fifth node, where the third OCh protocol signaling is used for requesting decreasing the transport bandwidth of the OCh link, and the seventh optical signal configuration information is used for indicating a configuration of the optical signal; and receiving, by the fourth node, fourth OCh protocol signaling from the fifth node, where the fourth OCh protocol signaling is used for indicating that decreasing the transport bandwidth of the OCh link is agreed.

With reference to the twelfth possible implementation manner of the second aspect, in a thirteenth possible implementation manner, the method further includes: receiving, by the fourth node, the third OCh protocol signaling and eighth optical signal configuration information from the fifth node, where the eighth optical signal configuration information is used for indicating the configuration of the optical signal; and in a case in which it is determined that the seventh optical signal configuration information is consistent with the eighth optical signal configuration information, sending, by the fourth node, the fourth OCh protocol signaling to the fifth node.

According to a third aspect, a method for adjusting a line interface rate is provided and includes: determining, by a sixth node, an adjustment requirement for a line interface rate, where the sixth node is a non-3R node between a source node and a sink node; and performing, by the sixth node, routing selection on an optical channel OCh link according to the adjustment requirement for the line interface rate.

With reference to the third aspect, in a first possible implementation manner, the determining, by a sixth node, an adjustment requirement for a line interface rate includes: receiving, by the sixth node, a notification message from a network management system, where the notification message is used for indicating the adjustment requirement for the line interface rate.

With reference to the first possible implementation manner of the third aspect, in a second possible implementation manner, the notification message is further used for indicating an adjustment scheme for the OCh link, where the adjustment scheme for the OCh link includes: adjusting the number of optical signals in the OCh link; or adjusting a modulation format of an optical signal in the OCh link; or adjusting a spectrum width occupied by an optical signal in the OCh link; or adjusting the number of optical signals in the OCh link, a modulation format of the optical signal, and a spectrum width occupied by the optical signal.

According to a fourth aspect, a method for processing a link fault in an optical transport network is provided and includes: detecting, by a sink node, whether a fault occurs in m optical channel data lanes ODLs of an optical channel data unit ODUCn link; and in a case in which it is determined that the fault occurs in the m ODLs, sending, by the sink node on the m ODLs, fault notification signaling to a source node, where the fault notification signaling is used for indicating that the fault occurs in the m ODLs, so that the source node performs fault processing on the m ODLs according to the fault notification signaling.

With reference to the fourth aspect, in a first possible implementation manner, the detecting, by a sink node, whether a fault occurs in m ODLs of an ODUCn link includes: detecting, by the sink node, whether forward fault alarm signaling exists in the m ODLs, where the forward fault alarm signaling is used for indicating that the fault occurs in the m ODLs.

With reference to the first possible implementation manner of the fourth aspect, in a second possible implementation manner, the forward fault alarm signaling is generated by a 3R node between the sink node and the source node.

With reference to the fourth aspect, in a third possible implementation manner, the detecting, by a sink node, whether a fault occurs in m ODLs of an ODUCn link includes: detecting, by the sink node, whether a signal loss alarm or a frame loss alarm exists in m OTLs of an optical channel transport unit OTUCn link, where the m OTLs are in one-to-one correspondence with the m ODLs.

With reference to the fourth aspect or any implementation manner of the first possible implementation manner to the third possible implementation manner of the fourth aspect, in a fourth possible implementation manner, the method further includes: in a case in which it is determined that the fault in the m ODLs disappears, sending, by the sink node on the m ODLs, fault disappearance signaling to the source node, where the fault disappearance signaling is used for indicating that the fault in the m ODLs disappears, so that the source node performs recovery processing on the m ODLs.

According to a fifth aspect, a method for processing a link fault in an optical transport network is provided and includes: receiving, by a source node on m optical channel data lanes ODLs in an optical channel data unit ODUCn link, fault notification signaling sent by a sink node, where the fault notification signaling is used for indicating that a fault occurs in the m ODLs; and performing, by the source node, fault processing on the m ODLs according to the fault notification signaling.

With reference to the fifth aspect, in a first possible implementation manner, the performing, by the source node, fault processing on the m ODLs according to the fault notification signaling includes: according to the fault notification signaling, stopping, by the source node, sending data on the m ODLs, and releasing the m ODLs.

With reference to the first possible implementation manner of the fifth aspect, in a second possible implementation manner, the method further includes: sending, by the source node, idle release signaling to a downstream direction, where the idle release signaling is used for indicating that the m ODLs are released.

With reference to the fifth aspect or the first possible implementation manner or the second possible implementation manner of the fifth aspect, in a third possible implementation manner, the method further includes: receiving, by the source node, fault disappearance signaling from the sink node, where the fault disappearance signaling is used for indicating that the fault in the m ODLs disappears; and performing, by the source node, recovery processing on the m ODLs according to the fault disappearance signaling.

According to a sixth aspect, a method for obtaining operation administration and maintenance overhead information in an optical transport network is provided and includes: detecting whether a fault occurs in a first optical channel transport lane OTL of an optical channel transport unit OTUCn link, where the first OTL is used for bearing operation administration and maintenance OAM overhead information; in a case in which it is determined that the fault occurs in the first OTL, activating a second OTL in the OTUCn link, and deactivating the first OTL, where the second OTL is used for bearing a backup of the OAM overhead information; and obtaining the OAM overhead information from the second OTL.

With reference to the sixth aspect, in a first possible implementation manner, the method further includes: sending, on the first OTL, backward fault alarm information to an upstream direction, where the backward fault alarm information is used for indicating that the fault occurs in the first OTL and the second OTL is activated.

With reference to the first possible implementation manner of the sixth aspect, in a second possible implementation manner, the method further includes: in a case in which it is determined that the fault in the first OTL disappears, deactivating the second OTL, and activating the first OTL; and obtaining the OAM overhead information from the first OTL.

With reference to the second possible implementation manner of the sixth aspect, in a third possible implementation manner, the method further includes: stopping sending, on the first OTL, the backward fault alarm information to the upstream direction.

According to a seventh aspect, a node is provided and includes: a determining unit, configured to determine an adjustment requirement for a line interface rate; and an adjusting unit, configured to: according to the adjustment requirement for the line interface rate and determined by the determining unit, adjust a transport bandwidth of an optical channel OCh link, adjust the number of optical channel transport lanes OTLs in an optical channel transport unit OTUCn link, and adjust the number of optical channel data lanes ODLs in an optical channel data unit ODUCn link, where the OTL is in one-to-one correspondence with the ODL.

With reference to the seventh aspect, in a first possible implementation manner, the adjusting unit is specifically configured to: adjust the number of optical signals in the OCh link; or adjust a modulation format of an optical signal in the OCh link; or adjust a spectrum width occupied by an optical signal in the OCh link; or adjust the number of optical signals in the OCh link, a modulation format of the optical signal, and a spectrum width occupied by the optical signal.

With reference to the first possible implementation manner of the seventh aspect, in a second possible implementation manner, the adjusting unit is specifically configured to: in a case in which the determining unit determines that the line interface rate needs to be increased, increase the transport bandwidth of the OCh link, add j OTLs into the OTUCn link, and add j ODLs into the ODUCn link, where j is a positive integer.

With reference to the second possible implementation manner of the seventh aspect, in a third possible implementation manner, the adjusting unit is specifically configured to: increase the number of optical signals in the OCh link; or adjust a modulation format of an optical signal in the OCh link, so as to increase the transport bandwidth of the OCh link; or increase a spectrum width occupied by an optical signal in the OCh link; or increase the number of optical signals in the OCh link, increase a spectrum width occupied by the optical signal, and adjust a modulation format of the optical signal.

With reference to the third possible implementation manner of the seventh aspect, in a fourth possible implementation manner, the node further includes: a first sending unit, configured to: before the adjusting unit increases the transport bandwidth of the OCh link, send first OCh protocol signaling and first optical signal configuration information to a second node, where the first OCh protocol signaling is used for requesting increasing the transport bandwidth of the OCh link, and the first optical signal configuration information is used for indicating a configuration of the optical signal; and a first receiving unit, configured to receive second OCh protocol signaling from the second node, where the second OCh protocol signaling is used for indicating that increasing the transport bandwidth of the OCh link is agreed.

With reference to the fourth possible implementation manner of the seventh aspect, in a fifth possible implementation manner, the first receiving unit is further configured to receive the first OCh protocol signaling and third optical signal configuration information from the second node, where the third optical signal configuration information is used for indicating the configuration of the optical signal; and the first sending unit is further configured to: in a case in which it is determined that the first optical signal configuration information is consistent with the third optical signal configuration information, send the second OCh protocol signaling to the second node.

With reference to the fourth possible implementation manner or the fifth possible implementation manner of the seventh aspect, in a sixth possible implementation manner, the first sending unit is further configured to: before the adjusting unit adds the j OTLs into the OTUCn link, send first OTU protocol signaling to the second node, where the first OTU protocol signaling is used for requesting adding the j OTLs into the OTUCn link, and the first OTU protocol signaling carries information of the j OTLs; the first receiving unit is further configured to receive the second OTU protocol signaling from the second node, where the second OTU protocol signaling is used for indicating that adding the j OTLs into the OTUCn link is agreed; and the first receiving unit is further configured to receive third OTU protocol signaling from the second node, where the third OTU protocol signaling is used for indicating adding the j OTLs into the OTUCn link.

With reference to the sixth possible implementation manner of the seventh aspect, in a seventh possible implementation manner, the first receiving unit is further configured to receive the first OTU protocol signaling from the second node; the first sending unit is further configured to send the second OTU protocol signaling to the second node; and the first sending unit is further configured to send the third OTU protocol signaling to the second node.

With reference to any implementation manner of the second possible implementation manner to the seventh possible implementation manner of the seventh aspect, in an eighth possible implementation manner, the node further includes: a second sending unit, configured to: before the adjusting unit adds the j ODLs into the ODUCn link, send first ODU protocol signaling to a third node, where the first ODU protocol signaling is used for requesting adding the j ODLs into the ODU link, and the first ODU protocol signaling carries information of the j ODLs; and a second receiving unit, configured to receive the second ODU protocol signaling from the third node, where the second ODU protocol signaling is used for indicating that adding the j ODLs into the ODU link is agreed, where the second receiving unit is further configured to receive third ODU protocol signaling from the third node, where the third ODU protocol signaling is used for indicating adding the j ODLs into the ODU link.

With reference to any implementation manner of the second possible implementation manner to the eighth possible implementation manner of the seventh aspect, in a ninth possible implementation manner, the adjusting unit is further configured to: after adding the j ODLs into the ODUCn link, increase, according to the Hitless Adjustment of ODUflex HAO protocol, a bandwidth occupied by a lower-order ODU service on the ODUCn link.

With reference to the first possible implementation manner of the seventh aspect, in a tenth possible implementation manner, the adjusting unit is specifically configured to: in a case in which the determining unit determines that the line interface rate needs to be decreased, remove j ODLs from the ODUCn link, remove j OTLs from the OTUCn link, and decrease the transport bandwidth of the OCh link, where j is a positive integer.

With reference to the tenth possible implementation manner of the seventh aspect, in an eleventh possible implementation manner, the node further includes: a second sending unit, configured to: before the adjusting unit removes the j ODLs from the ODUCn link, send fourth ODU protocol signaling to a third node, where the fourth ODU protocol signaling is used for requesting removing the j ODLs from the ODU link, and the fourth ODU protocol signaling carries information of the j ODLs; and a second receiving unit, configured to receive the fifth ODU protocol signaling from the third node, where the fifth ODU protocol signaling is used for indicating that removing the j ODLs from the ODU link is agreed, where the second receiving unit is further configured to receive sixth ODU protocol signaling from the third node, where the sixth ODU protocol signaling is used for indicating removing the j ODLs from the ODU link.

With reference to the tenth possible implementation manner or the eleventh possible implementation manner of the seventh aspect, in a twelfth possible implementation manner, the node further includes: a first sending unit, configured to: before the adjusting unit removes the j OTLs from the OTUCn link, send fourth OTU protocol signaling to a second node, where the fourth OTU protocol signaling is used for requesting removing the j OTLs from the OTU link, and the fourth OTU protocol signaling carries information of the j OTLs; and a first receiving unit, configured to receive the fifth OTU protocol signaling from the second node, where the fifth OTU protocol signaling is used for indicating that removing the j OTLs from the OTU link is agreed, where the first receiving unit is further configured to receive sixth OTU protocol signaling from the second node, where the sixth OTU protocol signaling is used for indicating removing the j OTLs from the OTU link.

With reference to the twelfth possible implementation manner of the seventh aspect, in a thirteenth possible implementation manner, the first receiving unit is further configured to receive the fourth OTU protocol signaling from the second node; the first sending unit is further configured to send the fifth OTU protocol signaling to the second node; and the first sending unit is further configured to send the sixth OTU protocol signaling to the second node.

With reference to the twelfth possible implementation manner or the thirteenth possible implementation manner of the seventh aspect, in a fourteenth possible implementation manner, the adjusting unit is specifically configured to: decrease the number of optical signals in the OCh link; or adjust a modulation format of an optical signal in the OCh link, so as to decrease the transport bandwidth of the OCh link; or decrease a spectrum width occupied by an optical signal in the OCh link; or decrease the number of optical signals in the OCh link, decrease a spectrum width occupied by the optical signal, and adjust a modulation format of the optical signal.

With reference to the fourteenth possible implementation manner of the seventh aspect, in a fifteenth possible implementation manner, the first sending unit is further configured to: before the adjusting unit decreases the transport bandwidth of the OCh link, send third OCh protocol signaling and second optical signal configuration information to the second node, where the third OCh protocol signaling is used for requesting decreasing the transport bandwidth of the OCh link, and the second optical signal configuration information is used for indicating a configuration of the optical signal; and the first receiving unit is further configured to receive fourth OCh protocol signaling from the second node, where the fourth OCh protocol signaling is used for indicating that decreasing the transport bandwidth of the OCh link is agreed.

With reference to the fifteenth possible implementation manner of the seventh aspect, in a sixteenth possible implementation manner, the first receiving unit is further configured to receive the third OCh protocol signaling and fourth optical signal configuration information from the second node, where the fourth optical signal configuration information is used for indicating the configuration of the optical signal; and the first sending unit is further configured to: in a case in which it is determined that the second optical signal configuration information is consistent with the fourth optical signal configuration information, send the fourth OCh protocol signaling to the second node.

With reference to any implementation manner of the tenth possible implementation manner to the sixteenth possible implementation manner of the seventh aspect, in a seventeenth possible implementation manner, the adjusting unit is further configured to: before removing the j ODLs from the ODUCn link, decrease, according to the HAO protocol, a bandwidth occupied by a lower-order ODU service on the ODUCn link.

According to an eighth aspect, a node is provided, where the node is a 3R node between a source node and a sink node and includes: a determining unit, configured to determine an adjustment requirement for a line interface rate; and an adjusting unit, configured to: according to the adjustment requirement for the line interface rate, adjust a transport bandwidth of an optical channel OCh link, and adjust the number of optical channel transport lanes OTLs in an optical channel transport unit OTUCn link.

With reference to the eighth aspect, in a first possible implementation manner, the adjusting unit is specifically configured to: adjust the number of optical signals in the OCh link; or adjust a modulation format of an optical signal in the OCh link; or adjust a spectrum width occupied by an optical signal in the OCh link; or adjust the number of optical signals in the OCh link, a modulation format of the optical signal, and a spectrum width occupied by the optical signal.

With reference to the first possible implementation manner of the eighth aspect, in a second possible implementation manner, the adjusting unit is specifically configured to: in a case in which the determining unit determines that the line interface rate needs to be increased, increase the transport bandwidth of the OCh link, and add j OTLs into the OTUCn link, where j is a positive integer.

With reference to the second possible implementation manner of the eighth aspect, in a third possible implementation manner, the adjusting unit is specifically configured to: increase the number of optical signals in the OCh link; or adjust a modulation format of an optical signal in the OCh link, so as to increase the transport bandwidth of the OCh link; or increase a spectrum width occupied by an optical signal in the OCh link; or increase the number of optical signals in the OCh link, increase a spectrum width occupied by the optical signal, and adjust a modulation format of the optical signal.

With reference to the third possible implementation manner of the eighth aspect, in a fourth possible implementation manner, the node further includes: a sending unit, configured to: before the adjusting unit increases the transport bandwidth of the OCh link, send first OCh protocol signaling and fifth optical signal configuration information to a fifth node, where the first OCh protocol signaling is used for requesting increasing the transport bandwidth of the OCh link, and the fifth optical signal configuration information is used for indicating a configuration of the optical signal; and a receiving unit, configured to receive second OCh protocol signaling from the fifth node, where the second OCh protocol signaling is used for indicating that increasing the transport bandwidth of the OCh link is agreed.

With reference to the fourth possible implementation manner of the eighth aspect, in a fifth possible implementation manner, the receiving unit is further configured to receive the first OCh protocol signaling and sixth optical signal configuration information from the fifth node, where the sixth optical signal configuration information is used for indicating the configuration of the optical signal; and the sending unit is further configured to: in a case in which it is determined that the fifth optical signal configuration information is consistent with the sixth optical signal configuration information, send the second OCh protocol signaling to the fifth node.

With reference to the fourth possible implementation manner or the fifth possible implementation manner of the eighth aspect, in a sixth possible implementation manner, the sending unit is further configured to: before the adjusting unit adds the j OTLs into the OTUCn link, send first OTU protocol signaling to the fifth node, where the first OTU protocol signaling is used for requesting adding the j OTLs into the OTUCn link, and the first OTU protocol signaling carries information of the j OTLs; the receiving unit is further configured to receive second OTU protocol signaling from the fifth node, where the second OTU protocol signaling is used for indicating that adding the j OTLs into the OTUCn link is agreed; and the receiving unit is further configured to receive third OTU protocol signaling from the fifth node, where the third OTU protocol signaling is used for indicating adding the j OTLs into the OTUCn link.

With reference to the sixth possible implementation manner of the eighth aspect, in a seventh possible implementation manner, the receiving unit is further configured to receive the first OTU protocol signaling from the fifth node; the sending unit is further configured to send the second OTU protocol signaling to the fifth node; and the sending unit is further configured to send the third OTU protocol signaling to the fifth node.

With reference to the first possible implementation manner of the eighth aspect, in an eighth possible implementation manner, the adjusting unit is specifically configured to: in a case in which the determining unit determines that the line interface rate needs to be decreased, remove j OTLs from the OTUCn link, and decrease the transport bandwidth of the OCh link, where j is a positive integer.

With reference to the eighth possible implementation manner of the eighth aspect, in a ninth possible implementation manner, the node further includes: a sending unit, configured to: before the adjusting unit removes the j OTLs from the OTUCn link, send fourth OTU protocol signaling to the fifth node, where the fourth OTU protocol signaling is used for requesting removing the j OTLs from the OTU link, and the fourth OTU protocol signaling carries information of the j OTLs; and a receiving unit, configured to receive fifth OTU protocol signaling from the fifth node, where the fifth OTU protocol signaling is used for indicating that removing the j OTLs from the OTU link is agreed, where the receiving unit is further configured to receive sixth OTU protocol signaling from the fifth node, where the sixth OTU protocol signaling is used for indicating removing the j OTLs from the OTU link.

With reference to the ninth possible implementation manner of the eighth aspect, in a tenth possible implementation manner, the receiving unit is further configured to receive the fourth OTU protocol signaling from the fifth node; the sending unit is further configured to send the fifth OTU protocol signaling to the fifth node; and the sending unit is further configured to send the sixth OTU protocol signaling to the fifth node.

With reference to the ninth possible implementation manner or the tenth possible implementation manner of the eighth aspect, in an eleventh possible implementation manner, the adjusting unit is specifically configured to: decrease the number of optical signals in the OCh link; or adjust a modulation format of an optical signal in the OCh link, so as to decrease the transport bandwidth of the OCh link; or decrease a spectrum width occupied by an optical signal in the OCh link; or decrease the number of optical signals in the OCh link, decrease a spectrum width occupied by the optical signal, and adjust a modulation format of the optical signal.

With reference to the eleventh possible implementation manner of the eighth aspect, in a twelfth possible implementation manner, the sending unit is further configured to: before the adjusting unit decreases the transport bandwidth of the OCh link, send third OCh protocol signaling and seventh optical signal configuration information to the fifth node, where the third OCh protocol signaling is used for requesting decreasing the transport bandwidth of the OCh link, and the seventh optical signal configuration information is used for indicating a configuration of the optical signal; and the receiving unit is configured to receive fourth OCh protocol signaling from the fifth node, where the fourth OCh protocol signaling is used for indicating that decreasing the transport bandwidth of the OCh link is agreed.

With reference to the twelfth possible implementation manner of the eighth aspect, in a thirteenth possible implementation manner, the receiving unit is further configured to receive the third OCh protocol signaling and eighth optical signal configuration information from the fifth node, where the eighth optical signal configuration information is used for indicating the configuration of the optical signal; and the sending unit is further configured to: in a case in which it is determined that the seventh optical signal configuration information is consistent with the eighth optical signal configuration information, send the fourth OCh protocol signaling to the fifth node.

According to a ninth aspect, a node is provided, where the node is a non-3R node between a source node and a sink node and includes: a determining unit, configured to determine an adjustment requirement for a line interface rate; and a selection unit, configured to perform routing selection on an optical channel OCh link according to the adjustment requirement for the line interface rate.

With reference to the ninth aspect, in a first possible implementation manner, the node further includes: a receiving unit, where the determining unit is specifically configured to receive a notification message from a network management system by using the receiving unit, where the notification message is used for indicating the adjustment requirement for the line interface rate.

With reference to the first possible implementation manner of the ninth aspect, in a second possible implementation manner, the notification message is further used for indicating an adjustment scheme for the OCh link, where the adjustment scheme for the OCh link includes: adjusting the number of optical signals in the OCh link; or adjusting a modulation format of an optical signal in the OCh link; or adjusting a spectrum width occupied by an optical signal in the OCh link; or adjusting the number of optical signals in the OCh link, a modulation format of the optical signal, and a spectrum width occupied by the optical signal.

According to a tenth aspect, a node is provided and includes: a detecting unit, configured to detect whether a fault occurs in m optical channel data lanes ODLs of an optical channel data unit ODUCn link; and a sending unit, configured to: in a case in which the detecting unit determines that the fault occurs in the m ODLs, send, on the m ODLs, fault notification signaling to a source node, where the fault notification signaling is used for indicating that the fault occurs in the m ODLs, so that the source node performs fault processing on the m ODLs according to the fault notification signaling.

With reference to the tenth aspect, in a first possible implementation manner, the detecting unit is specifically configured to detect whether forward fault alarm signaling exists in the m ODLs, where the forward fault alarm signaling is used for indicating that the fault occurs in the m ODLs.

With reference to the tenth aspect, in a second possible implementation manner, the detecting unit is specifically configured to detect whether a signal loss alarm or a frame loss alarm exists in the m OTLs of the optical channel transport unit OTUCn link, where the m OTLs are in one-to-one correspondence with the m ODLs.

With reference to the tenth aspect or the first possible implementation manner or the second possible implementation manner of the tenth aspect, in a third possible implementation manner, the sending unit is further configured to: in a case in which the detecting unit determines that the fault in the m ODLs disappears, send, on the m ODLs, fault disappearance signaling to the source node, where the fault disappearance signaling is used for indicating that the fault in the m ODLs disappears, so that the source node performs recovery processing on the m ODLs.

According to an eleventh aspect, a node is provided and includes: a receiving unit, configured to receive, on m optical channel data lanes ODLs in an optical channel data unit ODUCn link, fault notification signaling sent by a sink node, where the fault notification signaling is used for indicating that a fault occurs in the m ODLs; and a processing unit, configured to perform fault processing on the m ODLs according to the fault notification signaling.

With reference to the eleventh aspect, in a first possible implementation manner, the processing unit is specifically configured to: according to the fault notification signaling, stop sending data on the m ODLs, and release the m ODLs.

With reference to the first possible implementation manner of the eleventh aspect, in a second possible implementation manner, the node further includes: a sending unit, configured to send idle release signaling to a downstream direction, where the idle release signaling is used for indicating that the m ODLs are released.

With reference to the eleventh aspect or the first possible implementation manner or the second possible implementation manner of the eleventh aspect, in a third possible implementation manner, the receiving unit is further configured to receive fault disappearance signaling from the sink node, where the fault disappearance signaling is used for indicating that the fault in the m ODLs disappears; and the processing unit is further configured to perform recovery processing on the m ODLs according to the fault disappearance signaling.

According to a twelfth aspect, a node is provided and includes: a detecting unit, configured to detect whether a fault occurs in a first optical channel transport lane OTL of an optical channel transport unit OTUCn link, where the first OTL is used for bearing operation administration and maintenance OAM overhead information; a processing unit, configured to: in a case in which the detecting unit determines that the fault occurs in the first OTL, activate a second OTL in the OTUCn link, and deactivate the first OTL, where the second OTL is used for bearing a backup of the OAM overhead information; and an obtaining unit, configured to obtain the OAM overhead information from the second OTL.

With reference to the twelfth aspect, in a first possible implementation manner, the node further includes: a sending unit, configured to send, on the first OTL, backward fault alarm information to an upstream direction, where the backward fault alarm information is used for indicating that the fault occurs in the first OTL and the second OTL is activated.

With reference to the first possible implementation manner of the twelfth aspect, in a second possible implementation manner, the processing unit is further configured to: in a case in which the detecting unit determines that the fault in the first OTL disappears, deactivate the second OTL, and activate the first OTL; and the obtaining unit is further configured to obtain the OAM overhead information from the first OTL.

With reference to the second possible implementation manner of the twelfth aspect, in a third possible implementation manner, the sending unit is further configured to stop sending, on the first OTL, the backward fault alarm information to the upstream direction.

In the embodiments of the present invention, according to an adjustment requirement for a line interface rate, a transport bandwidth of an OCh link is adjusted, the number of OTLs in an OTUCn link is adjusted, and the number of ODLs in an ODUCn link is adjusted, so that the line interface rate can be dynamically adjusted.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part of the embodiments of the present invention rather than all of the embodiments. All other embodiments obtained by a person of ordinary skill in the art based on the embodiments of the present invention without creative efforts shall fall within the protection scope of the present invention.

Figure 1A:
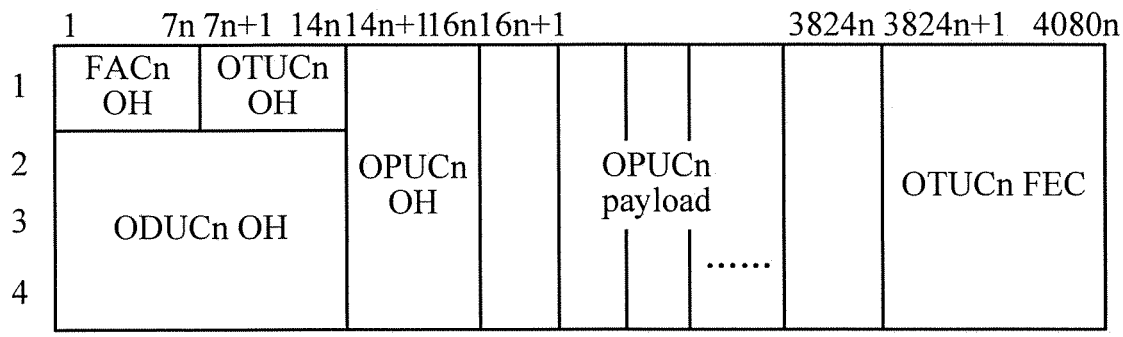
FIG. 1a is a schematic diagram of a frame structure of an OTUCn signal according to an embodiment of the present invention.

FIG. 1a is a schematic diagram of a frame structure of an OTUCn signal according to an embodiment of the present invention.

As shown in FIG. 1a, the frame structure of the OTUCn signal has 4 rows and 4080×n columns. Row 1 and columns 1 to 7n are frame header indication overhead area, row 1 and columns 7n+1 to 14n are an OTUCn overhead (Overhead, OH) area, rows 2 to 4 and columns 1 to 14n are an ODUCn overhead area, rows 1 to 4 and columns 14n+1 to 16n are an OPUCn overhead area, rows 1 to 4 and columns 16n+1 to 3824n are an OPUCn payload (Payload) area, and rows 1 to 4 and columns 3824n+1 to 4080n are a forward error correction (Forward Error Correction, FEC) check area of the OTUCn signal.

The OTUCn signal may be split into multiple optical channel transport lane (Optical Channel Transport Lane, OTL) signals, and the following two splitting manners may be available:

(1) The OTUCn signal may be split into n OTL signals, which are sequentially numbered OTLCn.n #1, OTLCn.n #2, . . . , and OTLCn.n #n, where n is a positive integer greater than 1. The n OTLCn.n signals may be transported by using multiple multi-subcarriers or multiple optical signals.

Figure 1B:
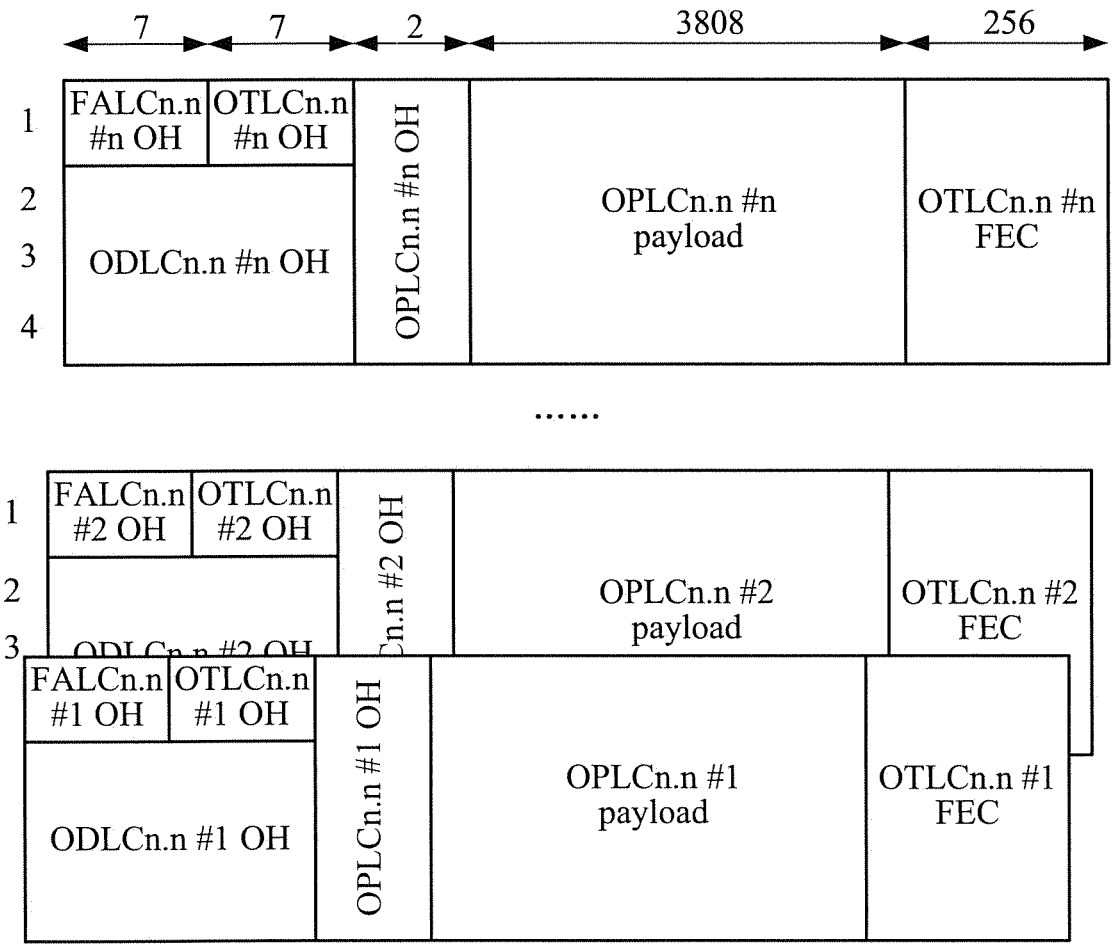
FIG. 1b is a schematic diagram of frame structures of n OTLCn.n signals according to an embodiment of the present invention.

Correspondingly, an ODUCn signal may also be split into n optical channel data lane (Optical Channel Data Lane, ODL) signals, that is, n ODLCn.n signals exist, which may be sequentially numbered ODLCn.n #1, ODLCn.n #2, . . . , and ODLCn.n #n; and an OPUCn signal may also be split into n optical channel payload lane (Optical Channel Payload Lane, OPL) signals, that is, n OPLCn.n signals exist, which may be sequentially numbered OPLCn.n #1, OPLCn.n #2, . . . , and OPLCn.n #n. FIG. 1b is a schematic diagram of frame structures of n OTLCn.n signals according to an embodiment of the present invention.

(2) The OTUCn signal may be split into p OTL signals, which sequentially are OTLCn.n$_1$, OTLCn.n$_2$, . . . , and OTLCn.n$_p$, where p is a positive integer greater than 1. OTLCn.n$_1$ includes n$_1$ OTLCn.n signals, which are sequentially numbered OTLCn.n #1, OTLCn.n #2, . . . , and OTLCn.n #n$_1$; OTLCn.n$_2$ includes n$_2$ OTLCn.n signals, which are sequentially numbered OTLCn.n #n$_1$+1, OTLCn.n #n$_1$+2, . . . , and OTLCn.n #n$_1$+n$_2$; . . . ; and OTLCn.n$_p$ includes n$_p$ OTLCn.n signals, which are sequentially numbered OTLCn.n #n$_1$+n$_2$+ . . . +n$_{p-1}$+1, OTLCn.n #n$_1$+n$_2$+ . . . +n$_{p-1}$+2, . . . , and OTLCn.n #n$_1$+n$_2$+ . . . +n$_{p-1}$+n$_p$. The p OTLCn.n$_i$ signals may be transported by using p optical signals.

Figure 1C:
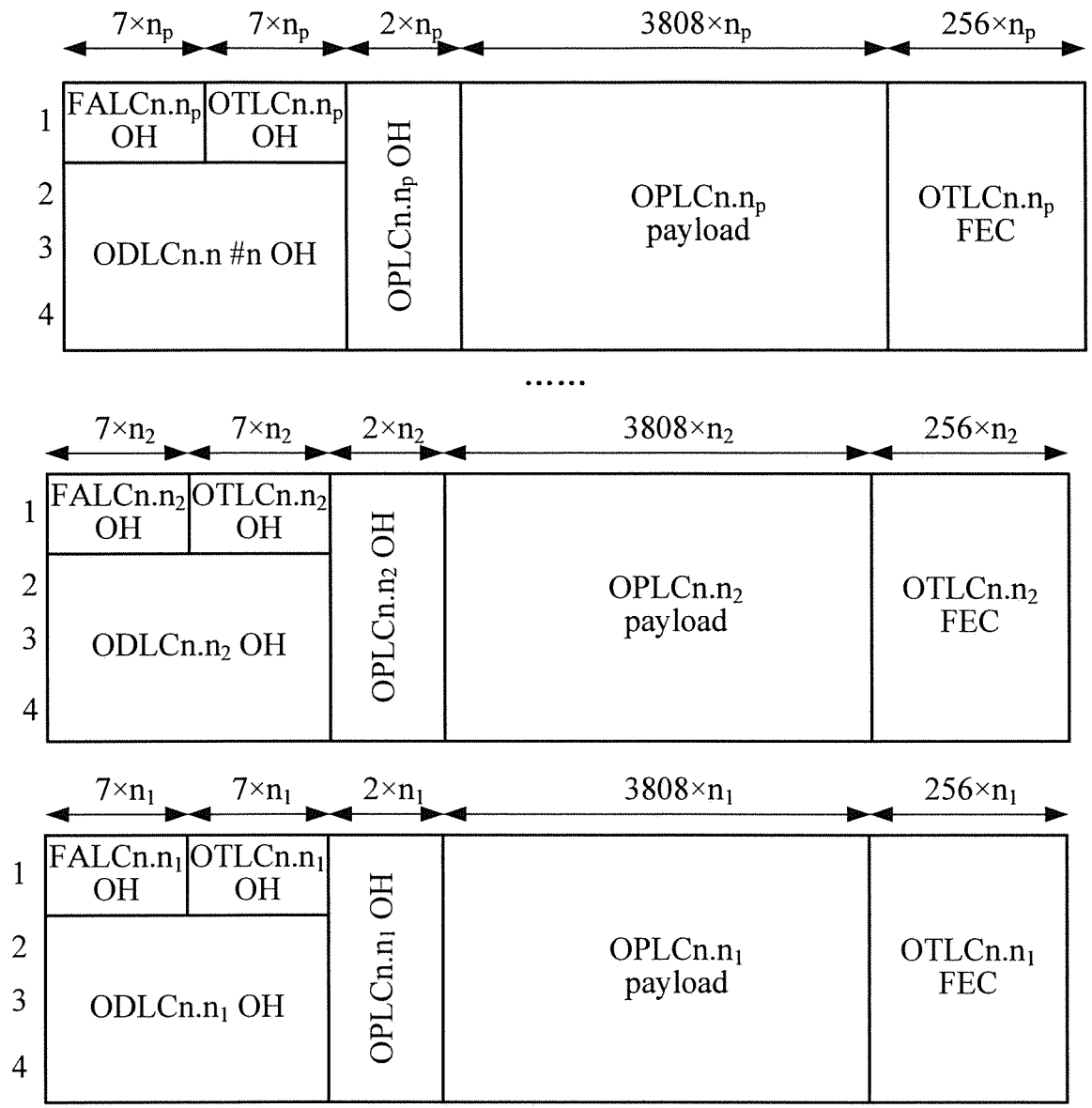
FIG. 1c is a schematic diagram of frame structures of p OTLCn.n$_i$ signals according to an embodiment of the present invention.

Correspondingly, p ODL signals exist, which sequentially are ODLCn.n$_1$, ODLCn.n$_2$, . . . , and ODLCn.n$_p$; and p OPL signals exist, which sequentially are OPLCn.n$_1$, OPLCn.n$_2$, . . . , and OPLCn.n$_p$, where n$_1$+n$_2$+ . . . +n$_p$=n, and $n_1, n_2, \ldots,$ and $n_p$ are all positive integers. FIG. 1c is a schematic diagram of frame structures of p OTLCn.$n_i$ signals according to an embodiment of the present invention, where i=1, 2, ..., p.

Figure 2:
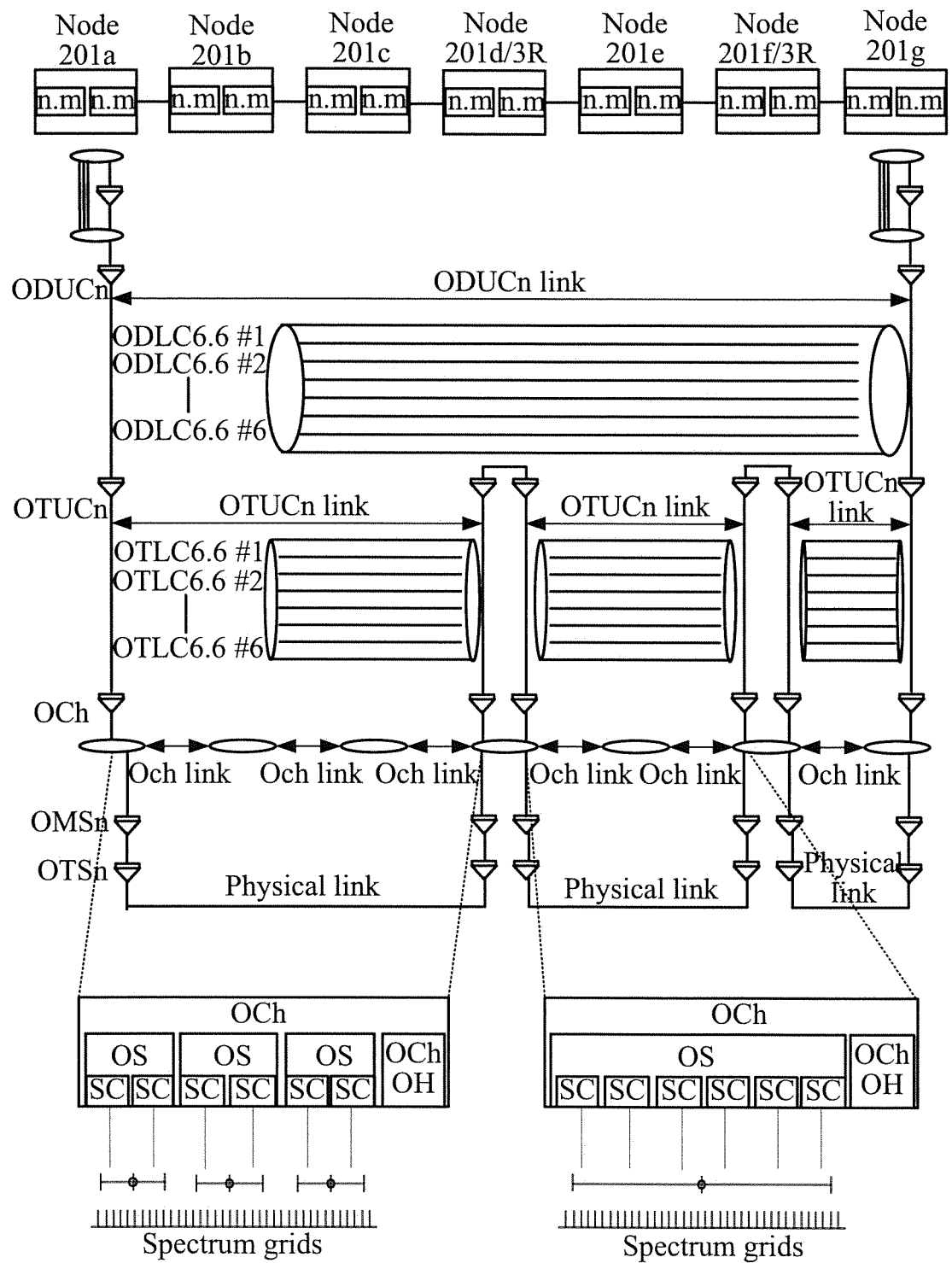
FIG. 2 is a schematic diagram of an example of an OTN scenario to which an embodiment of the present invention may be applied.

FIG. 2 is a schematic diagram of an example of an OTN scenario to which an embodiment of the present invention may be applied.

In the OTN scenario shown in FIG. 2, node 201a may be a source node, and node 201g may be a sink node. Node 201b to node 201f are intermediate nodes between node 201a and node 201g, where node 201d and node 201f may be 3R (Reamplification, Reshaping and Retiming, reamplification, reshaping and retiming) nodes.

An OTN may be divided into multiple network layers, which sequentially are an ODU layer, an OTU layer, an optical channel (Optical Channel, OCh) layer, an optical multiplexing section (Optical Multiplexing Section, OMS) layer, and an optical transmission section (Optical Transmission Section, OTS) layer. For example, FIG. 2 shows network layers between node 201a and node 201g.

An OTUCn signal between node 201a and node 201g is transported in a link concatenation mode. For example, at the OTU layer, the OTUCn signal is terminated and regenerated at a 3R node; therefore, 3 sections of OTUCn links exist between node 201a and node 201g. At the OCh layer, 6 sections of OCh links exist between node 201a and node 201g.

The OTUCn signal may be split into multiple lane signals. In FIG. 2, an OTUC6 signal is used as an example for description. As shown in FIG. 2, the OTUC6 signal may be split into 6 OTLC6.6 signals, which are sequentially numbered OTLC6.6 #1, OTLC6.6 #2, ..., and OTLC6.6 #6. Correspondingly, at the ODU layer, 6 ODLC6.6 signals exist, which are sequentially numbered ODLC6.6#1, ODLC6.6#2, ..., and ODLC6.6 #6.

The OTUC6 signal may be transported by using one or more optical signals. For example, in FIG. 2, between node 201a and node 201d, the OTUC6 signal is adapted to 3 optical signals (Optical Signal, OS) at the OCh layer, where each OS may correspond to a section of consecutive spectrum grids, and each OS may be transported by using 2 subcarriers, that is, OTLC6.6 #1, OTLC6.6 #2, ..., and OTLC6.6 #6 may be transported by using 6 subcarriers (Sub-Carrier, SC) in 3 OSs, respectively. Between node 201d and node 201f, the OTUC6 signal may be adapted to 1 OS at the OCh layer, where the OS may correspond to a section of consecutive spectrum grids, and the OS may be transported by using 6 subcarriers, that is, OTLC6.6 #1, OTLC6.6 #2, ..., and OTLC6.6 #6 may be transported by using 6 subcarriers in the OS, respectively.

The OTUCn signal in link concatenation may be transported in two routing manners: One manner may be a co-routing (Co-routing) manner, that is, the OTUCn signal may be transported by using at least one OS or at least one SC in a same fiber of a same path, that is, transported by using a same fiber in a same optical cable. The other manner may be a non-co-routing (Non-co-routing) manner, that is, the OTUCn signal may be transported by using at least one OS or at least one SC in different fibers of a same path, that is, transported by using different fibers in a same optical cable. It can be seen that in both the co-routing manner and the non-co-routing manner, the OTUCn signal is transported by using a same path; therefore, a delay deviation can be decreased, and a service transmission capability can be improved.

The following describes the two routing manners with reference to specific examples. It should be noted that, these examples are merely intended to help a person skilled in the art to better understand the embodiments of the present invention rather than to limit the scope of the embodiments of the present invention.

Figure 3A:
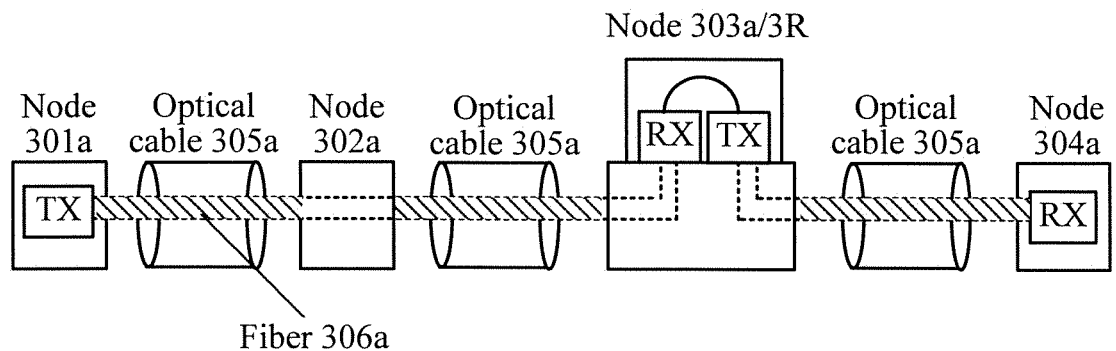
FIG. 3a is a schematic diagram of an example of a co-routing manner according to an embodiment of the present invention.

FIG. 3a is a schematic diagram of an example of a co-routing manner according to an embodiment of the present invention.

As shown in FIG. 3a, node 301a is a transmit end, and node 304a is a receive end. Node 302a and node 303a are intermediate nodes between node 301a and node 304a, where node 303a is a 3R node.

An OTUCn signal between node 301a and node 304a may be transported by using a same fiber 306a in a same optical cable 305a, and specifically, the OTUCn signal may be transported by using at least one OS or at least one SC in the fiber 306a.

Figure 3B:
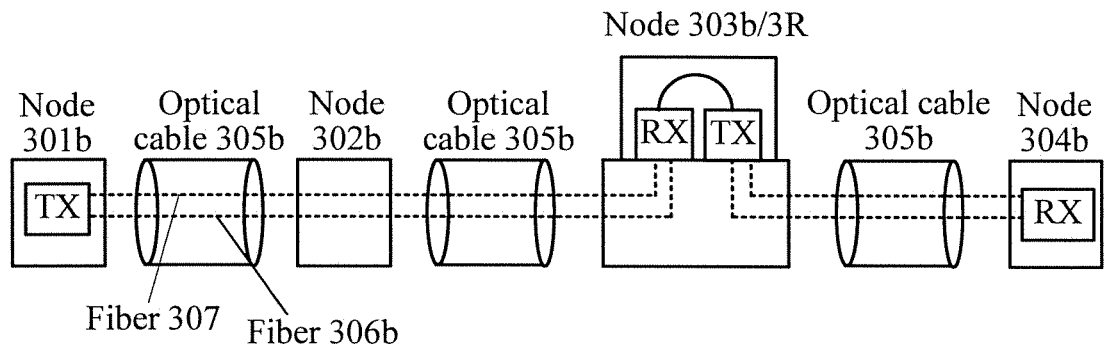
FIG. 3b is a schematic diagram of an example of a non-co-routing manner according to an embodiment of the present invention.

FIG. 3b is a schematic diagram of an example of a non-co-routing manner according to an embodiment of the present invention.

As shown in FIG. 3b, node 301b is a transmit end, and node 304b is a receive end. Node 302b and node 303b are intermediate nodes between node 301b and node 304b, where node 303b is a 3R node.

An OTUCn signal between node 301b and node 304b may be transported by using different fibers in a same optical cable 305b. In FIG. 3b, for ease of description, two fibers are used as an example for description. It should be understood that, in the embodiments of the present invention, the OTUCn signal may be transported by using more fibers in the same optical cable.

As shown in FIG. 3b, the OTUCn signal may be transported by using a fiber 306b and a fiber 307 in the optical cable 305b. Specifically, the OTUCn signal may be transported by using at least one OS or at least one SC in the fiber 306b, and at least one OS or at least one SC in the fiber 307. In the two fibers, the numbers of OSs may be different, and the numbers of SCs may also be different.

It should be understood that, for ease of description, in FIG. 2, FIG. 3a, and FIG. 3b, nodes with certain numbers are shown, but in the embodiments of the present invention, the number of nodes is not limited to the number shown in FIG. 2, FIG. 3a, or FIG. 3b.

Figure 4A:
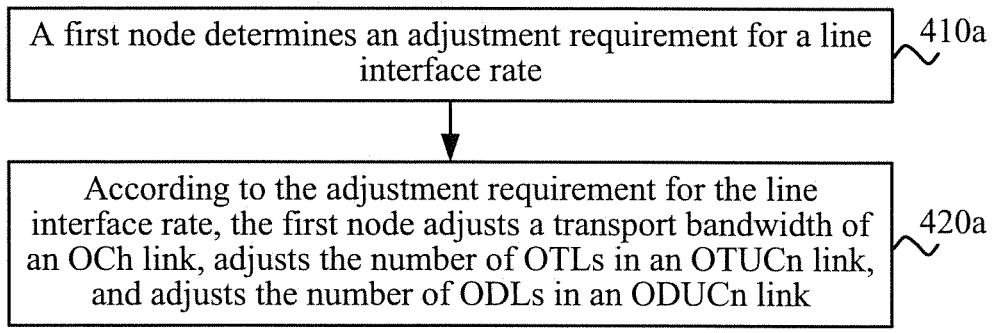
FIG. 4a is a schematic flowchart of a method for adjusting a line interface rate according to an embodiment of the present invention.

FIG. 4a is a schematic flowchart of a method for adjusting a line interface rate according to an embodiment of the present invention.

410a: A first node determines an adjustment requirement for a line interface rate.

For example, the first node may be a source node or a sink node, for example, may be node 201a or node 201g in FIG. 2. The first node may determine the adjustment requirement for the line interface rate according to an actual service condition. The line interface rate is a rate of an OTU signal. For example, the first node may determine the adjustment requirement for the line interface rate according to a factor such as service traffic or a transmission distance between the first node and a peer node. Alternatively, the first node may also receive a notification message from a network management system, where the notification message may be used for indicating the adjustment requirement for the line interface rate. The adjustment requirement for the line interface rate may refer to a requirement for increasing or decreasing the line interface rate.

420a: According to the adjustment requirement for the line interface rate, the first node adjusts a transport bandwidth of an OCh link, adjusts the number of OTLs in an OTUCn link, and adjusts the number of ODLs in an ODUCn link, where the OTL is in one-to-one correspondence with the ODL.

As described above, an OTN may include multiple network layers. Therefore, when the line interface rate needs to be adjusted, the first node may adjust an OCh layer, an OTU layer, and an ODU layer, respectively. Because an OTUCn signal at the OTU layer may be split into multiple lane signals, the OTUCn link may be split into multiple OTLs. Correspondingly, the ODUCn link may also be split into multiple ODLs. The OTL is in one-to-one correspondence with the ODL.

Therefore, when the line interface rate needs to be adjusted, the first node needs to adjust all of the OCh layer, the OTU layer, and the ODU layer. Specifically, the first node may adjust the transport bandwidth of the OCh link, the number of OTLs in the OTUCn link, and the number of ODLs in the ODUCn link, so that the line interface rate is dynamically adjusted, and hitless service adjustment can be implemented.

The first node may further transmit a service by using an adjusted OCh link, an adjusted OTUCn link, and an adjusted ODUCn link, which can improve a service transport capability, and can improve the utilization of an optical spectrum resource.

In the embodiment of the present invention, according to an adjustment requirement for a line interface rate, a first node adjusts a transport bandwidth of an OCh link, adjusts the number of OTLs in an OTUCn link, and adjusts the number of ODLs in an ODUCn link, so that the line interface rate can be dynamically adjusted.

Optionally, as an embodiment, the first node may adjust the number of optical signals in the OCh link; or the first node may adjust a modulation format of an optical signal in the OCh link; or the first node may adjust a spectrum width occupied by an optical signal in the OCh link; or the first node may adjust the number of optical signals in the OCh link, a modulation format of the optical signal, and a spectrum width occupied by the optical signal.

Specifically, the first node may add an optical signal into or remove an optical signal from the OCh link, or adjust a modulation format of an optical signal between a lower-order modulation format and a higher-order modulation format, or increase or decrease a spectrum width occupied by an optical signal, or simultaneously adjust the number of optical signals, a modulation format of the optical signal, and a spectrum width occupied by the optical signal, so as to adjust the transport bandwidth of the OCh link.

Optionally, as another embodiment, in step 420a, in a case in which the line interface rate needs to be increased, the first node may increase the transport bandwidth of the OCh link, add j OTLs into the OTUCn link, and add j ODLs into the ODUCn link, where j is a positive integer.

Specifically, when the line interface rate needs to be increased, the first node needs to increase the transport bandwidth of the OCh link first, and then add the j OTLs into the OTUCn link, and add the j ODLs into the ODUCn link. The j OTLs are in one-to-one correspondence with the j ODLs. The added j OTLs may be transported by using the increased transport bandwidth in the OCh link.

Optionally, as another embodiment, in step 420a, the first node may increase the number of optical signals in the OCh link; or the first node may adjust a modulation format of an optical signal in the OCh link, so as to increase the transport bandwidth of the OCh link; or the first node may increase a spectrum width occupied by an optical signal in the OCh link; or the first node may increase the number of optical signals in the OCh link, increase a spectrum width occupied by the optical signal, and adjust a modulation format of the optical signal.

The first node may increase the transport bandwidth of the OCh link by using the foregoing four adjustment schemes: increasing the number of optical signals; or adjusting a modulation format of an optical signal; or adjusting a spectrum width occupied by an optical signal, so as to increase the transport bandwidth of the OCh link; or increasing the number of optical signals, increasing a spectrum width occupied by the optical signal, and adjusting a modulation format of the optical signal. The first node can further adjust the OTU layer and the ODU layer only after the transport bandwidth of the OCh link is increased.

Optionally, as another embodiment, before the first node increases the transport bandwidth of the OCh link, the first node may send first OCh protocol signaling and first optical signal configuration information to a second node, where the first OCh protocol signaling is used for requesting increasing the transport bandwidth of the OCh link, and the first optical signal configuration information is used for indicating configuration of the optical signal. The first node may receive second OCh protocol signaling from the second node, where the second OCh protocol signaling is used for indicating that increasing the transport bandwidth of the OCh link is agreed.

Optionally, as another embodiment, the first node may further receive the first OCh protocol signaling and third optical signal configuration information from the second node, where the third optical signal configuration information is used for indicating the configuration of the optical signal. In a case in which it is determined that the first optical signal configuration info' illation is consistent with the third optical signal configuration information, the first node may send the second OCh protocol signaling to the second node.

The second node may be a 3R node that can directly communicate with the first node. For example, in FIG. 2, when the first node is 201a, the second node may be node 201d. When the first node is 201g, the second node may be node 201f.

In addition, the second node may also be a sink node or a source node. For example, if a source node is directly connected to a sink node by using a fiber, when the first node is the source node, the second node may be the sink node. When the first node is the sink node, the second node may be the source node.

Before increasing the transport bandwidth of the OCh link, the first node needs to negotiate with the second node. However, if other intermediate nodes that are non-3R nodes exist between the first node and the second node, before the first node negotiates with the second node, these intermediate nodes need to perform routing selection on an OCh link between them.

For example, the network management system may deliver a notification message to each node, to notify each node of an adjustment scheme for a current OCh link. Herein, the adjustment scheme for the OCh link may refer to the foregoing four schemes for adjusting the OCh link, that is, increasing the number of optical signals; or adjusting a modulation format of an optical signal; or adjusting a spectrum width occupied by an optical signal, so as to increase the transport bandwidth of the OCh link; or increasing the number of optical signals, increasing a spectrum width occupied by the optical signal, and adjusting a modulation format of the optical signal. Then, these intermediate nodes between the first node and the second node may perform routing selection on the OCh link between them based on the adjustment scheme for the OCh link indicated by the notification message, so as to be prepared for the OCh link adjustment. Then, the first node may negotiate with the second node.

In the negotiation process, the first node may first initiate, to the second node, a request for increasing the transport bandwidth of the OCh link. Alternatively, when the first node sends the first OCh protocol signaling to the second node, the second node may also send the first OCh protocol signaling and the third optical signal configuration information to the first node, where the third optical signal configuration information may indicate the configuration of the optical signal. In a case in which it is determined that the first optical signal configuration information is consistent with the third optical signal configuration information, the second node may send the second OCh protocol signaling to the first node. After the first node receives the second OCh protocol signaling of the second node, the first node may perform an operation of increasing the transport bandwidth.

In addition, in a case in which it is determined that the first optical signal configuration information is consistent with the third optical signal configuration information, the first node may also send the second OCh protocol signaling to the second node. In this way, after receiving the second OCh protocol signaling sent by the first node, the second node may perform the operation of increasing the transport bandwidth.

The first optical signal configuration information and the third optical signal configuration information may be delivered by the network management system to a corresponding node.

In other words, the first node and the second node may mutually request and determine increasing the transport bandwidth of the OCh link, and then both of them perform the operation of increasing the transport bandwidth of the OCh link. For example, the first node and the second node both add one or more optical signals into the OCh link.

OCh protocol signaling between the first node and the second node may be transported by using an optical supervisory carrier (Optical Supervisory Carrier, OSC) on the OCh link.

In addition, if multiple intermediate 3R nodes exist between the source node and the sink node, each two adjacent intermediate 3R nodes need to perform an operation of increasing a transport bandwidth of an OCh link between them, so that a transport bandwidth of each section of OCh link between the source node and the sink node is increased. That is, when the first node is the source node, the transport bandwidth of each section of OCh link between the first node and the sink node is increased; and when the first node is the sink node, the transport bandwidth of each section of OCh link between the first node and the source node is increased.

Optionally, as another embodiment, the first OCh protocol signaling and the second OCh protocol signaling both include the following fields: an OCh control signaling indication, an identifier of the OTUCn link, a sequence identifier of an optical signal used for bearing the OTUCn link and an identifier of a corresponding optical subcarrier, and an optical signal adjustment response state indication. The OCh control signaling indication is used for indicating an adjustment manner for the transport bandwidth, and the response state indication is used for indicating whether adjusting the transport bandwidth is agreed.

The first OCh protocol signaling and the second OCh protocol signaling may be determined based on an OCh Link Capacity Resize (Link Capacity Resize, LCR) protocol. The OCh LCR protocol defines a signaling exchange manner for adjusting a transport bandwidth of an OCh link.

In the OCh LCR protocol, multiple fields are defined, for example, an OChCTRL field, an OChGID field, an OChSQ field, an OChGS field, and the like.

The OChCTRL field is an OCh control signaling indication field and may occupy 3 bits (bits), of which different values may be used for indicating different adjustment manners for the transport bandwidth of the OCh link. For example, when the value of the OChCTRL field is 000 or ADD, the field may indicate a request for increasing the transport bandwidth; when the value of the OChCTRL field is 001 or REMOVE, the field may indicate a request for decreasing the transport bandwidth; when the value of the OChCTRL field is 100 or NORM, the field may indicate adjusting the transport bandwidth; and when the value of the OChCTRL field is 111, the field may be reserved.

The OChGID field is an identifier field of the OTUCn link, that is, an identifier of an OTUCn link borne by the OCh link. The number of bits occupied by the field may be limited according to a specific requirement.

The OChSQ field may indicate the sequence identifier of the optical signal used for bearing the OTUCn link and the identifier of the corresponding optical subcarrier. The number of bits occupied by the field may be limited according to a specific requirement.

The OChGS field may be a response state indication field, and is used for indicating whether adjusting the transport bandwidth is agreed. The field may occupy 1 bit. For example, when a value of the field is 1, it may indicate that adjusting the transport bandwidth is agreed.

In the OCh LCR protocol, the numbers of bits occupied by these fields may be determined according to a specific requirement, and are not limited to the foregoing numerical values. For example, the OChCTRL field may also occupy more or less bits.

Therefore, the first OCh protocol signaling and the second OCh protocol signaling may both include the fields defined in the OCh LCR protocol. However, in the first OCh protocol signaling and the second OCh protocol signaling, values of the fields are not exactly the same, so that an indicated meaning of the first OCh protocol signaling is different from an indicated meaning of the second OCh protocol signaling, so as to complete the operation of increasing the transport bandwidth of the OCh link.

It can also be known from the foregoing that when the transport bandwidth of the OCh link is adjusted, an operation on the optical signal is involved. Therefore, the first node may send the first optical signal configuration information to the second node, and the second node may send the third optical signal configuration information to the first node. The optical signal configuration information is used for indicating the configuration of the optical signal. For example, the optical signal configuration information may include the following content: an identifier of the optical signal, an identifier of a subcarrier, a bit rate, a modulation format, a central frequency, a spectrum width, an identifier of a borne OTUCn link, a serial number of each lane in the OTUCn link, and the like.

The following describes the optical signal configuration information with reference to a specific example. Table 1 is an example of the optical signal configuration information according to the embodiment of the present invention. As shown in Table 1, for a subcarrier SC1 of OS1, a bit rate of the subcarrier is 100 G, a used modulation format is polarization multiplexed-quadrature phase shift keying (Polarization Multiplexed-Quadrature Phase Shift Keying, PM-QPSK) format, an allocated central frequency is 193.100 THz, a spectrum width of 25 GHz is occupied, and a lane signal OTLCn.n #1 in the OTUCn link is transported.

TABLE 1

Example of the optical signal configuration information

| Optical signal/ corresponding subcarrier list | | Bit rate | Modulation format | Central frequency/spectrum width | Identifier of a borne OTUCn link | Serial number of a lane of the OTUCn link |
|---|---|---|---|---|---|---|
| OS1 | SC1 | 100 G | PM-QPSK | 193.100 THz/25 GHz | #a | OTLCn.n #1 |
|  | SC2 | 100 G | PM-QPSK | 193.125 THz/25 GHz | #a | OTLCn.n #2 |
| OS2 | SC3 | 100 G | PM-QPSK | 193.150 THz/25 GHz | #a | OTLCn.n #3 |
|  | SC4 | 100 G | PM-QPSK | 193.175 THz/25 GHz | #a | OTLCn.n #4 |
| OS3 | SC5 | 100 G | PM-QPSK | 193.200 THz/25 GHz | #a | OTLCn.n #5 |
|  | SC6 | 100 G | PM-QPSK | 193.225 THz/25 GHz | #a | OTLCn.n #6 |
| ... | ... | ... | ... | ... | ... | ... |
| ... | ... | ... | ... | ... | ... | ... |

The first node may notify the second node of a specific operation manner for the OCh link by using the first optical signal configuration information. For example, if the first optical signal configuration information includes configuration of an optical signal to be added, the second node may determine the number of optical signals that need to be added into the OCh link. If the first optical signal configuration information includes that a modulation format of an optical signal is different from an original modulation format of the optical signal, the second node may determine that the modulation format of the optical signal in the OCh link needs to be adjusted. If the first optical signal configuration information includes that a spectrum width of an optical signal is different from an original spectrum width of the optical signal, the second node may determine that the spectrum width of the optical signal in the OCh link needs to be adjusted. If the first optical signal configuration information includes configuration of an optical signal to be added, and the first optical signal configuration information includes that a modulation format of the optical signal is different from an original modulation format of the optical signal, and the first optical signal configuration information includes that a spectrum width of the optical signal is different from an original spectrum width of the optical signal, the second node may determine the number of optical signals that need to be added into the OCh link, and simultaneously adjust the modulation format and the spectrum width of the optical signal in the OCh link.

Optionally, as another embodiment, before adding the j OTLs into the OTUCn link, the first node may send first OTU protocol signaling to the second node, where the first OTU protocol signaling is used for requesting adding the j OTLs into an OTU link, and the first OTU protocol signaling carries information of the j OTLs. The first node may receive second OTU protocol signaling from the second node, where the second OTU protocol signaling is used for indicating that adding the j OTLs into the OTU link is agreed. The first node may receive third OTU protocol signaling from the second node, where the third OTU protocol signaling is used for indicating adding the j OTLs into the OTU link.

Optionally, as another embodiment, the first node may further receive the first OTU protocol signaling from the second node. The first node may send the second OTU protocol signaling to the second node. The first node may send the third OTU protocol signaling to the second node.

After the transport bandwidth of the OCh link is increased, the first node may trigger an operation of adding an OTL into the OTUCn link. Because the OTCn link is terminated and regenerated at a 3R node, before adding the j OTLs into the OTUCn link, the first node further needs to negotiate with the second node. In the negotiation process, the first node may first initiate, to the second node, a request for adding an OTL.

Alternatively, the network management system may uniformly deliver a notification message to each node, to notify each node of an adjustment manner for a current OTUCn link. Then, when the first node sends the first OTU protocol signaling to the second node, the second node may also send the first OTU protocol signaling to the first node. In a case in which it is determined that the information of the j OTLs carried in each of the two pieces of first OTU protocol signaling is consistent, the second node may send the second OTU protocol signaling to the first node. In a case in which it is determined that the information of the j OTLs carried in each of the two pieces of first OTU protocol signaling is consistent, the first node may send the second OTU protocol signaling to the second node. After receiving the second OTU protocol signaling from the first node, the second node may send the third OTU protocol signaling to the first node. After receiving the second OTU protocol signaling from the second node, the first node may also send the third OTU protocol signaling to the second node. In other words, at two ends of the OTUCn link, two nodes mutually request and determine adding the j OTLs into the OTUCn link, and after determining, mutually indicate performing an operation of adding the j OTLs into the OTUCn link, and then both of the two nodes perform the operation of adding the OTLs.

The OTU protocol signaling may be transported on the increased transport bandwidth of the OCh link. For example, if one or more optical signals are added into the OCh link, the first OTU protocol signaling, the second OTU protocol signaling, and the third OTU protocol signaling may be all transported by using a subcarrier in the newly added optical signal. If modulation formats of i optical signals in the OCh link are adjusted, the first OTU protocol signaling, the second OTU protocol signaling, and the third OTU protocol signaling may be all transported by using a subcarrier in the i optical signals, where i is a positive integer.

In addition, if multiple 3R nodes exist between the source node and the sink node, because the OTU is terminated and regenerated at a 3R node, each two adjacent 3R nodes need to add j OTLs into an OTUCn link between them, so that j OTLs are added into each OTUCn link between the source node and the sink node. That is, when the first node is the source node, j OTLs are added into each section of OTUCn link between the first node and the sink node; and when the first node is the sink node, j OTLs are added into each section of OTUCn link between the first node and the source node.

Optionally, as another embodiment, the first OTU protocol signaling, the second OTU protocol signaling, and the third OTU protocol signaling may all include the following fields: an OTL control signaling indication, the identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

The first OTU protocol signaling, the second OTU protocol signaling, and the third OTU protocol signaling may be determined based on an OTUCn LCR protocol. The OTUCn LCR protocol defines a signaling exchange manner for adjusting the number of OTLs in the OTUCn link.

In the OTUCnLCR protocol, multiple fields are defined, for example, an OTLCTRL field, an OTLGID field, an OTLSQ field, an OTLGS field, and the like.

The OTLCTRL field is an OTL control signaling indication field and may occupy 3 bits (bits), of which different values may be used for indicating different adjustment manners for the number of OTLs in an OTL link. For example, when the value of the OTLCTRL field is 001 or ADD, the field may indicate a request for increasing the number of OTLs; when the value of the OTLCTRL field is 010 or REMOVE, the field may indicate a request for decreasing the number of OTLs; when the value of the OTLCTRL field is 100 or NORM, the field may indicate adjusting the number of OTLs; when the value of the OTLCTRL field is 111 or IDLE, the field may indicate that the OTL is in an idle state; and when the value of the OTLCTRL field is 000 or FAIL, the field may indicate a forward fault alarm indication, that is, a fault occurs in the OTL.

The OTLGID field is an identifier field of the OTUCn link and may occupy 4 bits. OTLs belonging to a same OTUCn link have a same OTUCn link identifier.

The OTLSQ field may indicate a sequence identifier of each OTL in the OTUCn link. The field may occupy 8 bits.

The OTLGS field may be an OTL adjustment response state indication field, and is used for indicating whether adjusting the number of OTLs is agreed. The field may occupy 1 bit. For example, when a value of the field is 1, it may indicate that adjusting the number of OTLs is agreed.

Figure 5A:
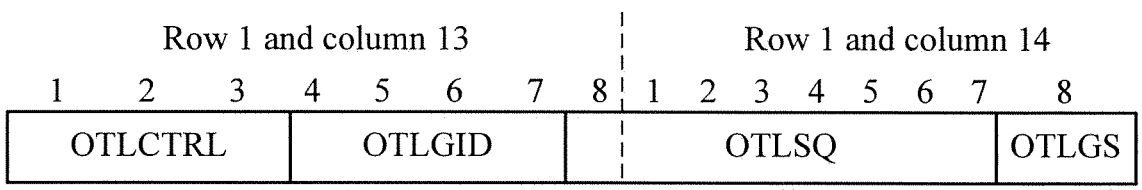
FIG. 5a is a schematic diagram of fields in an OTUCn LCR protocol according to an embodiment of the present invention.

FIG. 5a is a schematic diagram of fields in an OTUCn LCR protocol according to an embodiment of the present invention.

These fields may be placed in row 1 and columns 12n+1 to 14n of the frame structure shown in FIG. 1a, where each OTL may occupy 2 bytes. For each OTL, in the frame structures of OTLs shown in FIG. 1b and FIG. 1c, these fields may be placed in row 1 and columns 13 to 14, as shown in FIG. 5a.

It should be understood that, these fields may also be located in other positions of the frame structure. The example in FIG. 5a is merely intended to help a person skilled in the art to better understand the embodiments of the present invention rather than to limit the scope of the embodiments of the present invention.

In addition, in the OTUCn LCR protocol, the numbers of bits occupied by these fields may be determined according to a specific requirement, and are not limited to the numerical values shown in FIG. 5a. For example, the OTLCTRL field may also occupy more or less bits.

Therefore, the first OTU protocol signaling, the second OTU protocol signaling, and the third OTU protocol signaling may all include the fields defined in the OTUCn LCR protocol. However, in the first OTU protocol signaling, the second OTU protocol signaling, and the third OTU protocol signaling, values of the fields are not exactly the same, so that an indicated meaning of the first OTU protocol signaling, an indicated meaning of the second OTU protocol signaling, and an indicated meaning of the third OTU protocol signaling are different from each other.

Optionally, as another embodiment, before adding the j ODLs into the ODUCn link, the first node may send first ODU protocol signaling to a third node, where the first ODU protocol signaling is used for requesting adding the j ODLs into an ODU link, and the first ODU protocol signaling carries information of the j ODLs. The first node may receive second ODU protocol signaling from the third node, where the second ODU protocol signaling is used for indicating that adding the j ODLs into the ODU link is agreed. The first node may receive third ODU protocol signaling from the third node, where the third ODU protocol signaling is used for indicating adding the j ODLs into the ODU link.

The third node is a node at the other end of the ODUCn link. The third node may be a sink node or a source node. For example, in FIG. 2, when the first node is node 201a, the third node may be node 201g. When the first node is 201g, the third node may be 201a.

In addition, in a case in which the source node is directly connected to the sink node by using a fiber, the third node, and the second node may be a same node.

After adding the j OTLs into the OTUCn link, the first node may trigger an operation of adding an ODL into the ODUCn link. Before adding the j ODLs into the ODUCn link, the first node needs to negotiate with the third node. In the negotiation process, the first node may first initiate, to the third node, a request for adding an ODL.

Alternatively, the network management system may uniformly deliver a notification message to each node, to notify each node of an adjustment manner for a current ODUCn link. When the first node sends the first ODU protocol signaling to the third node, the third node may also send the first ODU protocol signaling to the first node. In a case in which it is determined that the information of the j ODLs carried in each of the two pieces of first ODU protocol signaling is consistent, the third node may send the second ODU protocol signaling to the first node. In a case in which it is determined that the information of the j ODLs carried in each of the two pieces of first ODU protocol signaling is consistent, the first node may send the second ODU protocol signaling to the third node. After receiving the second ODU protocol signaling from the first node, the third node may send the third ODU protocol signaling to the first node. After receiving the second ODU protocol signaling from the third node, the first node may also send the third ODU protocol signaling to the third node. In other words, at two ends of the ODUCn link, two nodes mutually request and determine adding the j ODLs into the ODUCn link, and after determining, mutually indicate performing an operation of adding the j ODLs into the ODUCn link, and then both of the two nodes perform the operation of adding the ODLs.

The ODU protocol signaling may be transported on the j OTLs added into the OTUCn link.

Optionally, as another embodiment, the first ODU protocol signaling, the second ODU protocol signaling, and the third ODU protocol signaling may all include the following fields: an ODL control signaling indication, an identifier of the ODUCn link, sequence identifiers of the j ODLs in the ODUCn link, and an ODL adjustment response state indication, where the ODL control signaling indication is used for indicating a manner of adjusting the number of ODLs, and the ODL adjustment response state indication is used for indicating whether adjusting the number of ODLs is agreed.

The first ODU protocol signaling, the second ODU protocol signaling, and the third ODU protocol signaling may be determined based on an ODUCn LCR protocol. The ODUCn LCR protocol defines a signaling exchange manner for adjusting the number of ODLs in the ODUCn link.

In the ODUCnLCR protocol, multiple fields are defined, for example, an ODLCTRL field, an ODLGID field, an ODLSQ field, an ODLGS field, and the like.

The ODLCTRL field is an ODL control signaling indication field and may occupy 3 bits (bits), of which different values may be used for indicating different adjustment manners for the number of ODLs in an ODL link. For example, when the value of the ODLCTRL field is 001 or ADD, the field may indicate a request for increasing the number of ODLs; when the value of the ODLCTRL field is 010 or REMOVE, the field may indicate a request for decreasing the number of ODLs; when the value of the ODLCTRL field is 100 or NORM, the field may indicate adjusting the number of ODLs; when the value of the ODLCTRL field is 111 or IDLE, the field may indicate that the ODL is in an idle state; and when the value of the ODLCTRL field is 000 or FAIL, the field may indicate a forward fault alarm indication, that is, a fault occurs in the ODL.

The ODLGID field is an identifier field of the ODUCn link, and may occupy 4 bits. ODLs belonging to a same ODUCn link have a same ODUCn link identifier.

The ODLSQ field may indicate a sequence identifier of each ODL in the ODUCn link. The field may occupy 8 bits.

The ODLGS field may be an ODL adjustment response state indication field, and is used for indicating whether adjusting the number of ODLs is agreed. The field may occupy 1 bit. For example, when a value of the field is 1, it may indicate that adjusting the number of ODLs is agreed.

Figure 5B:
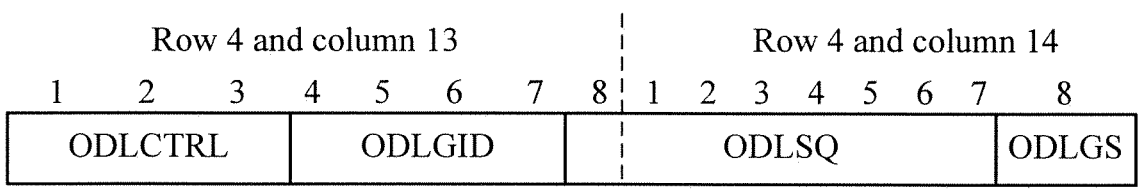
FIG. 5b is a schematic diagram of fields in an ODUCn LCR protocol according to an embodiment of the present invention.

FIG. 5b is a schematic diagram of fields in an ODUCn LCR protocol according to an embodiment of the present invention.

These fields may be placed in row 4 and columns 12n+1 to 14n of the frame structure shown in FIG. 1a, where each ODL may occupy 2 bytes. For each ODL, in the frame structures of OTLs shown in FIG. 1b and FIG. 1c, these fields may be placed in row 4 and columns 13 to 14, as shown in FIG. 5b.

It should be understood that, these fields may also be located in other positions of the frame structure. The example in FIG. 5b is merely intended to help a person skilled in the art to better understand the embodiments of the present invention rather than to limit the scope of the embodiments of the present invention.

In addition, in the ODUCn LCR protocol, the numbers of bits occupied by these fields may be determined according to a specific requirement, and are not limited to the numerical values shown in FIG. 5b. For example, the ODLCTRL field may also occupy more or less bits.

Therefore, the first ODU protocol signaling, the second ODU protocol signaling, and the third ODU protocol signaling may all include the fields defined in the ODUCn LCR protocol. However, in the first ODU protocol signaling, the second ODU protocol signaling, and the third ODU protocol signaling, values of the fields are not exactly the same, so that an indicated meaning of the first ODU protocol signaling, an indicated meaning of the second ODU protocol signaling, and an indicated meaning of the third ODU protocol signaling are different from each other.

Optionally, as another embodiment, after adding the j ODLs into the ODUCn link, the first node may increase, according to a Hitless Adjustment of ODUflex (Hitless Adjustment of ODUflex, HAO) protocol, a bandwidth occupied by a lower-order ODU service on the ODUCn link.

For example, the first node may increase the number of timeslots of an ODUCn occupied by the lower-order ODU service, and then increase a rate of the lower-order ODU service. The lower-order ODU service may be ODUflex (GFP), that is, a variable optical channel data unit that bears a packet service by using the Generic Framing Procedure (Generic Framing Procedure, GFP).

The foregoing describes in detail the process of increasing a line interface rate. The following describes in detail a process of decreasing a line interface rate. The process of decreasing a line interface rate is converse to the process of increasing a line interface rate; therefore, description of similar parts is omitted properly.

Optionally, as another embodiment, in step 420a, in a case in which the line interface rate needs to be decreased, the first node may remove j ODLs from the ODUCn link, remove j OTLs from the OTUCn link, and decrease the transport bandwidth of the OCh link, where j is a positive integer.

To decrease the line interface rate, the first node also needs to perform operations on the ODU layer, the OTU layer, and the OCh layer.

Optionally, as another embodiment, before removing the j ODLs from the ODUCn link, the first node may send fourth ODU protocol signaling to a third node, where the fourth ODU protocol signaling is used for requesting removing the j ODLs from an ODU link, and the fourth ODU protocol signaling carries information of the j ODLs. The first node may receive fifth ODU protocol signaling from the third node, where the fifth ODU protocol signaling is used for indicating that removing the j ODLs from the ODU link is agreed. The first node may receive sixth ODU protocol signaling from the third node, where the sixth ODU protocol signaling is used for indicating removing the j ODLs from the ODU link.

Similar to the process of adding the ODLs into the ODUCn link, before removing the j ODLs from the ODUCn link, the first node also needs to negotiate with the third node. In the negotiation process, the first node may first initiate, to the third node, a request for removing an ODL.

Alternatively, the network management system may uniformly deliver a notification message to each node, to notify each node of an adjustment manner for a current ODUCn link. Then, when the first node sends the fourth ODU protocol signaling to the third node, the third node may also send the fourth ODU protocol signaling to the first node. In a case in which it is determined that the information of the j ODLs carried in each of the two pieces of fourth ODU protocol signaling is consistent, the third node may send the fifth ODU protocol signaling to the first node. In a case in which it is determined that the information of the j ODLs carried in each of the two pieces of fourth ODU protocol signaling is consistent, the first node may send the fifth ODU protocol signaling to the third node. After receiving the fifth ODU protocol signaling from the first node, the third node may send the sixth ODU protocol signaling to the first node. After receiving the fifth ODU protocol signaling from the third node, the first node may also send the sixth ODU protocol signaling to the third node. In other words, at two ends of the ODUCn link, two nodes mutually request and determine removing the j ODLs from the ODUCn link, and after determining, mutually indicate performing an operation of removing the j ODLs from the ODUCn link, and then both of the two nodes perform the operation of removing the ODLs.

Optionally, as another embodiment, the fourth ODU protocol signaling, the fifth ODU protocol signaling, and the sixth ODU protocol signaling may all include the following fields: an ODL control signaling indication, an identifier of the ODUCn link, sequence identifiers of the j ODLs in the ODUCn link, and an ODL adjustment response state indication. The ODL control signaling indication is used for indicating a manner of adjusting the number of ODLs, and the ODL adjustment response state indication is used for indicating whether adjusting the number of ODLs is agreed.

Similar to the first ODU protocol signaling, the second ODU protocol signaling, and the third ODU protocol signaling, the fourth ODU protocol signaling, the fifth ODU protocol signaling, and the sixth ODU protocol signaling are also determined based on the ODUCn LCR protocol.

The fourth ODU protocol signaling, the fifth ODU protocol signaling, and the sixth ODU protocol signaling may all include the fields defined in the ODUCn LCR protocol. However, in the fourth ODU protocol signaling, the fifth ODU protocol signaling, and the sixth ODU protocol signaling, values of the fields are not exactly the same, so that an indicated meaning of the fourth ODU protocol signaling, an indicated meaning of the fifth ODU protocol signaling, and an indicated meaning of the sixth ODU protocol signaling are different from each other.

Optionally, as another embodiment, before removing the j OTLs from the OTUCn link, the first node may send fourth OTU protocol signaling to a second node, where the fourth OTU protocol signaling is used for requesting removing the j OTLs from an OTU link, and the fourth OTU protocol signaling carries information of the j OTLs. The first node may receive fifth OTU protocol signaling from the second node, where the fifth OTU protocol signaling is used for indicating that removing the j OTLs from the OTU link is agreed. The first node may receive sixth OTU protocol signaling from the second node, where the sixth OTU protocol signaling is used for indicating removing the j OTLs from the OTU link.

Optionally, as another embodiment, the first node may further receive the fourth OTU protocol signaling from the second node. The first node may send the fifth OTU protocol signaling to the second node. The first node may send the sixth OTU protocol signaling to the second node.

After removing j ODL links from the ODUCn link, the first node triggers an operation of removing an OTL from the OTUCn link.

Before removing the j OTLs from the OTUCn link, the first node needs to negotiate with the second node. In the negotiation process, the first node may first initiate, to the second node, a request for removing an OTL.

Alternatively, the network management system may uniformly deliver a notification message to each node, to notify each node of an adjustment manner for a current OTUCn link. Then, when the first node sends fourth OTU protocol signaling to the second node, the second node may also send the fourth OTU protocol signaling to the first node. In a case in which it is determined that the information of the j OTLs carried in each of the two pieces of fourth OTU protocol signaling is consistent, the second node may send the fifth OTU protocol signaling to the first node. In a case in which it is determined that the information of the j OTLs carried in each of the two pieces of fourth OTU protocol signaling is consistent, the first node may send the fifth OTU protocol signaling to the second node. After receiving the fifth OTU protocol signaling from the first node, the second node may send the sixth OTU protocol signaling to the first node. After receiving the fifth OTU protocol signaling from the second node, the first node may also send the sixth OTU protocol signaling to the second node. In other words, at two ends of the OTUCn link, two nodes mutually request and determine removing the j OTLs from the OTUCn link, and after determining, mutually indicate performing an operation of removing the j OTLs from the OTUCn link, and then both of the two nodes perform the operation of removing the OTLs.

In addition, if multiple 3R nodes exist between the source node and the sink node, because the OTU is terminated and regenerated at a 3R node, each two adjacent 3R nodes need to remove j OTLs from an OTUCn link between them, so that j OTLs are removed from each OTUCn link between the source node and the sink node. That is, when the first node is the source node, j OTLs are removed from each section of OTUCn link between the first node and the sink node; and when the first node is the sink node, j OTLs are removed from each section of OTUCn link between the first node and the source node.

Optionally, as another embodiment, the fourth OTU protocol signaling, the fifth OTU protocol signaling, and the sixth OTU protocol signaling may all include the following fields: an OTL control signaling indication, an identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Similar to the first OTU protocol signaling, the second OTU protocol signaling, and the third OTU protocol signaling, the fourth OTU protocol signaling, the fifth OTU protocol signaling, and the sixth OTU protocol signaling may also be determined based on the OTUCn LCR protocol.

The fourth OTU protocol signaling, the fifth OTU protocol signaling, and the sixth OTU protocol signaling may all include the fields defined in the OTUCn LCR protocol. However, in the fourth OTU protocol signaling, the fifth OTU protocol signaling, and the sixth OTU protocol signaling, values of the fields are not exactly the same, so that an indicated meaning of the fourth OTU protocol signaling, an indicated meaning of the fifth OTU protocol signaling, and an indicated meaning of the sixth OTU protocol signaling are different from each other.

Optionally, as another embodiment, to decrease the transport bandwidth of the OCh link, the first node may decrease the number of optical signals in the OCh link; or the first node adjusts a modulation format of an optical signal in the OCh link, so as to decrease the transport bandwidth of the OCh link; or the first node decreases a spectrum width of an optical signal in the OCh link; or the first node decreases the number of optical signals in the OCh link, decreases a spectrum width occupied by the optical signal, and adjusts a modulation format of the optical signal.

Optionally, as another embodiment, before decreasing the transport bandwidth of the OCh link, the first node may send third OCh protocol signaling and second optical signal configuration information to the second node, where the third OCh protocol signaling is used for requesting decreasing the transport bandwidth of the OCh link, and the second optical signal configuration information is used for indicating configuration of the optical signal. The first node may receive fourth OCh protocol signaling from the second node, where the fourth OCh protocol signaling is used for indicating that decreasing the transport bandwidth of the OCh link is agreed.

Optionally, as another embodiment, the first node may further receive the third OCh protocol signaling and fourth optical signal configuration information from the second node, where the fourth optical signal configuration information is used for indicating the configuration of the optical signal. In a case in which it is determined that the second optical signal configuration information is consistent with the fourth optical signal configuration information, the first node may send the fourth OCh protocol signaling to the second node.

Before decreasing the transport bandwidth of the OCh link, the first node needs to negotiate with the second node. However, if other intermediate nodes that are non-3R nodes exist between the first node and the second node, before the first node negotiates with the second node, these intermediate nodes need to perform routing selection on an OCh link between them.

For example, the network management system may deliver a notification message to each node, to notify each node of an adjustment scheme for a current OCh link. Herein, the adjustment scheme for the OCh link may refer to the foregoing four schemes for adjusting the OCh link, that is, decreasing the number of optical signals in the OCh link; or adjusting a modulation format of an optical signal in the OCh link, so as to decrease the transport bandwidth of the OCh link; or decreasing a spectrum width of an optical signal in the OCh link; or decreasing the number of optical signals in the OCh link, decreasing a spectrum width occupied by the optical signal, and adjusting a modulation format of the optical signal. These intermediate nodes between the first node and the second node may perform routing selection on the OCh link between them based on the adjustment scheme for the OCh link indicated by the notification message, so as to be prepared for the OCh link adjustment. Then, the first node may negotiate with the second node.

In the negotiation process, the first node may first initiate, to the second node, a request for decreasing the transport bandwidth of the OCh link. Alternatively, when the first node sends the third OCh protocol signaling to the second node, the second node may also send the third OCh protocol signaling and the fourth optical signal configuration information to the first node, where the fourth optical signal configuration may indicate the configuration of the optical signal. In a case in which it is determined that the second optical signal configuration information is consistent with the fourth optical signal configuration information, the second node may send the fourth OCh protocol signaling to the first node. After the first node receives the fourth OCh protocol signaling of the second node, the first node may perform an operation of decreasing the transport bandwidth.

In addition, in a case in which it is determined that the second optical signal configuration information is consistent with the fourth optical signal configuration information, the first node may also send the fourth OCh protocol signaling to the second node. In this way, after receiving the fourth OCh protocol signaling sent by the first node, the second node may perform the operation of decreasing the transport bandwidth.

The second optical signal configuration information and the fourth optical signal configuration information may be delivered by the network management system to a corresponding node.

In other words, the first node and the second node may mutually request and determine decreasing the transport bandwidth of the OCh link, and then both of them perform the operation of decreasing the transport bandwidth of the OCh link. For example, the first node and the second node both remove one or more optical signals from the OCh link.

OCh protocol signaling between the first node and the second node may be transported by using an OSC on the OCh link.

In addition, if multiple intermediate 3R nodes exist between the source node and the sink node, each two adjacent intermediate 3R nodes need to perform an operation of decreasing a transport bandwidth of an OCh link between them, so that a transport bandwidth of each section of OCh link between the source node and the sink node is decreased. That is, when the first node is the source node, the transport bandwidth of each section of OCh link between the first node and the sink node is decreased; and when the first node is the sink node, the transport bandwidth of each section of OCh link between the first node and the source node is decreased.

Optionally, as another embodiment, the third OCh protocol signaling and the fourth OCh protocol signaling both include the following fields: an OCh control signaling indication, the identifier of the OTUCn link, a sequence identifier of an optical signal used for bearing the OTUCn link and an identifier of a corresponding optical subcarrier, and a response state indication, where the OCh control signaling indication is used for indicating an adjustment manner for the transport bandwidth, and the response state indication is used for indicating whether adjusting the transport bandwidth is agreed.

Similar to the first OCh protocol signaling and the second OCh protocol signaling, the third OCh protocol signaling and the fourth OCh protocol signaling may be determined based on the OCh LCR protocol.

The third OCh protocol signaling and the fourth OCh protocol signaling may both include the fields defined in the OCh LCR protocol. However, in the third OCh protocol signaling and the fourth OCh protocol signaling, values of the fields are not exactly the same, so that an indicated meaning of the third OCh protocol signaling is different from an indicated meaning of the fourth OCh protocol signaling, so as to complete the operation of decreasing the transport bandwidth of the OCh link.

Optionally, as another embodiment, before removing the j ODLs from the ODUCn link, the first node decreases, according to the HAO protocol, a bandwidth occupied by a lower-order ODU service on the ODUCn link, so as to ensure that valid data is no longer borne on the j ODLs to be removed.

Figure 4B:
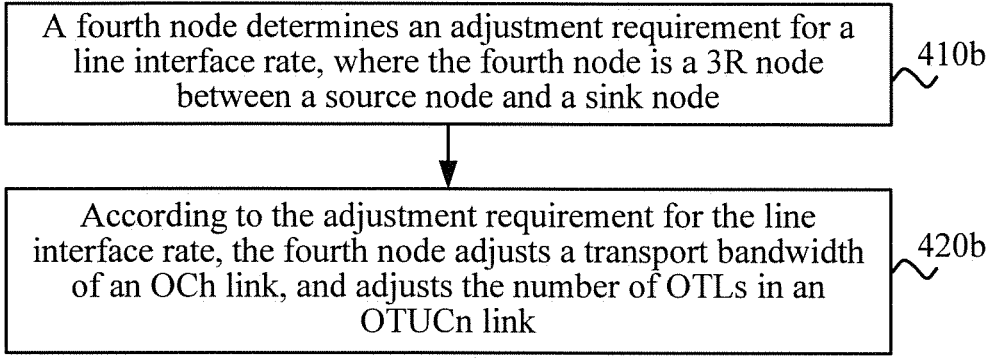
FIG. 4b is a schematic flowchart of a method for adjusting a line interface rate according to another embodiment of the present invention.

FIG. 4b is a schematic flowchart of a method for adjusting a line interface rate according to another embodiment of the present invention.

410b: A fourth node determines an adjustment requirement for a line interface rate, where the fourth node is a 3R node between a source node and a sink node.

For example, the fourth node may be node 201*d* or node 201*f* in FIG. 2. The fourth node may receive a notification message from a network management system, where the notification message may indicate the adjustment requirement for the line interface rate. The adjustment requirement for the line interface rate may be a requirement for increasing or decreasing the line interface rate.

420*b*: According to the adjustment requirement for the line interface rate, the fourth node adjusts a transport bandwidth of an OCh link, and adjusts the number of OTLs in an OTUCn link.

Both an OCh link and an OTUCn link exist between 3R nodes between the source node and the sink node. Therefore, to adjust a line interface rate between the source node and the sink node, the 3R nodes also need to adjust a transport bandwidth of their respective OCh link and the number of OTLs in the OTUCn link.

In the embodiment of the present invention, according to an adjustment requirement for a line interface rate, a 3R node between a source node and a sink node adjusts a transport bandwidth of an OCh link, and adjusts the number of OTLs in an OTUCn link, which can dynamically adjust a line interface rate between the source node and the sink node.

Optionally, as another embodiment, the fourth node may adjust the number of optical signals in the OCh link; or the fourth node may adjust a modulation format of an optical signal in the OCh link; or the fourth node may adjust a spectrum width occupied by an optical signal in the OCh link; or the fourth node may adjust the number of optical signals in the OCh link, a modulation format of the optical signal, and a spectrum width occupied by the optical signal.

Optionally, as another embodiment, in a case in which the line interface rate needs to be increased, the fourth node may increase the transport bandwidth of the OCh link, and add j OTLs into the OTUCn link, where j is a positive integer.

Optionally, as another embodiment, to increase the transport bandwidth of the OCh link, the fourth node may increase the number of optical signals in the OCh link; or the fourth node may adjust a modulation format of an optical signal in the OCh link, so as to increase the transport bandwidth of the OCh link; or the fourth node may increase a spectrum width occupied by an optical signal in the OCh link; or the fourth node may increase the number of optical signals in the OCh link, increase a spectrum width occupied by the optical signal, and adjust a modulation format of the optical signal.

Optionally, as another embodiment, before increasing the transport bandwidth of the OCh link, the fourth node may send first OCh protocol signaling and fifth optical signal configuration information to a fifth node, where the first OCh protocol signaling is used for requesting increasing the transport bandwidth of the OCh link, and the fifth optical signal configuration information is used for indicating configuration of the optical signal. The fourth node may receive second OCh protocol signaling from the fifth node, where the second OCh protocol signaling is used for indicating that increasing the transport bandwidth of the OCh link is agreed.

Optionally, as another embodiment, the fourth node may receive the first OCh protocol signaling and sixth optical signal configuration information from the fifth node, where the sixth optical signal configuration information is used for indicating the configuration of the optical signal. In a case in which it is determined that the fifth optical signal configuration information is consistent with the sixth optical signal configuration information, the fourth node may send the second OCh protocol signaling to the fifth node.

The fifth node may be a 3R node that can directly communicate with the fourth node.

The fifth node may also be the source node or the sink node. In this case, the fifth node and the first node may be a same node, and the fourth node and the second node may be a same node. For example, in FIG. 2, when the fourth node is node 201*d*, the fifth node may be node 201*a*, and may also be node 201*f*.

At two ends of the OCh link, the fourth node and the fifth node may mutually request and determine increasing the transport bandwidth of the OCh link, and then both perform the operation of increasing the transport bandwidth of the OCh link.

Optionally, as another embodiment, the first OCh protocol signaling and the second OCh protocol signaling both include the following fields: an OCh control signaling indication, an identifier of the OTUCn link, a sequence identifier of an optical signal used for bearing the OTUCn link and an identifier of a corresponding optical subcarrier, and an optical signal adjustment response state indication. The OCh control signaling indication is used for indicating an adjustment manner for the transport bandwidth, and the response state indication is used for indicating whether adjusting the transport bandwidth is agreed.

Optionally, as another embodiment, before adding the j OTLs into the OTUCn link, the fourth node may send first OTU protocol signaling to the fifth node, where the first OTU protocol signaling is used for requesting adding the j OTLs into the OTUCn link, and the first OTU protocol signaling carries information of the j OTLs. The fourth node may receive second OTU protocol signaling from the fifth node, where the second OTU protocol signaling is used for indicating that adding the j OTLs into the OTUCn link is agreed. The fourth node may receive third OTU protocol signaling from the fifth node, where the third OTU protocol signaling is used for indicating adding the j OTLs into the OTUCn link.

Optionally, as another embodiment, the fourth node may receive the first OTU protocol signaling from the fifth node. The fourth node may send the second OTU protocol signaling to the fifth node. The fourth node may send the third OTU protocol signaling to the fifth node.

At two ends of the OTUCn link, the fourth node and the fifth node may mutually request and determine adding the j OTLs into the OTUCn link, and after determining, mutually indicate performing an operation of adding the j OTLs into the OTUCn link, and then both of the two nodes perform the operation of adding the OTLs.

Optionally, as another embodiment, the first OTU protocol signaling, the second OTU protocol signaling, and the third OTU protocol signaling may all include the following fields: an OTL control signaling indication, the identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, in a case in which the line interface rate needs to be decreased, the fourth node may remove j OTLs from the OTUCn link, and decrease the transport bandwidth of the OCh link, where j is a positive integer.

Optionally, as another embodiment, before removing the j OTLs from the OTUCn link, the fourth node may send fourth OTU protocol signaling to the fifth node, where the fourth OTU protocol signaling is used for requesting removing the j OTLs from an OTU link, and the fourth OTU protocol signaling carries information of the j OTLs. The fourth node may receive fifth OTU protocol signaling from the fifth node, where the fifth OTU protocol signaling is used for indicating that removing the j OTLs from the OTU link is agreed. The fourth node may receive sixth OTU protocol signaling from the fifth node, where the sixth OTU protocol signaling is used for indicating removing the j OTLs from the OTU link.

Optionally, as another embodiment, the fourth node may further receive the fourth OTU protocol signaling from the fifth node. The fourth node may send the fifth OTU protocol signaling to the fifth node. The fourth node may send the sixth OTU protocol signaling to the fifth node.

Specifically, at two ends of the OTUCn link, the fourth node and the fifth node may mutually request and determine removing the j OTLs from the OTUCn link, and after determining, mutually indicate performing an operation of removing the j OTLs from the OTUCn link, and then both of the two nodes perform the operation of removing the OTLs.

Optionally, as another embodiment, the fourth OTU protocol signaling, the fifth OTU protocol signaling, and the sixth OTU protocol signaling may all include the following fields: an OTL control signaling indication, an identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, to decrease the transport bandwidth of the OCh link, the fourth node may decrease the number of optical signals in the OCh link; or the fourth node may adjust a modulation format of an optical signal in the OCh link, so as to decrease the transport bandwidth of the OCh link; or the fourth node may decrease the number of optical signals in the OCh link, and adjust a modulation format of the optical signal.

Optionally, as another embodiment, before decreasing the transport bandwidth of the OCh link, the fourth node may send third OCh protocol signaling and seventh optical signal configuration information to the fifth node, where the third OCh protocol signaling is used for requesting decreasing the transport bandwidth of the OCh link, and the seventh optical signal configuration information is used for indicating configuration of the optical signal. The fourth node may receive fourth OCh protocol signaling from the fifth node, where the fourth OCh protocol signaling is used for indicating that decreasing the transport bandwidth of the OCh link is agreed.

Optionally, as another embodiment, the fourth node may further receive the third OCh protocol signaling and eighth optical signal configuration information from the fifth node, where the eighth optical signal configuration information is used for indicating the configuration of the optical signal. In a case in which it is determined that the seventh optical signal configuration information is consistent with the eighth optical signal configuration information, the fourth node may send the fourth OCh protocol signaling to the fifth node.

Specifically, after the fourth node and the fifth node remove the j OTLs from the OTUCn link, the fourth node and the fifth node may mutually request and determine decreasing the transport bandwidth of the OCh link, and then both perforin an operation of decreasing the transport bandwidth of the OCh link. For example, the fourth node and the fifth node may both remove one or more optical signals from the OCh link.

Optionally, as another embodiment, the third OCh protocol signaling and the fourth OCh protocol signaling both include the following fields: an OCh control signaling indication, the identifier of the OTUCn link, a sequence identifier of an optical signal used for bearing the OTUCn link and an identifier of a corresponding optical subcarrier, and a response state indication, where the OCh control signaling indication is used for indicating an adjustment manner for the transport bandwidth, and the response state indication is used for indicating whether adjusting the transport bandwidth is agreed.

In the embodiment in FIG. 4b, for the specific interaction process between the fourth node and the fifth node, reference may be made to the description of the interaction process between the first node and the second node in the embodiment in FIG. 4a. To avoid repetition, details are not repeatedly described herein.

Figure 4C:
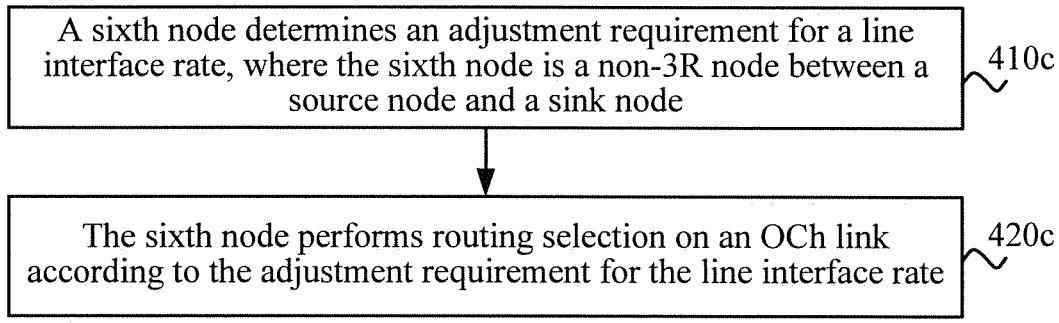
FIG. 4c is a schematic flowchart of a method for adjusting a line interface rate according to another embodiment of the present invention.

FIG. 4c is a schematic flowchart of a method for adjusting a line interface rate according to another embodiment of the present invention.

410c: A sixth node determines an adjustment requirement for a line interface rate, where the sixth node is a non-3R node between a source node and a sink node.

For example, in the scenario in FIG. 2, the sixth node may be node 201b, 201c, or 201e.

420c: The sixth node performs routing selection on an OCh link according to the adjustment requirement for the line interface rate.

To adjust a line interface rate between the source node and the sink node, non-3R nodes between the source node and the sink node need to perform routing selection on an OCh link between them, so as to be prepared for the OCh link adjustment.

Optionally, as an embodiment, in step 410c, the sixth node may receive a notification message from a network management system, where the notification message is used for indicating the adjustment requirement for the line interface rate.

The adjustment requirement for the line interface rate may refer to a requirement for increasing the line interface rate or decreasing the line interface rate.

Optionally, as another embodiment, the notification message may further indicate an adjustment scheme for the OCh link. The adjustment scheme for the OCh link may include: adjusting the number of optical signals in the OCh link; or adjusting a modulation format of an optical signal in the OCh link; or adjusting a spectrum width occupied by an optical signal in the OCh link; or adjusting the number of optical signals in the OCh link, a modulation format of the optical signal, and a spectrum width occupied by the optical signal.

The sixth node may perform routing selection on the OCh link according to the adjustment scheme for the OCh link. For example, if the notification message indicates increasing a spectrum width occupied by an optical signal in the OCh link, the sixth node may perform routing selection on the increased spectrum width.

In the embodiment of the present invention, a non-3R node between a source node and a sink node performs routing selection on an OCh link according to an adjustment requirement for a line interface rate, which can dynamically adjust a line interface rate between the source node and the sink node.

Figure 5C:
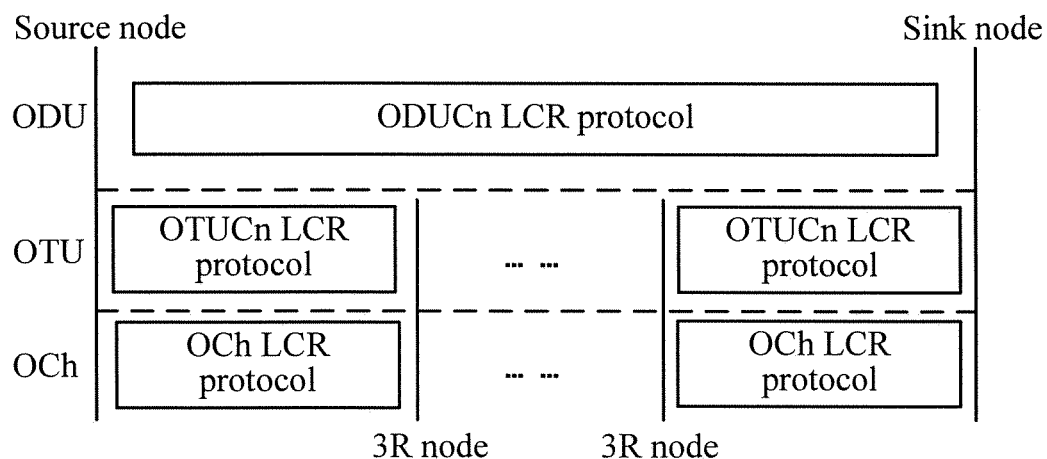
FIG. 5c is a schematic diagram of a hierarchy of LCR protocols according to an embodiment of the present invention.

FIG. 5c is a schematic diagram of a hierarchy of LCR protocols according to an embodiment of the present invention.

Figure 5D:
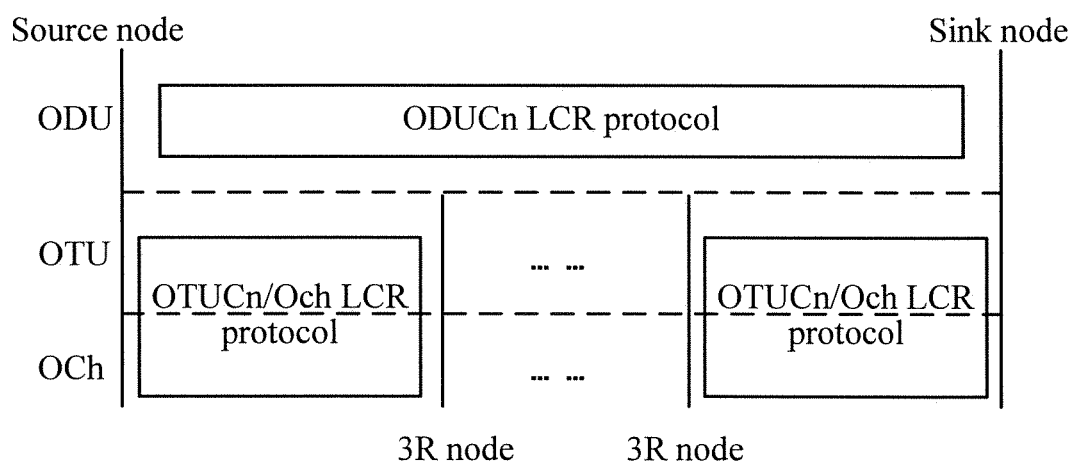
FIG. 5d is a schematic diagram of a hierarchy of LCR protocols according to another embodiment of the present invention.

As shown in FIG. 5c, an ODUCn LCR protocol is defined between a source node and a sink node. Between the source node and a 3R node, between 3R nodes, and between the 3R node and the sink node, an OTUCn LCR protocol and an OCh LCR protocol are defined. It can be seen that to adjust a line interface rate, the source node, the 3R nodes, and the sink node may adjust an OCh layer based on the OCh LCR protocols between them, and adjust an OTU layer based on the OTUCn LCR protocols between them, and the source node and the sink node may adjust an ODU layer based on the ODUCn LCR protocol between them, so as to adjust a line interface rate between the source node and the sink node. FIG. 5d is a schematic diagram of a hierarchy of LCR protocols according to another embodiment of the present invention.

In FIG. 5d, an ODUCn LCR protocol is defined between a source node and a sink node. Between the source node and a 3R node, between 3R nodes, and between the 3R node and the sink node, an OTUCn/OCh LCR protocol is defined. The OTUCn/OCh LCR protocol may refer to a protocol combined by the OTUCn LCR protocol and the OCh LCR protocol shown in FIG. 5c. Then, when a line interface rate is adjusted, the source node, the 3R nodes, and the sink node may adjust an OTU layer and an OCh layer based on such a protocol, that is, the OTUCn/OCh LCR protocol, between them. The source node and the sink node still adjust an ODU layer based on the ODUCn LCR protocol between them, so as to adjust a line interface rate between the source node and the sink node.

The following describes in detail the process of increasing a line interface rate and the process of decreasing a line interface rate with reference to specific examples. It should be noted that, these examples are merely intended to help a person skilled in the art to better understand the embodiments of the present invention rather than to limit the scope of the embodiments of the present invention. The following examples are all described with reference to the scenario shown in FIG. 2.

The process of increasing a line interface rate is described first. FIG. 6a to FIG. 6d describe processes of adjusting an OCh layer, an OTU layer, and an ODU layer, respectively. It is assumed that, in the scenario in FIG. 2, an OTUC4 signal is transported between node 201a and node 201g. Now, the OTUC4 signal needs to be adjusted to an OTUC6 signal. The OTUC4 signal and the OTUC6 signal are a same signal, where a rate of the OTUC6 signal is higher than a rate of the OTUC4 signal. For ease of description, the OTUC4 and the OTUC6 are uniformly expressed as OTUCn.n in the following.

Figure 6A:
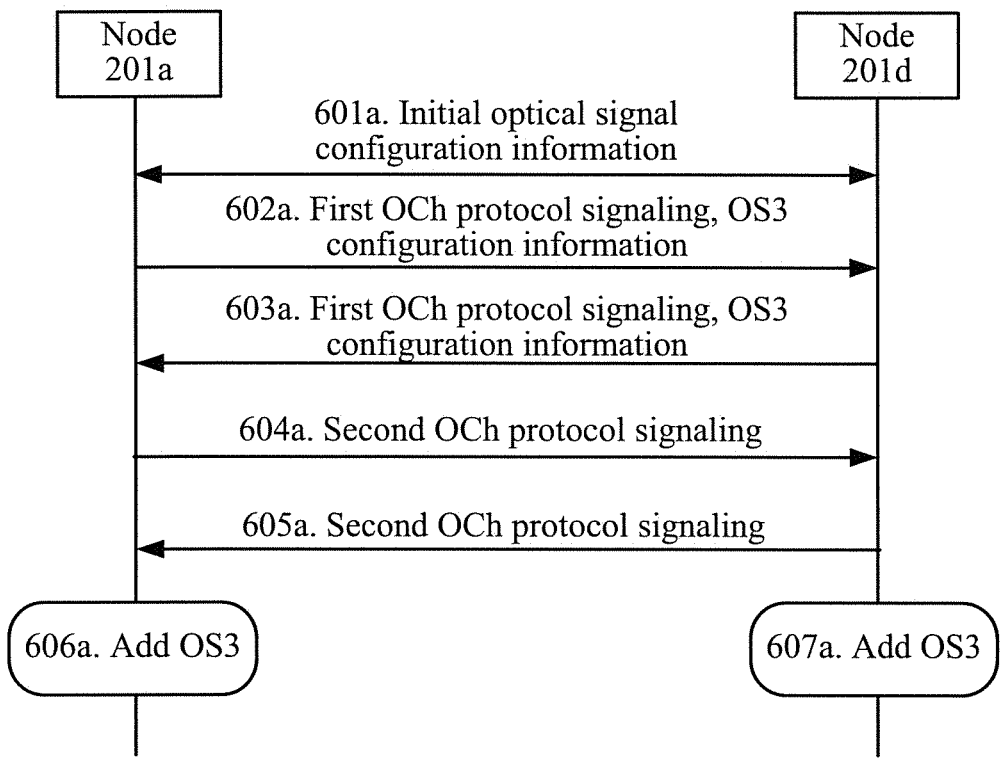
FIG. 6a is a schematic flowchart of a process of increasing a transport bandwidth of an OCh link according to an embodiment of the present invention.

FIG. 6a is a schematic flowchart of a process of increasing a transport bandwidth of an OCh link according to an embodiment of the present invention. In FIG. 6a, a process of increasing a transport bandwidth of an OCh link by increasing the number of optical signals is described.

In FIG. 6a, the OCh link between node 201a and node 201d in FIG. 2 is used as an example for description. It is assumed that, OTLCn.n #1 to OTLCn.n #4 in an OTUCn.n link are initially transported by OS1 and OS2 on the OCh link. Each OS corresponds to 2 SCs, OS1 corresponds to SC1 and SC2, and OS2 corresponds to SC3 and SC4. To increase the transport bandwidth of the OCh link, OS3 is added into the OCh link. In FIG. 6a, node 201a may be the first node, and node 201d may be the second node.

601a: In an initial state, transport initial optical signal configuration information between node 201a and node 201d, so as to normally transport OTLCn.n #1 to OTLCn.n #4 in the OTUCn.n link.

For example, the initial optical signal configuration information may be transported between node 201a and node 201d by using an OSC. An example of the initial optical signal configuration information may be shown by Table 2.

TABLE 2

| Initial optical signal configuration information ||||||
|---|---|---|---|---|---|
| Optical signal/ corresponding subcarrier list || Bit rate | Modulation format | Central frequency/spectrum width | Identifier of a borne OTUCn link | Serial number of a lane of the OTUCn link |
| OS1 | SC1 | 100 G | 16 QAM | 193.100 THz/25 GHz | #a | OTLCn.n #1 |
|  | SC2 | 100 G | 16 QAM | 193.125 THz/25 GHz | #a | OTLCn.n #2 |
| OS2 | SC3 | 100 G | 16 QAM | 193.150 THz/25 GHz | #a | OTLCn.n #3 |
|  | SC4 | 100 G | 16 QAM | 193.175 THz/25 GHz | #a | OTLCn.n #4 |

602a: Node 201a sends first OCh protocol signaling and OS3 configuration information to node 201d, where the first OCh protocol signaling is used for requesting adding OS3 into the OCh link.

603a: Node 201d sends the first OCh protocol signaling and the OS3 configuration information to node 201a.

Content of the first OCh protocol signaling may be as follows: {OChCTRL=ADD, OChGID=#a, OChSQ=#OS3 [SC5, SC6], OChGS=0}, where OChCTRL=ADD may indicate adding OS3 into the OCh link.

The OS3 configuration information may be shown by Table 3.

TABLE 3

OS3 configuration information

| Optical signal/ corresponding subcarrier list | | Bit rate | Modulation format | Central frequency/spectrum width | Identifier of a borne OTUCn link | Serial number of a lane of the OTUCn link |
|---|---|---|---|---|---|---|
| OS3 | SC5 | 100 G | 16 QAM | 193.200 THz/25 GHz | #a | OTLCn.n #5 |
|  | SC6 | 100 G | 16 QAM | 193.225 THz/25 GHz | #a | OTLCn.n #6 |

Herein, an order of performing step 602a and step 603a is not limited. For example, step 602a and step 603a may be performed synchronously, or step 603a may be performed first, and then step 602a is performed.

604a: In a case in which it is determined that the OS3 configuration information of node 201a is consistent with the OS3 configuration information received in step 603a, node 201a sends second OCh protocol signaling to node 201d, where the second OCh protocol signaling is used for indicating that adding OS3 into the OCh link is agreed.

605a: In a case in which it is determined that the OS3 configuration information of node 201d is consistent with the OS3 configuration information received in step 602a, node 201d sends the second OCh protocol signaling to node 201a.

Content of the second OCh protocol signaling may be as follows: {OChCTRL=ADD, OChGID=#a, OChSQ=OS3 [SC5, SS6], OChGS=1}.

Herein, an order of performing step 604a and step 605a is not limited. For example, step 604a and step 605a may be performed synchronously, or step 605a may be performed first, and then step 604a is performed.

606a: After receiving the second OCh protocol signaling of node 201d, node 201a adds OS3 into the OCh link.

607a: After receiving the second OCh protocol signaling of node 201a, node 201d adds OS3 into the OCh link.

Herein, an order of performing step 606a and step 607a is not limited. For example, step 606a and step 607a may be performed synchronously, or step 607a may be performed first, and then step 606a is performed.

After step 607a, node 201a and node 201d may both cancel transport of the OCh protocol signaling.

In this way, the newly added OS3 is used for transporting OTLCn.n #5 and OTLCn.n #6 that are to be added, that is, SC5 and SC6 in OS3 are used for transporting OTLCn.n #5 and OTLCn.n #6 that are to be added.

It should be noted that, in the scenario in FIG. 2, each two adjacent 3R nodes need to increase a transport bandwidth of an OCh link between them, so that a transport bandwidth of each section of OCh link between node 201a and node 201g is increased. A process of increasing a transport bandwidth of an OCh link between other nodes is similar to the interaction process between node 201a and node 201d, and details are not repeatedly described herein.

In addition, before the transport bandwidth of the OCh link is increased, other intermediate nodes that are non-3R nodes may perform routing selection on the OCh link, for example, node 201b, node 201c, and node 201e may receive a notification message from a network management system, so as to determine to increase the line interface rate, and then perform routing selection on the OCh link.

Figure 6B:
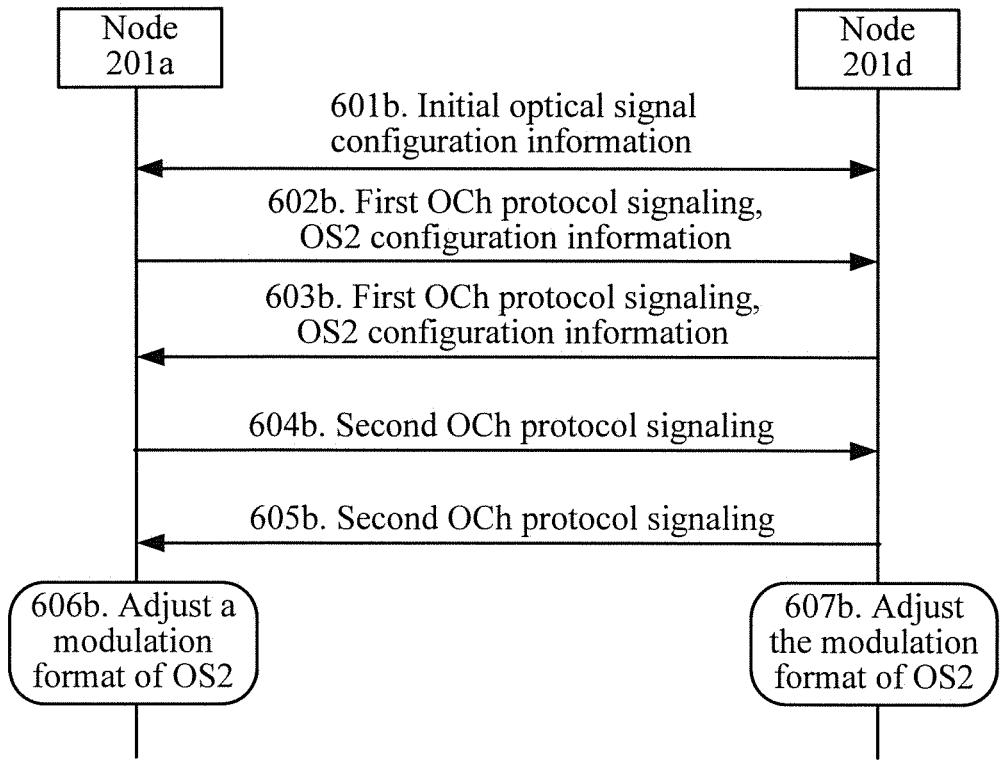
FIG. 6b is a schematic flowchart of a process of increasing a transport bandwidth of an OCh link according to another embodiment of the present invention.

FIG. 6b is a schematic flowchart of a process of increasing a transport bandwidth of an OCh link according to another embodiment of the present invention. In FIG. 6b, a process of increasing a transport bandwidth of an OCh link by increasing a modulation format of an optical signal is described.

In FIG. 6b, the OCh link between node 201a and node 201d in FIG. 2 is used as an example for description. It is assumed that, OTLCn.n #1 to OTLCn.n #4 in an OTUCn.n link are initially transported by OS1 and OS2 on the OCh link. Each OS corresponds to 2 SCs, OS1 corresponds to SC1 and SC2, and OS2 corresponds to SC3 and SC4. To increase the transport bandwidth of the OCh link, a modulation format of OS2 is adjusted, that is, modulation formats of SC3 and SC4 are adjusted. In FIG. 6b, node 201a may be the first node, and node 201d may be the second node.

Step 601b is similar to step 601a in FIG. 6a, and details are not repeatedly described.

602b: Node 201a sends first OCh protocol signaling and OS2 configuration information to node 201d, where the first OCh protocol signaling is used for requesting adjusting the modulation format of OS2.

603b: Node 201d sends the first OCh protocol signaling and the OS2 configuration information to node 201a.

Herein, an order of performing step 602b and step 603b is not limited. For example, step 602b and step 603b may be performed synchronously, or step 603b may be performed first, and then step 602b is performed.

Content of the first OCh protocol signaling may be as follows: {OChCTRL=ADD, OChGID-#a, OChSQ-#OS2 [SC3, SC4], OChGS=0}.

The OS2 configuration information may be shown by Table 4. As can be seen from Table 4, node 201a and node 201d need to adjust both the modulation format of SC3 and the modulation format of SC4 from 16QAM (16 Quadrature Amplitude Modulation, quadrature amplitude modulation) to PM-16QAM.

TABLE 4

OS2 configuration information

| Optical signal/corresponding subcarrier list | | Bit rate | Modulation format | Central frequency/spectrum width | Identifier of a borne OTUCn link | Serial number of a lane of the OTUCn link |
|---|---|---|---|---|---|---|
| OS2 | SC3 | 200 G | PM-16 QAM | 193.150 THz/25 GHz | #a | OTLCn.n #3 OTLCn.n #5 |
| | SC4 | 200 G | PM-16 QAM | 193.175 THz/25 GHz | #a | OTLCn.n #4 OTLCn.n #6 |

604b: In a case in which it is determined that the OS2 configuration information of node 201a is consistent with the OS2 configuration information received in step 603b, node 201a sends second OCh protocol signaling to node 201d, where the second OCh protocol signaling is used for indicating that adjusting the modulation format of OS2 is agreed.

605b: In a case in which it is determined that the OS2 configuration information of node 201d is consistent with the OS2 configuration information received in step 602b, node 201d sends the second OCh protocol signaling to node 201a.

Herein, an order of performing step 604b and step 605b is not limited. For example, step 604b and step 605b may be performed synchronously, or step 605b may be performed first, and then step 604b is performed.

Content of the second OCh protocol signaling may be as follows: {OChCTRL=ADD, OChGID=#a, OChSQ=#OS2 [SC3, SS4], OChGS=1}.

606b: After receiving the second OCh protocol signaling of node 201d, node 201a adjusts the modulation format of OS2.

607b: After receiving the second OCh protocol signaling of node 201a, node 201d adjusts the modulation format of OS2.

Herein, an order of performing step 606b and step 607b is not limited. For example, step 606b and step 607b may be performed synchronously, or step 607b may be performed first, and then step 606b is performed.

After step 607b, node 201a and node 201d may both cancel transport of the OCh protocol signaling.

In this way, the adjusted OS2 may transport OTLCn.n #5 and OTLCn.n #6 that are to be added, that is, the adjusted SC3 and SC4 may transport OTLCn.n #5 and OTLCn.n #6 that are to be added.

It should be understood that, the transport bandwidth of the OCh link may also be increased by combining the processes in FIG. 6a and FIG. 6b. That is, the transport bandwidth of the OCh link may also be increased by increasing the number of optical signals and adjusting a modulation format of the optical signal. To avoid repetition, details are not repeatedly described herein. In addition, the transport bandwidth of the OCh link may also be increased by increasing a spectrum width occupied by an optical signal, or by increasing the number of optical signals, and adjusting a modulation format of the optical signal and a spectrum width occupied by the optical signal.

Figure 6C:
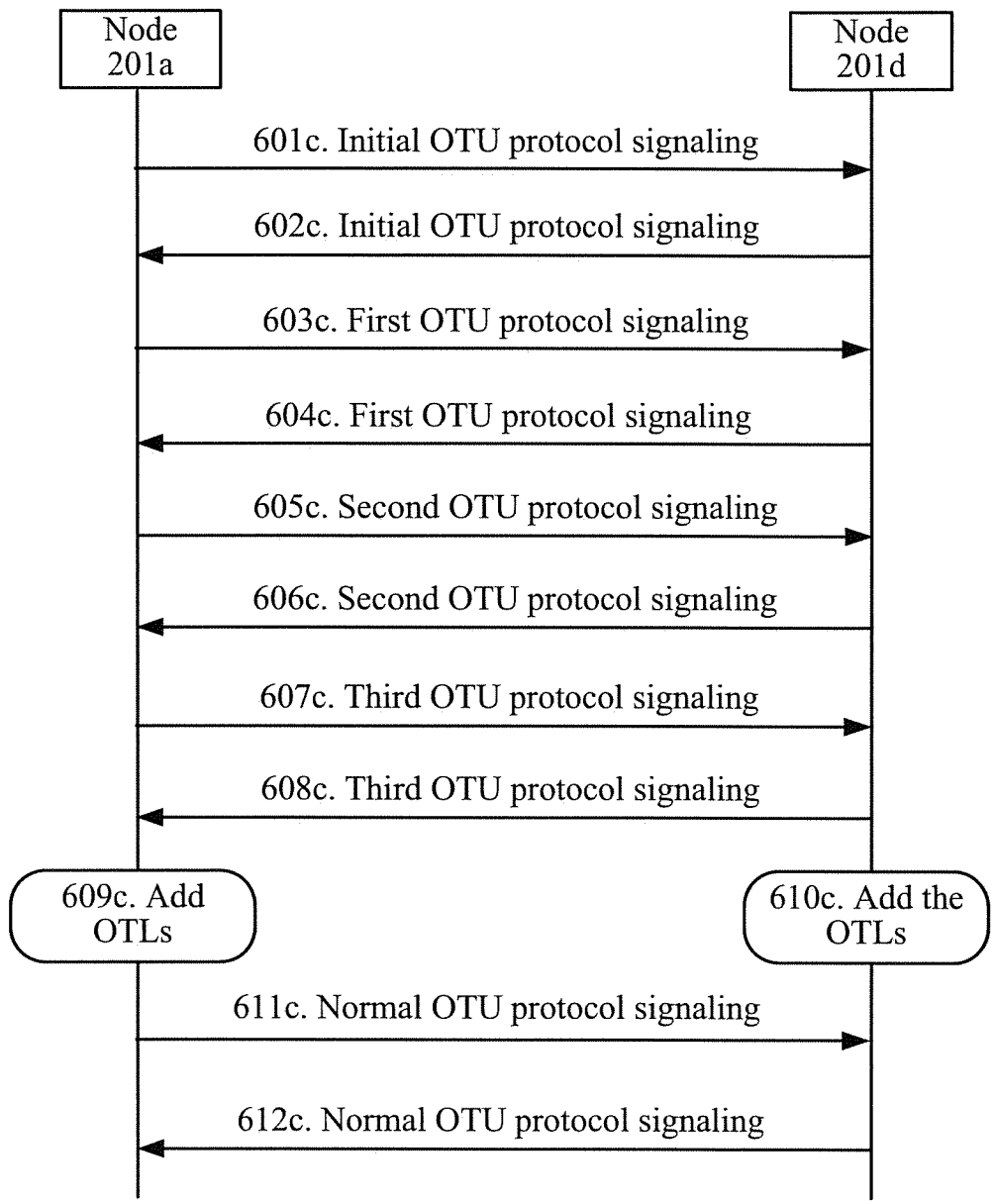
FIG. 6c is a schematic flowchart of a process of increasing the number of OTLs in an OTUCn link according to an embodiment of the present invention.

FIG. 6c is a schematic flowchart of a process of increasing the number of OTLs in an OTUCn link according to an embodiment of the present invention.

In FIG. 6c, the OTUCn link between node 201a and node 201d in FIG. 2 is used as an example for description. The process in FIG. 6c is performed after the process in FIG. 6a or FIG. 6b. In FIG. 6c, the following process is described: 2 OTLs, that is, OTLCn.n #5 and OTLCn.n #6, are added into the OTUCn link.

601c: Node 201a sends initial OTU protocol signaling to node 201d, where the initial OTU protocol signaling is used for indicating initial states of OTLCn.n #5 and OTLCn.n #6.

602c: Node 201d sends the initial OTU protocol signaling to node 201a.

In the initial states, OTLCn.n #5 and OTLCn.n #6 are both idle lanes. Node 201a and node 201d may exchange the initial states of OTLCn.n #5 and OTLCn.n #6. The initial OTU protocol signaling may include two parts of information, and the two parts of information may be transported by using OTLCn.n #5 and OTLCn.n #6, respectively. Content of the initial OTU protocol signaling may be as follows: {OTLCTRL=IDLE, OTLGID=#f, OTLSQ=#ff, OTLGS=0} and {OTLCTRL=IDLE, OTLGID=#f, OTLSQ=#ff, OTLGS=0}.

Herein, an order of performing step 601c and step 602c is not limited. For example, step 601c and step 602c may be performed synchronously, or step 602c may be performed first, and then step 601c is performed.

603c: Node 201a sends first OTU protocol signaling to node 201d, where the first OTU protocol signaling is used for requesting adding OTLCn.n #5 and OTLCn.n #6 into the OTUCn link.

The first OTU protocol signaling may include information of OTLCn.n #5 and OTLCn.n #6, for example, may include the number of OTLs to be added, a serial number of the OTL, and the like.

604c: Node 201d sends the first OTU protocol signaling to node 201a.

After a transport bandwidth of each section of OCh link between node 201a and node 201d is increased, node 201a and node 201d initiate, to each other, a request for adding an OTL.

The first OTU protocol signaling may include two parts of information, and the two parts of information may be transported on OTLCn.n #5 and OTLCn.n #6, respectively. Content of the first OTU protocol signaling may be as follows: {OTLCTRL=ADD, OTLGID=#a, OTLSQ=#5, OTLGS=0} and {OTLCTRL=ADD, OTLGID=#a, OTLSQ=#6, OTLGS=0}.

Herein, an order of performing step 603c and step 604c is not limited. For example, step 603c and step 604c may be performed synchronously, or step 604c may be performed first, and then step 603c is performed.

605c: Node 201a sends second OTU protocol signaling to node 201d, where the second OTU protocol signaling is used for indicating that adding OTLCn.n #5 and OTLCn.n #6 into the OTUCn link is agreed.

Node 201a may determine whether the information, which is carried in the first OTU protocol signaling in step 604c, of OTLCn.n #5 and OTLCn.n #6 is correct, and after determining that the information is correct, send the second OTU protocol signaling to node 201d.

606c: Node 201d sends the second OTU protocol signaling to node 201a.

Node 201d may determine whether the information, which is carried in the first OTU protocol signaling in step 603c, of OTLCn.n #5 and OTLCn.n #6 is correct, and after determining that the information is correct, send the second OTU protocol signaling to node 201a.

The second OTU protocol signaling may include two parts of information, and the two parts of information are transported by using OTLCn.n #5 and OTLCn.n #6, respectively. Content of the second OTU protocol signaling may be as follows: {OTLCTRL=ADD, OTLGID=#a, OTLSQ=#5, OTLGS=1} and {OTLCTRL=ADD, OTLGID=#a, OTLSQ=#6, OTLGS=1}.

Herein, an order of performing step 605c and step 606c is not limited. For example, step 605c and step 606c may be performed synchronously, or step 606c may be performed first, and then step 605c is performed.

607c: After receiving the second OTU protocol signaling from node 201d, node 201a sends third OTU protocol signaling to node 201d, where the third OTU protocol signaling is used for indicating adding OTLCn.n #5 and OTLCn.n #6 into the OTUCn link.

608c: After receiving the second OTU protocol signaling from node 201a, node 201d sends the third OTU protocol signaling to node 201a.

The third OTU protocol signaling may include two parts of information, and the two parts of information may be transported by using OTLCn.n #5 and OTLCn.n #6, respectively. Content of the third OTU protocol signaling may be as follows: {OTLCTRL=NORM, OTLGID=#a, OTLSQ=#5, OTLGS=1} and {OTLCTRL=NORM, OTLGID=#a, OTLSQ=#6, OTLGS=1}.

Herein, an order of performing step 607c and step 608c is not limited. For example, step 607c and step 608c may be performed synchronously, or step 608c may be performed first, and then step 607c is performed.

609c: After receiving the third OTU protocol signaling from node 201d, node 201a adds OTLCn.n #5 and OTLCn.n #6 into the OTUCn link.

For example, node 201a combines OTLCn.n #5 and OTLCn.n #6 into an OTUCn.n link, that is, adds OTLCn.n #5 and OTLCn.n #6 in an operation of aligning OTLs of the OTUCn.n link.

610c: After receiving the third OTU protocol signaling from node 201a, node 201d adds OTLCn.n #5 and OTLCn.n #6 into the OTUCn link.

An order of performing step 609c and step 610c is not limited. For example, step 609c and step 610c may be performed synchronously, or step 610c may be performed first, and then step 609c is performed.

611c: Node 201a sends normal OTU protocol signaling to node 201d, where the normal OTU protocol signaling is used for indicating that the OTLCn.n #5 and OTLCn.n #6 are added into the OTUCn link.

612c: Node 201d sends the normal OTU protocol signaling to node 201a.

An order of performing step 611c and step 612c is not limited.

The normal OTU protocol signaling may include two parts of information, and the two parts of information may be transported by using OTLCn.n #5 and OTLCn.n #6, respectively. Content of the normal OTU protocol signaling may be as follows: {OTLCTRL=NORM, OTLGID=#a, OTLSQ=#5, OTLGS=0} and {OTLCTRL=NORM, OTLGID=#a, OTLSQ=#6, OTLGS=0}.

In addition, node 201d and node 201f may add OTLCn.n #5 and OTLCn.n #6 into an OTUCn link between them, and node 201f and node 201g may add OTLCn.n #5 and OTLCn.n #6 into an OTUCn link between them, so that OTLCn.n #5 and OTLCn.n #6 are added into each section of OTUCn link between node 201a and node 201g. A specific process is similar to the process in FIG. 6c, and details are not repeatedly described.

Figure 6D:
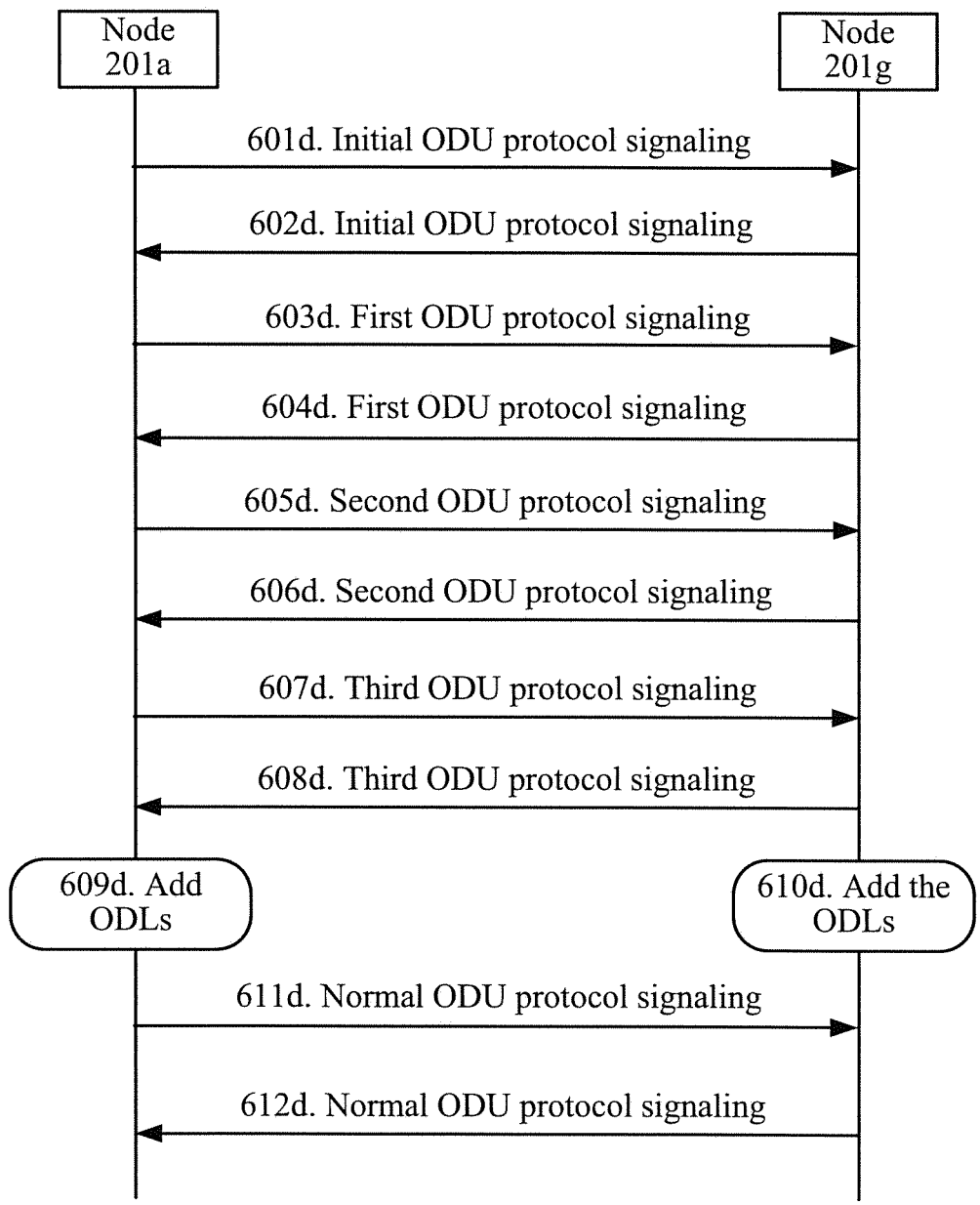
FIG. 6d is a schematic flowchart of a process of increasing the number of ODLs in an ODUCn link according to an embodiment of the present invention.

FIG. 6d is a schematic flowchart of a process of increasing the number of ODLs in an ODUCn link according to an embodiment of the present invention.

In FIG. 6d, the ODUCn link between node 201a and node 201g in FIG. 2 is used as an example for description. The process in FIG. 6d is performed after the process in FIG. 6c.

In FIG. 6d, the following process is described: 2 ODLs, that is, ODLCn.n #5 and ODLCn.n #6, are added into the ODUCn link. In FIG. 6d, node 201a may be the first node, and node 201g may be the third node. Node 201a may also be the third node, and node 201g may also be the first node.

601d: Node 201a sends initial ODU protocol signaling to node 201g, where the initial ODU protocol signaling is used for indicating initial states of ODLCn.n #5 and ODLCn.n #6.

602d: Node 201g sends the initial ODU protocol signaling to node 201a.

Herein, an order of performing step 601d and step 602d is not limited.

In the initial states, ODLCn.n #5 and ODLCn.n #6 are both idle lanes. Node 201a and node 201g may exchange the initial states of ODLCn.n #5 and ODLCn.n #6. The initial ODU protocol signaling may include two parts of information, and the two parts of information may be transported by using ODLCn.n #5 and ODLCn.n #6, respectively. Content of the initial ODU protocol signaling may be as follows: {ODLCTRL=IDLE, ODLGID=#f, ODLSQ=#ff, ODLGS=0} and {ODLCTRL=IDLE, ODLGID=#f, ODLSQ=#ff, ODLGS=0}.

603d: Node 201a sends first ODU protocol signaling to node 201g, where the first ODU protocol signaling is used for requesting adding ODLCn.n #5 and ODLCn.n #6 into the ODUCn link.

The first ODU protocol signaling may include information of ODLCn.n #5 and ODLCn.n #6, for example, may include the number of ODLs to be added, a serial number of the ODL, and the like.

604d: Node 201g sends the first ODU protocol signaling to node 201a.

After the OTLs are added into each section of OTUCn link between node 201a and node 201g, node 201a and node 201g initiate, to each other, a request for adding an ODL.

The first ODU protocol signaling may include two parts of information, and the two parts of information may be transported on ODLCn.n #5 and ODLCn.n #6, respectively. Content of the first ODU protocol signaling may be as follows: {ODLCTRL=ADD, ODLGID=#a, ODLSQ=#5, ODLGS=0} and {ODLCTRL=ADD, ODLGID=#a, ODLSQ=#6, ODLGS=0}.

Herein, an order of performing step 603d and step 604d is not limited.

605d: Node 201a sends second ODU protocol signaling to node 201g, where the second ODU protocol signaling is used for indicating that adding ODLCn.n #5 and ODLCn.n #6 into the ODUCn link is agreed.

Node 201a may determine whether the information, which is carried in the first ODU protocol signaling in step 604d, of ODLCn.n #5 and ODLCn.n #6 is correct, and after determining that the information is correct, send the second ODU protocol signaling to node 201g.

606d: Node 201g sends the second ODU protocol signaling to node 201a.

Node 201g may determine whether the information, which is carried in the first ODU protocol signaling in step 603d, of ODLCn.n #5 and ODLCn.n #6 is correct, and after determining that the information is correct, send the second ODU protocol signaling to node 201a.

The second ODU protocol signaling may include two parts of information, and the two parts of information may be transported by using ODLCn.n #5 and ODLCn.n #6, respectively. Content of the second ODU protocol signaling may be as follows: {ODLCTRL=ADD, ODLGID=#a, ODLSQ=#5, ODLGS=1} and {ODLCTRL=ADD, ODLGID=#a, ODLSQ=#6, ODLGS=1}.

Herein, an order of performing step 605d and step 606d is not limited.

607d: After receiving the second ODU protocol signaling from node 201g, node 201a sends third ODU protocol signaling to node 201g, where the third ODU protocol signaling is used for indicating adding ODLCn.n #5 and ODLCn.n #6 into the ODUCn link.

608d: After receiving the second ODU protocol signaling from node 201a, node 201g sends the third ODU protocol signaling to node 201a.

Herein, an order of performing step 607d and step 608d is not limited.

The third ODU protocol signaling may include two parts of information, and the two parts of information may be transported by using ODLCn.n #5 and ODLCn.n #6, respectively. Content of the third ODU protocol signaling may be as follows: {ODLCTRL=NORM, ODLGID=#a, ODLSQ=#5, ODLGS=1} and {ODLCTRL=NORM, ODLGID=#a, ODLSQ=#6, ODLGS=1}.

609d: After receiving the third ODU protocol signaling from node 201g, node 201a adds ODLCn.n #5 and ODLCn.n #6 into the ODUCn link.

For example, node 201a combines ODLCn.n #5 and ODLCn.n #6 into an ODUCn.n link, that is, adds ODLCn.n #5 and ODLCn.n #6 in an operation of aligning ODLs of the ODUCn.n link.

610d: After receiving the third ODU protocol signaling from node 201a, node 201g adds ODLCn.n #5 and ODLCn.n #6 into the ODUCn link.

Herein, an order of performing step 609c and step 610c is not limited.

611d: Node 201a sends normal ODU protocol signaling to node 201g, where the normal ODU protocol signaling is used for indicating that ODLCn.n #5 and ODLCn.n #6 are added into the ODUCn link.

612d: Node 201g sends the normal ODU protocol signaling to node 201a.

The normal ODU protocol signaling may include two parts of information, and the two parts of information may be transported by using ODLCn.n #5 and ODLCn.n #6, respectively. Content of the normal ODU protocol signaling may be as follows: {ODLCTRL=NORM, ODLGID=#a, ODLSQ=#5, ODLGS=0} and {ODLCTRL=NORM, ODLGID=#a, ODLSQ=#6, ODLGS=0}.

In addition, after step 612d, node 201a and node 201g may further increase, according to the HAO protocol, a bandwidth occupied by a lower-order ODU service on the ODUCn link.

It can be known from the foregoing that, by using the processes in FIG. 6a, FIG. 6c, and FIG. 6d, or by using the processes in FIG. 6b, FIG. 6c, and FIG. 6d, a line interface rate between node 201a and node 201g is increased.

Figure 7A:
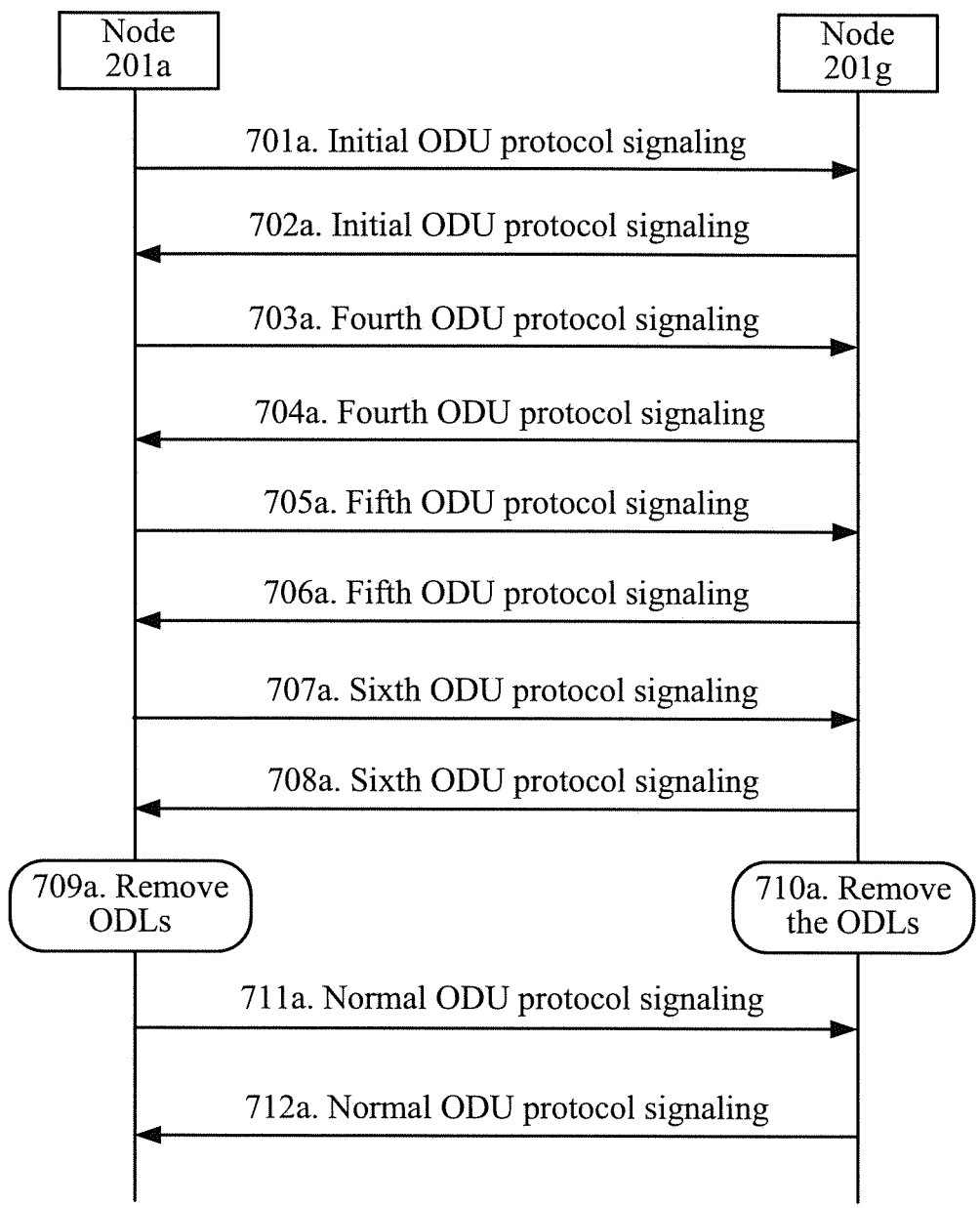
FIG. 7a is a schematic flowchart of a process of decreasing the number of ODLs in an ODUCn link according to an embodiment of the present invention.
Figure 7B:
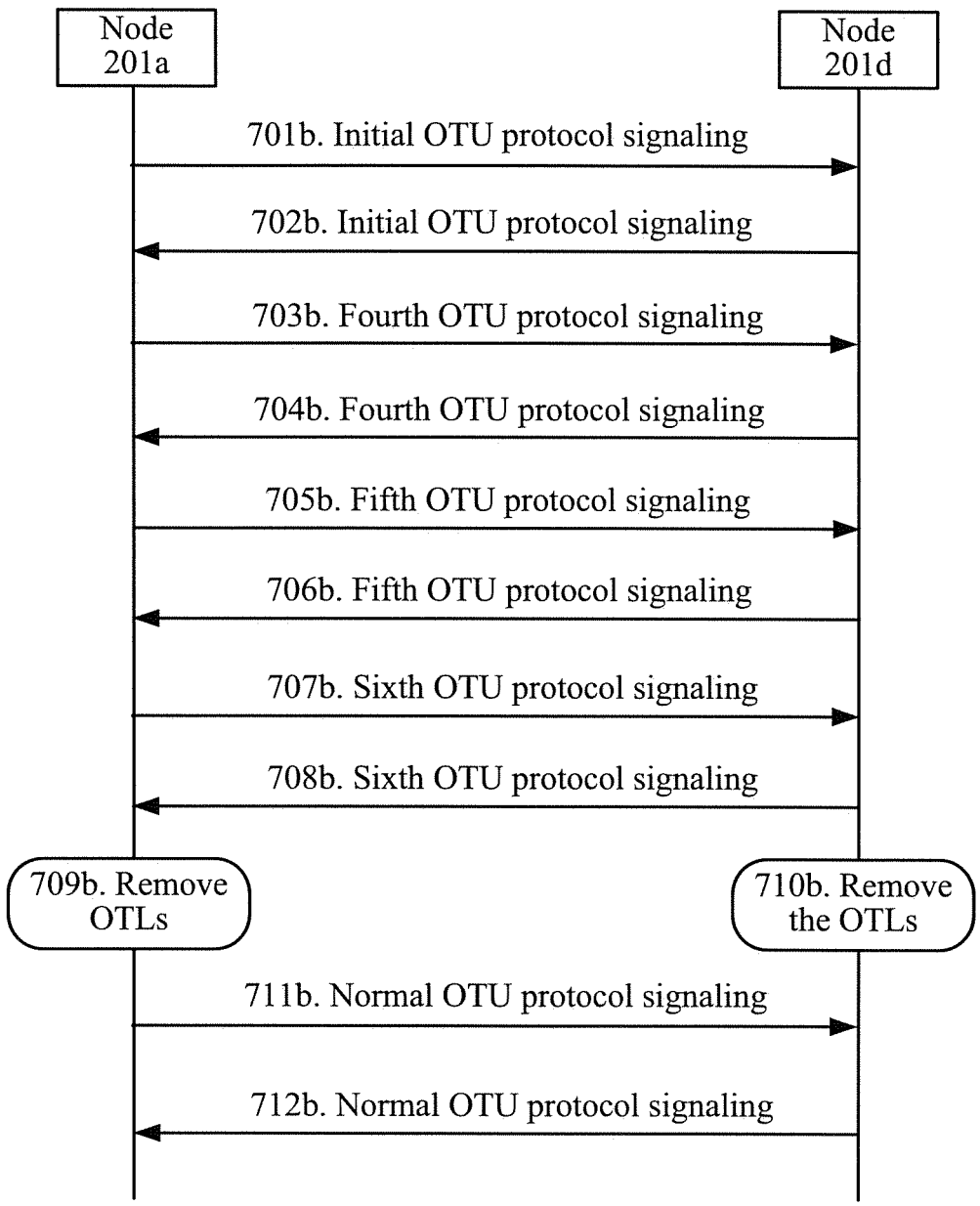
FIG. 7b is a schematic flowchart of a process of decreasing the number of OTLs in an OTUCn link according to an embodiment of the present invention.
Figure 7C:
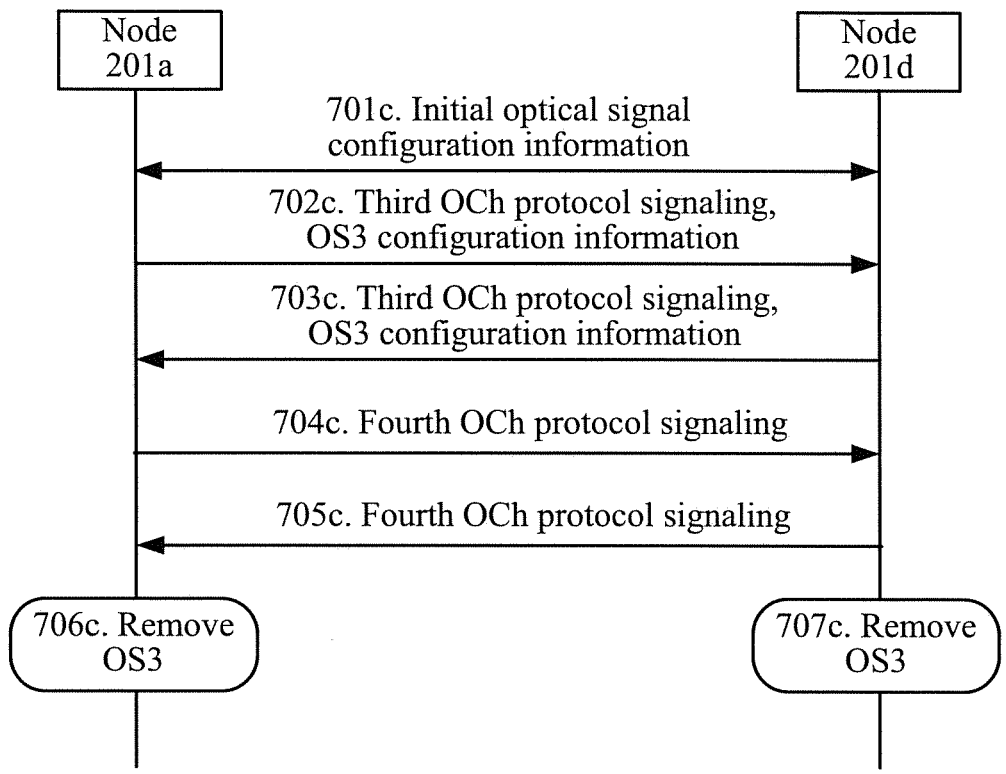
FIG. 7c is a schematic flowchart of a process of decreasing a transport bandwidth of an OCh link according to an embodiment of the present invention.

Next, a process of decreasing a line interface rate is described. FIG. 7a to FIG. 7c describe processes of adjusting an OCh layer, an OTU layer, and an ODU layer, respectively. It is assumed that, in the scenario in FIG. 2, an OTUC6 signal is transported between node 201a and node 201g. Now, the OTUC6 signal needs to be adjusted to an OTUC4 signal. The OTUC6 signal and the OTUC4 signal are a same signal, and the only difference lies in rates of the two signals. For ease of description, the OTUC4 and the OTUC6 are uniformly expressed as OTUCn.n in the following.

FIG. 7a is a schematic flowchart of a process of decreasing the number of ODLs in an ODUCn link according to an embodiment of the present invention.

In FIG. 7a, the ODUCn link between node 201a and node 201g in FIG. 2 is used as an example for description. In FIG. 7a, the following process is described: 2 ODLs, that is, ODLCn.n #5 and ODLCn.n #6, are removed from the ODUCn link. In FIG. 7a, node 201a may be the first node, and node 201g may be the third node. Alternatively, node 201a may also be the third node, and node 201g may also be the first node.

Before step 701a, node 201a and node 201g may decrease, according to the HAO protocol, a bandwidth occupied by a lower-order ODU service on the ODUCn link, so that valid data is no longer borne on ODLCn.n #5 and ODLCn.n #6 that are to be removed.

701a: Node 201a sends initial ODU protocol signaling to node 201g, where the initial ODU protocol signaling is used for indicating initial states of ODLCn.n #5 and ODLCn.n #6.

702a: Node 201g sends the initial ODU protocol signaling to node 201a.

Herein, an order of performing step 701a and step 702a is not limited.

In the initial states, ODLCn.n #5 and ODLCn.n #6 are both available lanes. Node 201a and node 201g may exchange the initial states of ODLCn.n #5 and ODLCn.n #6. The initial ODU protocol signaling may include two parts of information, and the two parts of information may be transported by using ODLCn.n #5 and ODLCn.n #6, respectively. Content of the initial ODU protocol signaling may be as follows: {ODLCTRL=NORM, ODLGID=#a, ODLSQ=#5, ODLGS=0} and {ODLCTRL=NORM, ODLGID=#a, ODLSQ=#6, ODLGS=0}.

703a: Node 201a sends fourth ODU protocol signaling to node 201g, where the fourth ODU protocol signaling is used for requesting removing ODLCn.n #5 and ODLCn.n #6 from the ODUCn link.

The fourth ODU protocol signaling may include information of ODLCn.n #5 and ODLCn.n #6, for example, may include the number of ODLs to be removed, a serial number of the ODL, and the like.

704a: Node 201g sends the fourth ODU protocol signaling to node 201a.

The fourth ODU protocol signaling may include two parts of information, and the two parts of information may be transported by using ODLCn.n #5 and ODLCn.n #6, respectively. Content of the fourth ODU protocol signaling may be as follows: {ODLCTRL=REMOVE, ODLGID=#a, ODLSQ=#5, ODLGS=0} and {ODLCTRL=REMOVE, ODLGID=#a, ODLSQ=#6, ODLGS=0}.

Herein, an order of performing step 703a and step 704a is not limited.

705a: Node 201a sends fifth ODU protocol signaling to node 201g, where the fifth ODU protocol signaling is used for indicating that removing ODLCn.n #5 and ODLCn.n #6 from the ODUCn link is agreed.

For example, node 201a may determine the information, which is carried in the received fourth ODU protocol signaling, of ODLCn.n #5 and ODLCn.n #6, and after determining that the information is correct, send the fifth ODU protocol signaling to node 201g.

706a: Node 201g sends the fifth ODU protocol signaling to node 201a.

For example, node 201g may also determine the information, which is carried in the received fourth ODU protocol signaling, of ODLCn.n #5 and ODLCn.n #6, and after determining that the information is correct, send the fifth ODU protocol signaling to node 201a.

Content of the fifth ODU protocol signaling may be as follows: {ODLCTRL=REMOVE, ODLGID=#a, ODLSQ=#5, ODLGS=1} and {ODLCTRL=REMOVE, ODLGID=#a, ODLSQ=#6, ODLGS=1}.

707a: Node 201a sends sixth ODU protocol signaling to node 201g, where the sixth ODU protocol signaling is used for indicating removing ODLCn.n #5 and ODLCn.n #6 from the ODUCn link.

708a: Node 201g sends the sixth ODU protocol signaling to node 201a.

Content of the sixth ODU protocol signaling may be as follows: {ODLCTRL=IDLE, ODLGID=#a, ODLSQ=#5, ODLGS=1} and {ODLCTRL=IDLE, ODLGID=#a, ODLSQ=#6, ODLGS=1}.

709a: After receiving the sixth ODU protocol signaling from node 201g, node 201a removes ODLCn.n #5 and ODLCn.n #6 from the ODUCn link.

For example, node 201a may remove ODLCn.n #5 and ODLCn.n #6 in an operation of aligning ODLs, and then align and recombine remaining available ODLs.

710a: After receiving the sixth ODU protocol signaling from node 201a, node 201g removes ODLCn.n #5 and ODLCn.n #6 from the ODUCn link.

For example, node 201g may remove ODLCn.n #5 and ODLCn.n #6 in an operation of aligning ODLs, and then align and recombine remaining available ODLs.

711a: Node 201a sends normal ODU protocol signaling to node 201g, where the normal ODU protocol signaling is used for indicating that ODLCn.n #5 and ODLCn.n #6 are removed from the ODUCn link.

712a: Node 201g sends the normal ODU protocol signaling to node 201a.

Content of the normal ODU protocol signaling may be as follows: {ODLCTRL=IDLE, ODLGID=#a, ODLSQ=#5, ODLGS=0} and {ODLCTRL=IDLE, ODLGID=#a, ODLSQ=#6, ODLGS=0}.

FIG. 7b is a schematic flowchart of a process of decreasing the number of OTLs in an OTUCn link according to an embodiment of the present invention.

In FIG. 7b, the OTUCn link between node 201a and node 201d in FIG. 2 is used as an example for description. The process in FIG. 7b is performed after the process in FIG. 7a. In FIG. 7b, the following process is described: 2 OTLs, that is, OTLCn.n #5 and OTLCn.n #6, are removed from the OTUCn link. In FIG. 7b, node 201a may be the first node, and node 201d may be the second node.

701b: Node 201a sends initial OTU protocol signaling to node 201d, where the initial OTU protocol signaling is used for indicating initial states of OTLCn.n #5 and OTLCn.n #6.

702c: Node 201d sends the initial OTU protocol signaling to node 201a.

In the initial states, OTLCn.n #5 and OTLCn.n #6 are both available lanes. Node 201a and node 201d may exchange the initial states of OTLCn.n #5 and OTLCn.n #6. The initial OTU protocol signaling may include two parts of information, and the two parts of information may be transported by using OTLCn.n #5 and OTLCn.n #6, respectively. Content of the initial OTU protocol signaling may be as follows: {OTLCTRL=NORM, OTLGID=#a, OTLSQ=#5, OTLGS=0} and {OTLCTRL=NORM, OTLSQ=#6, OTLGS=0}.

Herein, an order of performing step 701b and step 702b is not limited.

703b: Node 201a sends fourth OTU protocol signaling to node 201d, where the fourth OTU protocol signaling is used for requesting removing OTLCn.n #5 and OTLCn.n #6 from the OTUCn link.

The fourth OTU protocol signaling may include information of OTLCn.n #5 and OTLCn.n #6, for example, may include the number of OTLs to be removed, a serial number of the OTL, and the like.

704b: Node 201d sends the fourth OTU protocol signaling to node 201a.

After ODLCn.n #5 and ODLCn.n #6 in the ODUCn link between node 201a and node 201g are removed, node 201a and node 201d initiate, to each other, a request for removing an OTL.

Content of the fourth OTU protocol signaling may be as follows: {OTLCTRL=REMOVE, OTLGID=#a, OTLSQ=#5, OTLGS=0} and {OTLCTRL=REMOVE, OTLGID=#a, OTLSQ=#6, OTLGS=0}.

705b: Node 201a sends fifth OTU protocol signaling to node 201d, where the fifth OTU protocol signaling is used for indicating that removing OTLCn.n #5 and OTLCn.n #6 from the OTUCn link is agreed.

Node 201a may determine whether the information, which is carried in the fourth OTU protocol signaling in step 704b, of OTLCn.n #5 and OTLCn.n #6 is correct, and after determining that the information is correct, send the fifth OTU protocol signaling to node 201d.

706b: Node 201d sends the fifth OTU protocol signaling to node 201a.

Content of the fifth OTU protocol signaling may be as follows: {OTLCTRL=REMOVE, OTLGID=#a, OTLSQ=#5, OTLGS=1} and {OTLCTRL=REMOVE, OTLGID=#a, OTLSQ=#6, OTLGS=1}.

707b: After receiving the fifth OTU protocol signaling from node 201d, node 201a sends sixth OTU protocol signaling to node 201d, where the sixth OTU protocol signaling is used for indicating removing OTLCn.n #5 and OTLCn.n #6 from the OTUCn link.

708b: After receiving the fifth OTU protocol signaling from node 201a, node 201d sends the sixth OTU protocol signaling to node 201a.

Content of the sixth OTU protocol signaling may be as follows: {OTLCTRL=IDLE, OTLGID=#a, OTLSQ=#5, OTLGS=1} and {OTLCTRL=IDLE, OTLGID=#a, OTLSQ=#6, OTLGS=1}.

709b: After receiving the sixth OTU protocol signaling from node 201d, node 201a removes OTLCn.n #5 and OTLCn.n #6 from the OTUCn link.

For example, node 201a may remove OTLCn.n #5 and OTLCn.n #6 in an operation of aligning OTLs of an OTUCn.n link, and then align and recombine remaining available OTLs.

710b: After receiving the sixth OTU protocol signaling from node 201a, node 201d removes OTLCn.n #5 and OTLCn.n #6 from the OTUCn link.

Herein, an order of performing step 709b and step 710b is not limited.

711b: Node 201a sends normal OTU protocol signaling to node 201d, where the normal OTU protocol signaling is used for indicating that the OTLCn.n #5 and OTLCn.n #6 are removed from the OTUCn link.

It is assumed that, OTLCn.n #1 to OTLCn.n #6 in an OTUCn.n link are initially transported by OS1, OS2, and OS3 on the OCh link. Each OS corresponds to 2 SCs, OS1 corresponds to SC1 and SC2, OS2 corresponds to SC3 and SC4, and OS3 corresponds to SC5 and SC6. To decrease the transport bandwidth of the OCh link, OS3 is removed from the OCh link.

701c: In an initial state, transport initial optical signal configuration information between node 201a and node 201d, so as to normally transport OTLCn.n #1 to OTLCn.n #6 in the OTUCn.n link.

For example, the initial optical signal configuration information may be transported between node 201a and node 201d by using an OSC. An example of the initial optical signal configuration information may be shown by Table 5.

TABLE 5

Initial optical signal configuration information

| Optical signal/ corresponding subcarrier list | | Bit rate | Modulation format | Central frequency/spectrum width | Identifier of a borne OTUCn link | Serial number of a lane of the OTUCn link |
|---|---|---|---|---|---|---|
| OS1 | SC1 | 100 G | PM-QPSK | 193.100 THz/25 GHz | #a | OTLCn.n #1 |
|  | SC2 | 100 G | PM-QPSK | 193.125 THz/25 GHz | #a | OTLCn.n #2 |
| OS2 | SC3 | 100 G | PM-QPSK | 193.150 THz/25 GHz | #a | OTLCn.n #3 |
|  | SC4 | 100 G | PM-QPSK | 193.175 THz/25 GHz | #a | OTLCn.n #4 |
| OS3 | SC5 | 100 G | PM-QPSK | 193.200 THz/25 GHz | #a | OTLCn.n #5 |
|  | SC6 | 100 G | PM-QPSK | 193.225 THz/25 GHz | #a | OTLCn.n #6 |

712b: Node 201d sends the normal OTU protocol signaling to node 201a.

Content of the normal OTU protocol signaling may be as follows: {OTLCTRL=IDLE, OTLGID=#a, OTLSQ=#5, OTLGS=0} and {OTLCTRL=IDLE, OTLGID=#a, OTLSQ=#6, OTLGS=0}.

In addition, node 201d and node 201f may remove OTLCn.n #5 and OTLCn.n #6 from an OTUCn link between them, and node 201f and node 201g may remove OTLCn.n #5 and OTLCn.n #6 from an OTUCn link between them, so that OTLCn.n #5 and OTLCn.n #6 are removed from each section of OTUCn link between node 201a and node 201g. A specific process is similar to the process in FIG. 7b, and details are not repeatedly described.

FIG. 7c is a schematic flowchart of a process of decreasing a transport bandwidth of an OCh link according to an embodiment of the present invention. In FIG. 7c, a process of decreasing a transport bandwidth of an OCh link by decreasing the number of optical signals is described.

The process in FIG. 7c is performed after the process in FIG. 7b. In FIG. 7c, the OCh link between node 201a and node 201d in FIG. 2 is used as an example for description.

702c: Node 201a sends third OCh protocol signaling and OS3 configuration information to node 201d, where the third OCh protocol signaling is used for requesting removing OS3 from the OCh link.

Content of the third OCh protocol signaling may be as follows: {OChCTRL=REMOVE, OChGID=#a, OChSQ=#OS3[SC5, SS6], OChGS=0}.

The OS3 configuration information may be shown by Table 6.

TABLE 6

OS3 configuration information

| Optical signal/ corresponding subcarrier list | | Bit rate | Modulation format | Central frequency/spectrum width | Identifier of a borne OTUCn link | Serial number of a lane of the OTUCn link |
|---|---|---|---|---|---|---|
| OS3 | SC5 | 100 G | PM-QPSK | 193.200 THz/25 GHz | #a | OTLCn.n #5 |
|  | SC6 | 100 G | PM-QPSK | 193.225 THz/25 GHz | #a | OTLCn.n #6 |

Herein, an order of performing step 702c and step 703c is not limited.

704c: In a case in which it is determined that the OS3 configuration information of node 201a is consistent with the OS3 configuration information received in step 703c, node 201a sends fourth OCh protocol signaling to node 201d, where the fourth OCh protocol signaling is used for indicating that removing OS3 from the OCh link is agreed.

705c: In a case in which it is determined that the OS3 configuration information of node 201d is consistent with the OS3 configuration information received in step 702c, node 201d sends the fourth OCh protocol signaling to node 201a.

Content of the fourth OCh protocol signaling may be as follows: {OChCTRL=REMOVE, OChGID=#a, OChSQ=#OS3 [SC5, SS6], OChGS=1}.

706c: After receiving the fourth OCh protocol signaling of node 201d, node 201a removes OS3 from the OCh link.

For example, node 201a may remove OS3, and release an optical spectrum resource occupied by OS3.

707c: After receiving the fourth OCh protocol signaling of node 201a, node 201d removes OS3 from the OCh link.

After step 707c, node 201a and node 201d may both remove the OS3 configuration information, and cancel transport of the OCh protocol signaling.

It should be noted that, in the scenario in FIG. 2, each two adjacent 3R nodes need to decrease a transport bandwidth of an OCh link between them, so that a transport bandwidth of each section of OCh link between node 201a and node 201g is decreased. A process of decreasing a transport bandwidth of an OCh link between other nodes is similar to the interaction process between node 201a and node 201d, and details are not repeatedly described herein.

In addition, the transport bandwidth of the OCh link may also be decreased by adjusting a modulation format of an optical signal. A specific process is similar to that in the embodiment in FIG. 6b, and details are not repeatedly described.

In addition, the transport bandwidth of the OCh link may also be decreased by decreasing a spectrum width occupied by an optical signal, or by decreasing the number of optical signals, and adjusting a modulation format of the optical signal and a spectrum width occupied by the optical signal. To avoid repetition, details are not repeatedly described herein.

It can be known from the foregoing that, by using the processes in FIG. 7a, FIG. 7b, and FIG. 7c, a line interface rate between node 201a and node 201g is decreased.

It can be seen that by using the processes in FIG. 6a to FIG. 6d, or by using the processes in FIG. 7a to FIG. 7c, the line interface rate between node 201a and node 201g can be increased or decreased, so that the line interface rate can be dynamically adjusted, and hitless service adjustment can be implemented. Therefore, a service transmission capability between nodes can be improved, and the utilization of an optical spectrum resource can be improved.

In an OTN in a link concatenation mode, when a fault occurs in one or more ODLs, a service loss is caused. Currently, there is no corresponding mechanism to solve this problem.

Figure 8:
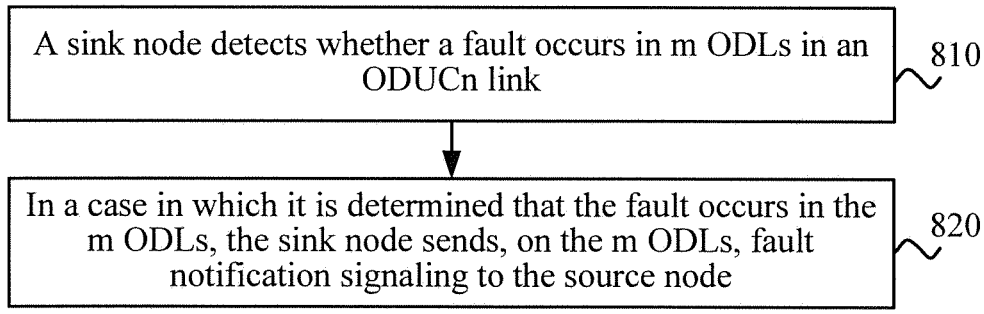
FIG. 8 is a schematic flowchart of a method for processing a link fault in an OTN according to an embodiment of the present invention.

FIG. 8 is a schematic flowchart of a method for processing a link fault in an OTN according to an embodiment of the present invention.

810: A sink node detects whether a fault occurs in m ODLs of an ODUCn link.

For example, the sink node may be node 201g in FIG. 2.

The fault occurring in the ODLs of the ODUCn link may be caused by multiple reasons. For example, in a case in which a 3R node exists between the sink node and a source node, a reason causing the fault occurring in the m ODLs may be that a fault occurs in one or more subcarriers in an OCh link between the source node and the 3R node, or a fault occurs in one or more subcarriers in an OCh link between the 3R node and the sink node.

820: In a case in which it is determined that the fault occurs in the m ODLs, the sink node sends, on the m ODLs, fault notification signaling to the source node, where the fault notification signaling is used for indicating that the fault occurs in the m ODLs, so that the source node performs fault processing on the m ODLs according to the fault notification signaling.

For example, the source node may be node 201a in FIG. 2. The fault notification signaling may be determined according to the ODU LCR protocol. For example, the fault notification signaling may include an ODLCTRL field, an ODLGID field, an ODLSQ field, and an ODLGS field. A value of the ODLGS field may be a sequence 0101 . . . 0101 with consecutive flipping bits, so as to indicate that the fault occurs in the m ODLs.

In the embodiment of the present invention, in a case in which it is detected that a fault occurs in m ODLs, a sink node sends, on the m ODLs to a source node, fault notification signaling used for indicating that the fault occurs in the m ODLs, so that the source node can process the m ODLs in which the fault occurs, so that a service loss can be avoided, and the service transmission performance can be improved.

Optionally, as an embodiment, in step 810, the sink node may detect whether forward fault alarm signaling exists in the m ODLs, where the forward fault alarm signaling may be used for indicating that the fault occurs in the m ODLs.

The forward fault alarm signaling may be determined according to the ODU LCR protocol. For example, the forward fault alarm signaling may include an ODLCTRL field, an ODLGID field, an ODLSQ field, and an ODLGS field. A value of the ODLCTRL field may be FAIL, so as to indicate that the fault occurs in the m ODLs.

Optionally, as another embodiment, the forward fault alarm signaling may be generated by a 3R node between the sink node and the source node.

For example, if a fault occurs in one or more subcarriers in an OCh link between the source node and the 3R node, the 3R node may detect a signal loss alarm (Loss alarm of Signal, LOS) or a frame loss alarm (Loss alarm of frame, LOF) of m OTLs corresponding to the m ODLs, so as to generate the forward fault alarm signaling. Then, the 3R node may insert the forward fault alarm signaling into the m ODLs.

In addition, the 3R node may further send, on the m OTLs, backward fault alarm signaling to an upstream direction, that is, insert the backward fault alarm signaling into the m OTLs. The backward fault alarm signaling may be used for indicating that a fault occurs in the m OTLs. The backward fault alarm signaling may be determined according to the OTU LCR protocol. For example, the backward fault alarm signaling may include an OTLCTRL field, an OTLGID field, an OTLSQ field, and an OTLGS field. A value of the OTLGS field may be a sequence 0101 . . . 0101 with consecutive flipping bits, so as to indicate that the fault occurs in the m OTLs.

Optionally, as another embodiment, the sink node may detect whether a signal loss alarm or a frame loss alarm exists on the m OTLs in the OTUCn link, where the m OTLs are in one-to-one correspondence with the m ODLs.

For example, if a fault occurs in one or more subcarriers in the OCh link between the 3R node and the sink node, the sink node may detect the signal loss alarm or the frame loss alarm of the m OTLs corresponding to the m ODLs.

In addition, the sink node may further send, on the m OTLs, backward fault alarm signaling to an upstream direction, that is, insert the backward fault alarm signaling into the m OTLs. The backward fault alarm signaling may be used for indicating that the fault occurs in the m OTLs.

Optionally, as another embodiment, in a case in which it is determined that the fault in the m ODLs disappears, the sink node may send, on the m ODLs, fault disappearance signaling to the source node, where the fault disappearance signaling is used for indicating that the fault in the m ODLs disappears, so that the source node performs recovery processing on the m ODLs.

For example, in a case in which it is detected that the forward fault alarm signaling on the m ODLs disappears, the sink node may determine that the fault in the m ODLs disappears. For example, after the fault in the m ODLs disappears, the 3R node may transparently transmit signaling on the m ODLs, where a value of an ODLCTRL field in the signaling is IDLE. If it is detected that a value of an ODLCTRL field in signaling carried on the m ODLs is IDLE, the sink node may determine that the fault disappears.

Alternatively, in a case in which it is detected that no signal loss alarm or frame loss alarm exists on the m OTLs, the sink node may determine that the fault in the m ODLs disappears.

Similar to the fault notification signaling, the fault disappearance signaling may also be determined according to the ODU LCR protocol. For example, the fault disappearance signaling may include an ODLCTRL field, an ODLGID field, an ODLSQ field, and an ODLGS field. A value of the ODLGS field may be 0, so as to indicate that the fault in the m ODLs disappears.

Figure 9:
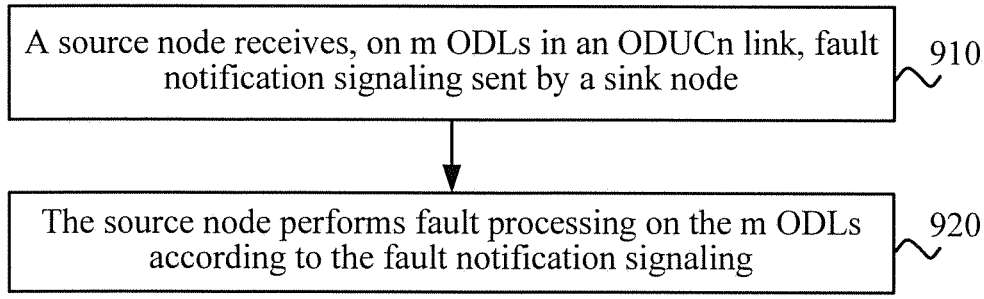
FIG. 9 is a schematic flowchart of a method for processing a link fault in an OTN according to an embodiment of the present invention.

FIG. 9 is a schematic flowchart of a method for processing a link fault in an OTN according to an embodiment of the present invention.

910: A source node receives, on m ODLs in an ODUCn link, fault notification signaling sent by a sink node, where the fault notification signaling is used for indicating that a fault occurs in the m ODLs.

For example, the source node may be node 201a in FIG. 2, and the sink node may be node 201g in FIG. 2. The fault notification signaling may include an ODLCTRL field, an ODLGID field, an ODLSQ field, and an ODLGS field. A value of the ODLGS field may be a sequence 0101 . . . 0101 with consecutive flipping bits, so as to indicate that the fault occurs in the m ODLs.

920: The source node performs fault processing on the m ODLs according to the fault notification signaling.

In the embodiment of the present invention, a source node receives, on m ODLs in an ODUCn link, fault notification signaling sent by a sink node, and processes the m ODLs according to the fault notification signaling, so that a service loss can be avoided, and the service transmission performance can be improved.

Optionally, as an embodiment, in step 920, according to the fault notification signaling, the source node may stop sending data on the m ODLs, and release the m ODLs. The source node may enable the m ODLs in which the fault occurs to no longer bear valid data, so that a loss of the valid data can be avoided.

Optionally, as another embodiment, after step 920, the source node may send idle release signaling to a downstream direction, where the idle release signaling may be used for indicating that the m ODLs are released.

For example, the idle release signaling may be determined according to an ODU LCR protocol. The idle release signaling may include an ODLCTRL field, an ODLGID field, an ODLSQ field, and an ODLGS field. A value of the ODLCTRL field may be IDLE, to indicate that the m ODLs are released.

Optionally, as another embodiment, the source node may receive fault disappearance signaling from the sink node, where the fault disappearance signaling is used for indicating that the fault in the m ODLs disappears. The source node may perform recovery processing on the m ODLs according to the fault disappearance signaling.

After the fault in the m ODLs disappears, the source node may use the m ODLs again, for example, the source node may continue to send valid data on the m ODLs.

Figure 10:
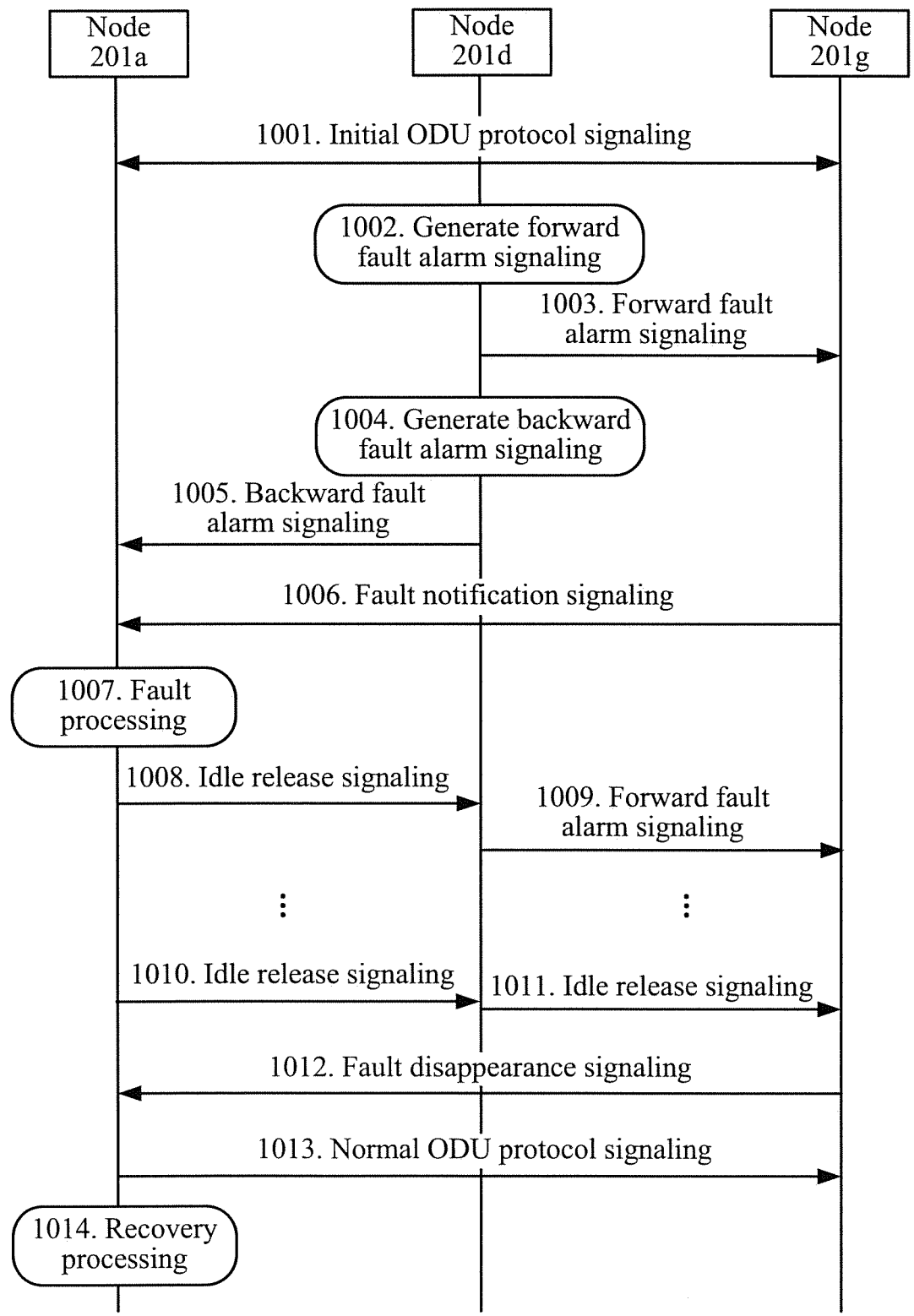
FIG. 10 is a schematic flowchart of a process of a method for processing a link fault in an OTN according to an embodiment of the present invention.

FIG. 10 is a schematic flowchart of a process of a method for processing a link fault in an OTN according to an embodiment of the present invention.

In FIG. 10, the scenario in FIG. 2 is used as an example for description. It is assumed that a fault occurs in a subcarrier in the OCh link between node 201a and node 201d, where the subcarrier is used for bearing OTLCn.n #5 and OTLCn.n #6. Next, a process of processing the fault by node 201a, node 201d, and node 201g is described.

1001: Transmit initial ODU protocol signaling between node 201a and node 201g, where the initial ODU protocol signaling may be used for indicating initial states of ODLCn.n #5 and ODLCn.n #6.

In the initial states, ODLCn.n #5 and ODLCn.n #6 are both in a normal state. Node 201a and node 201g exchange the initial ODU protocol signaling on ODLs. In this case, node 201d may transparently transmit the initial ODU protocol signaling.

Content of the initial ODU protocol signaling may be as follows: {ODLCTRL=NORM, ODLGID=#a, ODLSQ=#5, ODLGS=0} and {ODLCTRL=NORM, ODLGID=#a, ODLSQ=#6, ODLGS=0}, where #a is an identifier of an ODUCn link.

1002: Node 201d detects that a fault occurs in OTLCn.n #5 and OTLCn.n #6, and generates forward fault alarm signaling, where the forward fault alarm signaling is used for indicating that the fault occurs in both ODLCn.n #5 and ODLCn.n #6.

1003: Node 201d sends the forward fault alarm signaling to node 201g.

For example, the forward fault alarm signaling may include two parts of information, and the two parts of information may be inserted into ODLCn.n #5 and ODLCn.n #6, respectively. Content of the forward fault alarm signaling may be as follows: {ODLCTRL=FAIL, ODLGID=#a, ODLSQ=#5, ODLGS=0} and {ODLCTRL=FAIL, ODLGID=#a, ODLSQ=#6, ODLGS=0}.

1004: Node 201d generates backward fault alarm signaling, where the backward fault alarm signaling may be used for indicating that the fault occurs in both OTLCn.n #5 and OTLCn.n #6.

1005: Node 201d sends the backward fault alarm signaling to node 201a.

For example, the backward fault alarm signaling may include two parts of information, and the two parts of information may be inserted into OTLCn.n #5 and OTLCn.n #6, respectively. Content of the backward fault alarm signaling may be as follows: {OTLCTRL=NORM, OTLGID=#a, OTLSQ=#5, OTLGS=0101 . . . 0101} and {OTLCTRL=NORM, OTLGID=#a, OTLSQ=#6, OTLGS=0101 . . . 0101}.

An order of performing step 1002 and step 1003 and step 1004 and step 1005 may be not limited. For example, step 1004 and step 1005 may be performed first, and then 1002 and 1003 are performed. Alternatively, step 1002 and step 1003 and step 1004 and step 1005 may be performed synchronously.

In addition, step 1004 and step 1005 may be not performed.

1006: Node 201g sends fault notification signaling to node 201a according to the forward fault alarm signaling, where the fault notification signaling is used for indicating that the fault occurs in both ODLCn.n #5 and ODLCn.n #6.

For example, the fault notification signaling may include two parts of information, and the two parts of information may be transported by using ODLCn.n #5 and ODLCn.n #6, respectively. Content of the fault notification signaling may be as follows: {ODLCTRL=NORM, ODLGID=#a, ODLSQ=#5, ODLGS=0101 . . . 0101} and {ODLCTRL=NORM, ODLGID=#a, ODLSQ=#6, ODLGS=0101 . . . 0101}.

1007: Node 201a performs fault processing on ODLCn.n #5 and ODLCn.n #6 according to the forward fault alarm signaling.

For example, node 201a may stop sending data on ODLCn.n #5 and ODLCn.n #6, and release ODLCn.n #5 and ODLCn.n #6.

1008: Node 201a sends idle release signaling to node 201d, where the idle release signaling is used for indicating that ODLCn.n #5 and ODLCn.n #6 are both released.

For example, content of the idle release signaling may be as follows: {ODLCTRL=IDLE, ODLGID=#a, ODLSQ=#5, ODLGS=0} and {ODLCTRL=IDLE, ODLGID=#a, ODLSQ=#6, ODLGS=0}.

1009: After receiving the idle release signaling, node 201d detects that the fault in OTLCn.n #5 and OTLCn.n #6 still exists, and continues to send the forward fault alarm signaling to node 201g.

1010: Node 201a continues to send the idle release signaling to node 201d.

1011: After detecting that the fault in OTLCn.n #5 and OTLCn.n #6 disappears, node 201d transparently transmits the idle release signaling to node 201g.

1012: Node 201g detects that the forward fault alarm signaling disappears, and sends fault disappearance signaling to node 201a.

When the idle release signaling is received, but no forward fault alarm signaling is received, node 201g may determine that the fault in OTLCn.n #5 and OTLCn.n #6 disappears, and therefore send the fault disappearance signaling to node 201a.

For example, content of the fault disappearance signaling may be as follows: {ODLCTRL=NORM, ODLGID=#a, ODLSQ=#5, ODLGS=0} and {ODLCTRL=NORM, ODLGID=#a, ODLSQ=#6, ODLGS=0}.

1013: Node 201a sends normal ODU protocol signaling to node 201g according to the fault disappearance signaling.

The normal ODU protocol signaling may indicate that ODLCn.n #5 and ODLCn.n #6 can be used for normal transmission.

1014: Node 201a performs recovery processing on ODLCn.n #5 and ODLCn.n #6.

Node 201a may use ODLCn.n #5 and ODLCn.n #6 again. For example, node 201a may send the normal ODU protocol signaling in multiple frames, and send valid data on ODLCn.n #5 and ODLCn.n #6.

In the embodiment of the present invention, in a case in which it is detected that a fault occurs in m ODLs, a sink node sends, on the m ODLs to a source node, fault notification signaling used for indicating that the fault occurs in the m ODLs, so that the source node can process the m ODLs in which the fault occurs, so that a service loss is avoided, and the service transmission performance can be improved.

In an OTN in a link concatenation mode, when a fault occurs in one or more OTLs, operation administration and maintenance (Operation Administration and Maintenance, OAM) overhead information may fail to be transported normally, and therefore, it is difficult to ensure correctness of the OAM overhead information. Currently, in the prior art, there is no corresponding mechanism to solve this problem.

Figure 11:
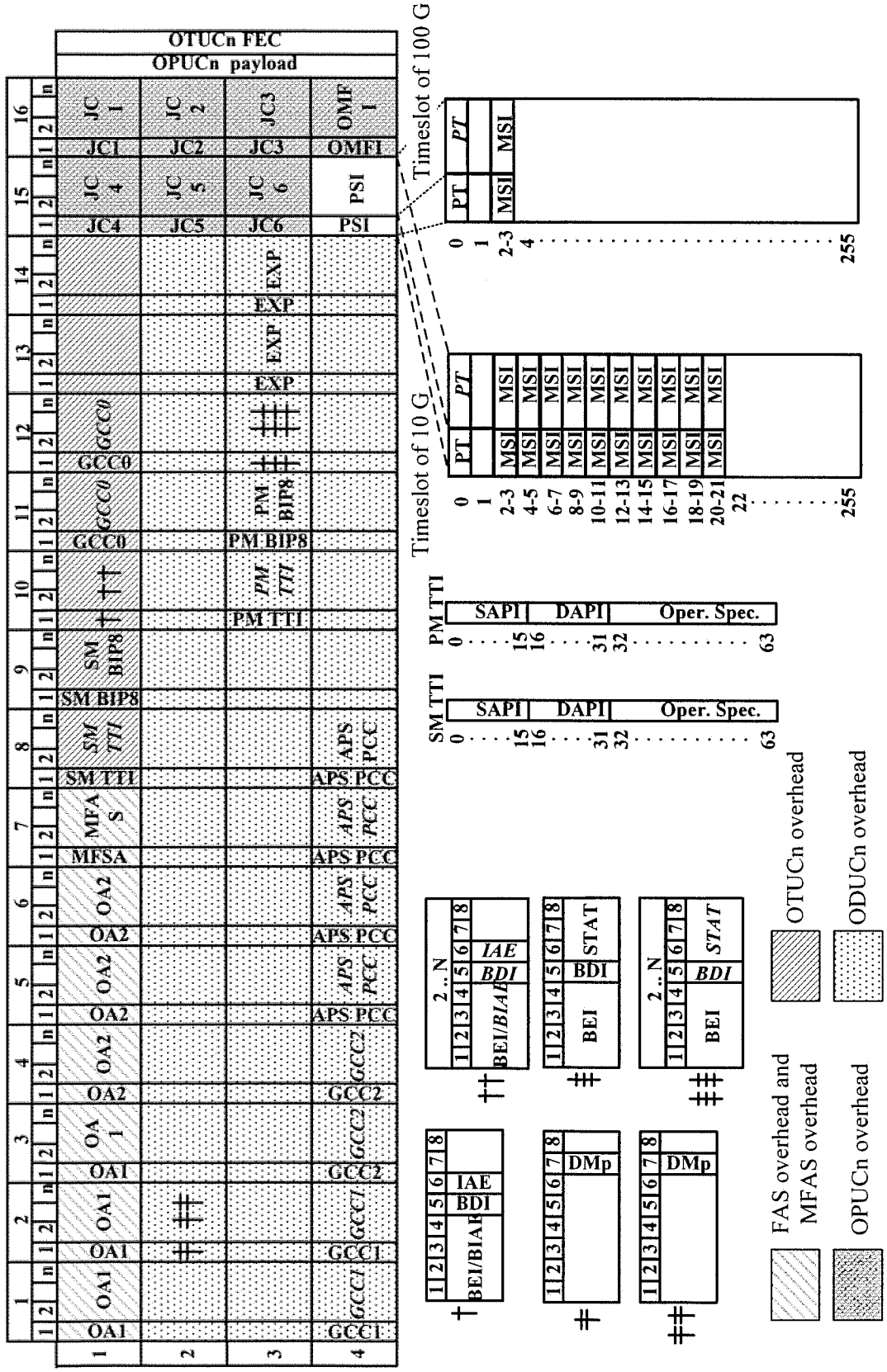
FIG. 11 is a schematic structural diagram of OAM overhead information in an OTN according to an embodiment of the present invention.

FIG. 11 is a schematic structural diagram of OAM overhead information in an OTN according to an embodiment of the present invention.

As shown in FIG. 11, in the OTN, the OAM overhead information may include information of a frame alignment signal (Frame Alignment Signal, FAS) overhead, a multiframe alignment signal (Multiframe Alignment Signal, MFAS) overhead, an OTUCn overhead, an ODUCn overhead, and an OPUCn overhead. As shown in FIG. 11, the OTUCn overhead may include general communication channel 0 (General Communication Channel, GCC), GCC1, GCC2, and section monitoring (Section Monitoring, SM). The OTUCn overhead further includes a reserved area. The ODUCn overhead may include path monitoring (Path Monitoring, PM), delay measurement of an ODUk path (Delay Measurement of ODUk path, DMp), automatic protection switching (Automatic Protection Switching, APS)/protection communication channel (Protection Communication Control Channel, PCC), and experimental (Experimental, EXP). The ODUCn overhead further includes a reserved area. The OPUCn overhead may include a payload structure identifier (Payload Structure Identifier, PSI), an OPU multiframe indicator (OPU Multiframe Indicator, OMFI), justification control (Justification Control, JC)1, JC2, JC3, JC4, JC5, and JC6. In addition, in FIG. 11, overheads indicated by italics are optional, and may be reserved or canceled according to a specific application.

Figure 12:
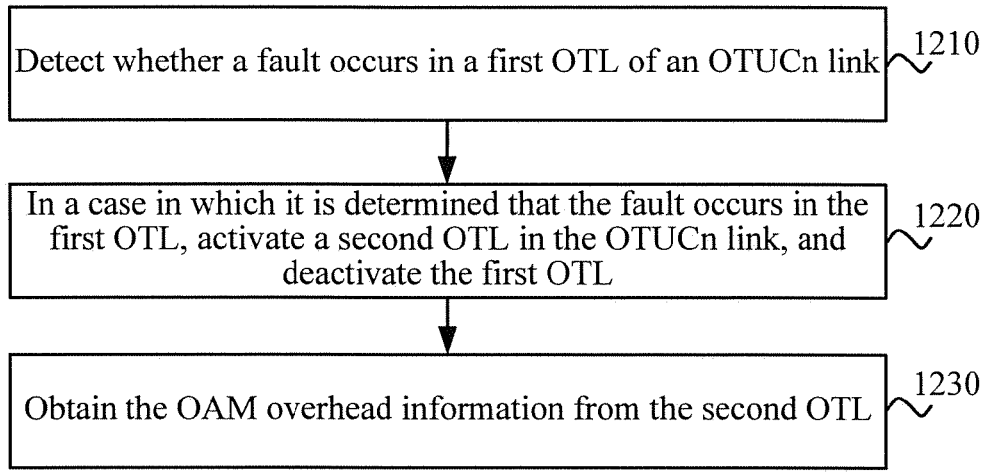
FIG. 12 is a schematic flowchart of a method for obtaining OAM overhead information according to an embodiment of the present invention.

FIG. 12 is a schematic flowchart of a method for obtaining OAM overhead information according to an embodiment of the present invention. The method in FIG. 12 is performed by a node in an OTN. In this embodiment, the node may also be referred to as a fault node, in other words, a fault occurs in an OCh link at the node, which leads to that the node needs to use the method for obtaining OAM overhead information according to the embodiment of the present invention. The node may be a 3R node or a sink node in the OTN. For example, the method may be performed by node 201d, node 201f, or node 201g in FIG. 2.

1210: Detect whether a fault occurs in a first OTL of an OTUCn link, where the first OTL is used for bearing OAM overhead information.

For example, OTLs in the OTUCn link may be transported by using multiple OSs or SCs in an OCh link. If a fault occurs in a subcarrier device therein, for example, a fault occurs in a laser, or a fault occurs in an optical signal device, for example, a fault occurs in a Nyquist wavelength division multiplexing (Nyquist Wavelength Division Multiplexing, NWDM) component, or a fault occurs in a part of WSS devices, it may be caused that a fault occurs in the first OTL.

1220: In a case in which it is determined that the fault occurs in the first OTL, activate a second OTL in the OTUCn link, and deactivate the first OTL, where the second OTL is used for bearing a backup of the OAM overhead information.

For example, when a signal loss alarm or a frame loss alarm of the first OTL is detected, the node may determine that the fault occurs in the first OTL.

1230: Obtain the OAM overhead information from the second OTL.

The first OTL may be a master overhead channel, and is used for bearing the OAM overhead information. The second OTL may be a slave overhead channel, and is used for backing up the OAM overhead information.

For example, in a case in which an OTUCn signal is split into n OTL signals, that is, in the scenario in FIG. 1b, OTLCn.n #1 in the OTUCn link may serve as a master overhead channel to bear the OAM overhead information, and OTLCn.n #2, . . . , and OTLCn.n #n may serve as slave overhead channels. Then, the first OTL may be OTLCn.n #1, and the second OTL may be any channel among OTLCn.n #2, . . . , and OTLCn.n #n.

For another example, in a case in which an OTUCn signal is split into p OTL signals, that is, in the scenario in FIG. 1c, OTLCn.n$_1$ #1 in the OTUCn link may serve as a master overhead channel to bear the OAM overhead information, and OTLCn.n #n$_1$+1, OTLCn.n #n$_1$+2, . . . , and OTLCn.n # n$_1$+n$_2$+ . . . +n$_{p-1}$+1 in OTLCn.n$_2$, . . . , and OTLCn.n$_p$ may serve as slave overhead channels to back up the OAM overhead information. Then, the first OTL may be OTLCn.n$_1$ #1, and the second OTL may be any channel among OTLCn.n #n$_1$+1, OTLCn.n #n$_1$+2, . . . , and OTLCn.n # n+n$_2$+ . . . +n$_{p-1}$+1.

In the embodiment of the present invention, in a case in which it is detected that a fault occurs in a first OTL used for bearing OAM overhead information, a second OTL in an OTUCn link is activated, and the OAM overhead information is obtained from the second OTL, so that correctness of the OAM overhead information can be ensured, and therefore, robustness of an OTUCn signal can be improved.

Optionally, as an embodiment, the node may send, on the first OTL, backward fault alarm information to an upstream direction, where the backward fault alarm information is used for indicating that the fault occurs in the first OTL and the second OTL is activated.

For example, when the method in FIG. 12 is performed by node 201d in FIG. 2, node 201d may send the backward fault alarm information on the first OTL to node 201a.

Optionally, as another embodiment, in a case in which it is determined that the fault in the first OTL disappears, the node may deactivate the second OTL, and activate the first OTL. The node may obtain the OAM overhead information from the first OTL.

Optionally, as another embodiment, in a case in which it is determined that the fault in the first OTL disappears, the node may stop sending, on the first OTL, the backward fault alarm information to the upstream direction.

Figure 13A:
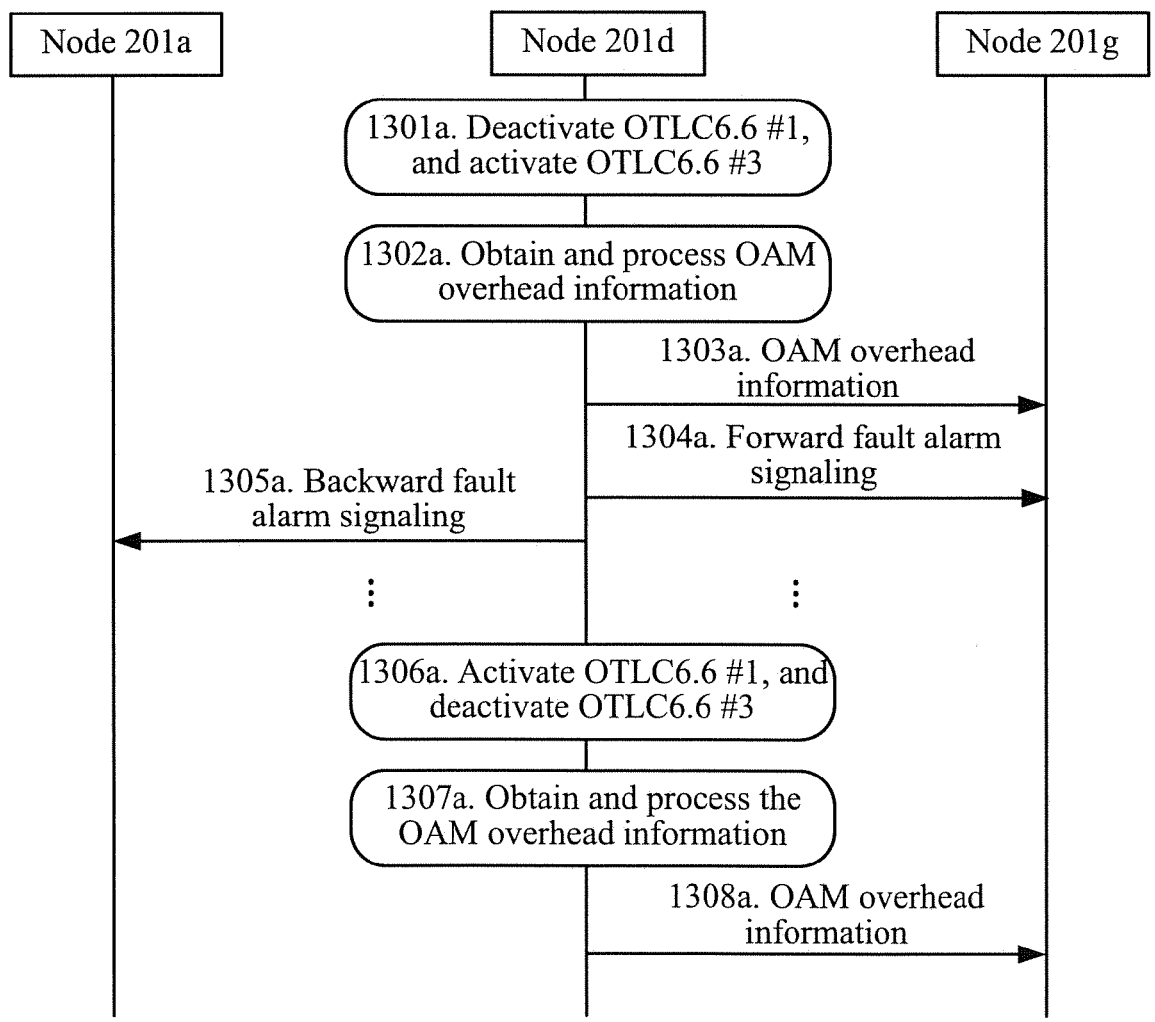
FIG. 13a is a schematic flowchart of a process of a method for obtaining OAM overhead information in an OTN according to an embodiment of the present invention.

FIG. 13a is a schematic flowchart of a process of a method for obtaining OAM overhead information in an OTN according to an embodiment of the present invention.

In FIG. 13a, the scenario in FIG. 2 is used as an example for description. In FIG. 13a, it is assumed that OTLC6.6 #1 serves as a master overhead channel to bear OAM overhead information, and other OTLs serve as slave overhead channels to back up the OAM overhead information. It is assumed that a fault occurs in an SC at an ingress of node 201d, which causes that a fault occurs in OTLC6.6 #1. The following describes a processing process of node 201d. Herein, node 201d may be referred to as a fault node.

1301a: In a case in which it is determined that a fault occurs in OTLC6.6 #1, node 201d deactivates OTLC6.6 #1, and activates OTLC6.6 #3.

It should be noted that, in this embodiment, node 201d may also activate another slave overhead channel, for example, OTLC6.6 #2 or the like. For ease of description, OTLC6.6 #3 is used as an example for description herein.

1302a: Node 201d obtains OAM overhead information from OTLC6.6 #3, and processes the OAM overhead information.

For example, node 201d may obtain, from OTLC6.6 #3, an OTUC6 overhead in the OAM overhead information, and regenerate the OTUC6 overhead.

1303a: Node 201d sends the OAM overhead information to node 201g.

For example, node 201d may send, on OTLC6.6 #1, the OAM overhead information to node 201g. Specifically, node 201d may send, on OTLC6.6 #1, the regenerated OTUC6 overhead to node 201g, and transparently transmit, on OTLC6.6 #1, an ODUC6 overhead to node 201g.

1304a: Node 201d sends forward fault alarm signaling to node 201g, where the forward fault alarm signaling is used for indicating that the fault occurs in OTLC6.6 #1.

1305a: Node 201d sends backward fault alarm signaling to node 201a, where the backward fault alarm signaling is used for indicating that the fault occurs in OTLC6.6 #1 and OTLC6.6 #3 is activated.

1306a: In a case in which it is determined that the fault in OTLC6.6 #1 disappears, node 201d activates OTLC6.6 #1 again, and deactivates OTLC6.6 #3.

1307a: Node 201d obtains the OAM overhead information from OTLC6.6 #1, and processes the OAM overhead information.

For example, node 201d may obtain, from OTLC6.6 #1, an OTUC6 overhead in the OAM overhead information, and regenerate the OTUC6 overhead.

1308a: Node 201d sends the OAM overhead information to node 201g.

In addition, node 201d may stop sending the backward fault alarm signaling to node 201a. In a case in which no backward fault alarm signaling is received, node 201a may determine that the fault in OTLC6.6 #1 disappears and OTLC6.6 #1 is activated again.

Node 201d may further stop sending the forward fault alarm signaling to node 201g.

It should be understood that, the process in FIG. 13a may be combined with the process in FIG. 10. For example, after the fault occurs in OTLC6.6 #1, when the process in FIG. 13a is performed, the process in FIG. 10 may further be performed. That is, when the process in FIG. 13a is performed, node 201a, node 201d, and node 201g may perform the fault processing process and recovery process of OTLC6.6 #1.

In the embodiment of the present invention, in a case in which it is detected that a fault occurs in an OTL serving as a master overhead channel, an OTL in an OTUCn link and serving as a slave overhead channel is activated, and OAM overhead information is obtained from the slave overhead channel, so that normal communication with other nodes can be ensured, and therefore, robustness of an OTUCn signal can be improved.

Figure 13B:
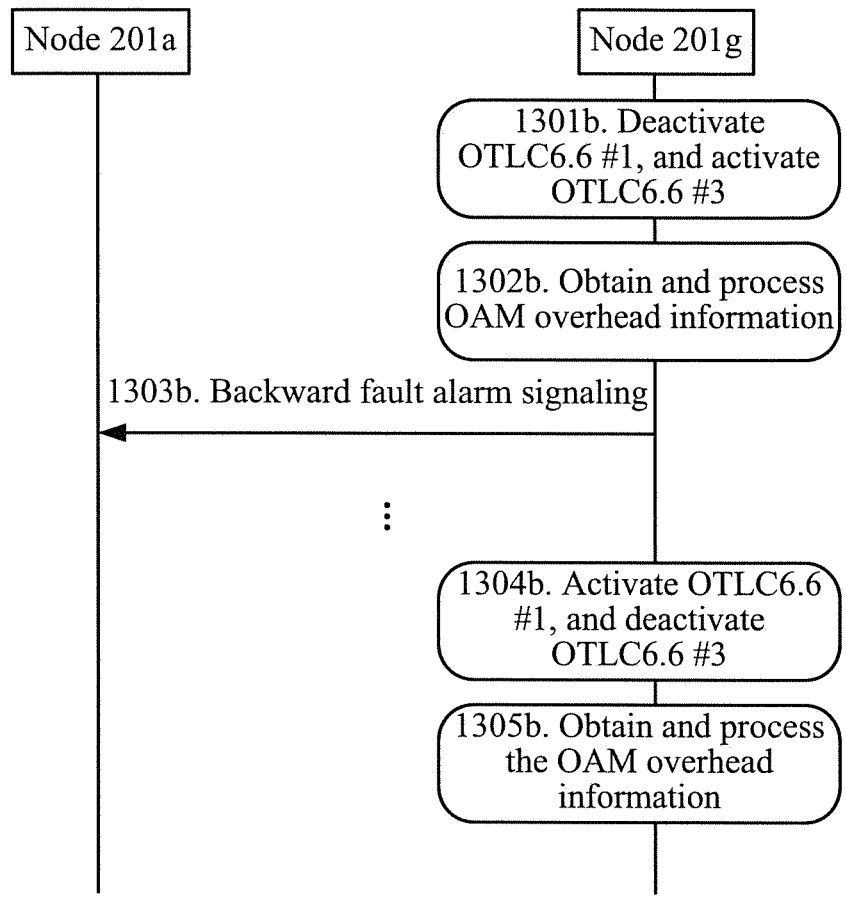
FIG. 13b is a schematic flowchart of a process of a method for obtaining OAM overhead information in an OTN according to another embodiment of the present invention.

FIG. 13b is a schematic flowchart of a process of a method for obtaining OAM overhead information in an OTN according to another embodiment of the present invention.

In FIG. 13b, the scenario in FIG. 2 is used as an example for description. In FIG. 13b, it is assumed that OTLC6.6 #1 serves as a master overhead channel to bear OAM overhead information, and other OTLs serve as slave overhead channels to back up the OAM overhead information. It is assumed that a fault occurs in an SC at an ingress of node 201g, which causes that a fault occurs in OTLC6.6 #1. The following describes a processing process of node 201g. Herein, node 201g may be referred to as a fault node.

1301b: In a case in which it is determined that a fault occurs in OTLC6.6 #1, node 201g deactivates OTLC6.6 #1, and activates OTLC6.6 #3.

It should be noted that, in this embodiment, node 201g may also activate another slave overhead channel, for example, OTLC6.6 #2 or the like. For ease of description, OTLC6.6 #3 is used as an example for description herein.

1302b: Node 201g obtains OAM overhead information from OTLC6.6 #3, and processes the OAM overhead information.

For example, node 201g may obtain, from OTLC6.6 #3, an OTUC6 overhead and an ODUCn overhead in the OAM overhead information.

1303b: Node 201g sends backward fault alarm signaling to node 201a, where the backward fault alarm signaling is used for indicating that the fault occurs in OTLC6.6 #1 and OTLC6.6 #3 is activated.

1304b: In a case in which it is determined that the fault in OTLC6.6 #1 disappears, node 201g activates OTLC6.6 #1 again, and deactivates OTLC6.6 #3.

1305b: Node 201g obtains the OAM overhead information from OTLC6.6 #1, and processes the OAM overhead information.

In addition, node 201g may stop sending the backward fault alarm signaling to node 201a. In a case in which no backward fault alarm signaling is received, node 201a may determine that the fault in OTLC6.6 #1 disappears and OTLC6.6 #1 is activated again.

It should be understood that, the process in FIG. 13b may be combined with the process in FIG. 10. For example, after the fault occurs in OTLC6.6 #1, when the process in FIG. 13b is performed, the process in FIG. 10 may further be performed. That is, when the process in FIG. 13b is performed, node 201a, node 201d, and node 201g may perform the fault processing process and recovery process of OTLC6.6 #1.

In the embodiment of the present invention, in a case in which it is detected that a fault occurs in an OTL serving as a master overhead channel, an OTL in an OTUCn link and serving as a slave overhead channel is activated, and OAM overhead information is obtained from the slave overhead channel, so that normal communication with other nodes can be ensured, and therefore, robustness of an OTUCn signal can be improved.

Figure 14:
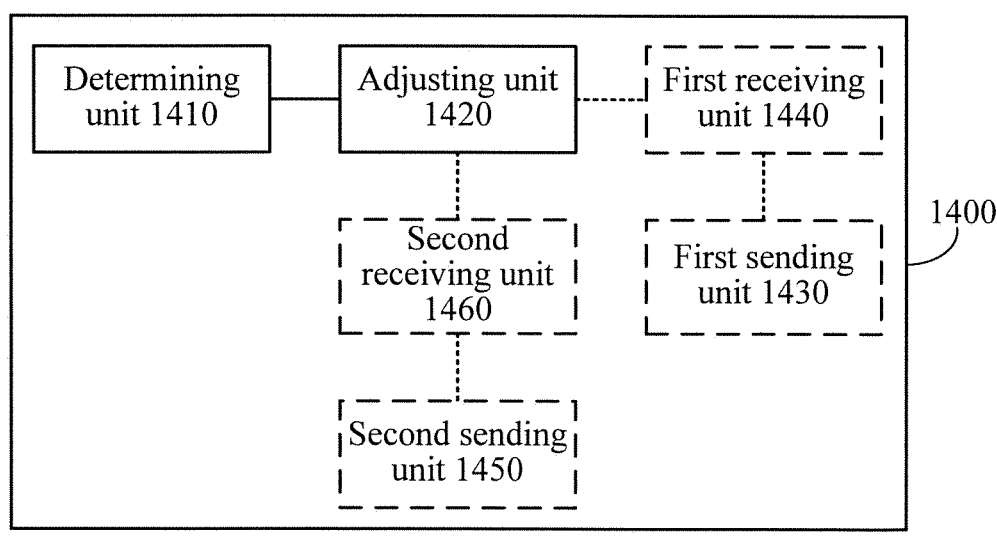
FIG. 14 is a schematic block diagram of a node according to an embodiment of the present invention.

FIG. 14 is a schematic block diagram of a node according to an embodiment of the present invention. The node 1400 in FIG. 14 includes a determining unit 1410 and an adjusting unit 1420.

The determining unit 1410 determines an adjustment requirement for a line interface rate. According to the adjustment requirement for the line interface rate and determined by the determining unit 1410, the adjusting unit 1420 adjusts a transport bandwidth of an optical channel OCh link, adjusts the number of optical channel transport lanes OTLs in an optical channel transport unit OTUCn link, and adjusts the number of optical channel data lanes ODLs in an optical channel data unit ODUCn link, where the OTL is in one-to-one correspondence with the ODL.

In the embodiment of the present invention, according to an adjustment requirement for a line interface rate, a transport bandwidth of an OCh link is adjusted, the number of OTLs in an OTUCn link is adjusted, and the number of ODLs in an ODUCn link is adjusted, so that the line interface rate can be dynamically adjusted.

Optionally, as an embodiment, the adjusting unit 1420 may adjust the number of optical signals in the OCh link; or the adjusting unit 1420 may adjust a modulation format of an optical signal in the OCh link; or the adjusting unit 1420 may adjust a spectrum width occupied by an optical signal in the OCh link; or the adjusting unit 1420 may adjust the number of optical signals in the OCh link, a modulation format of the optical signal, and a spectrum width occupied by the optical signal.

Optionally, as another embodiment, in a case in which the determining unit 1410 determines that the line interface rate needs to be increased, the adjusting unit 1420 may increase the transport bandwidth of the OCh link, add j OTLs into the OTUCn link, and add j ODLs into the ODUCn link, where j is a positive integer.

Optionally, as another embodiment, the adjusting unit 1420 may increase the number of optical signals in the OCh link; or the adjusting unit 1420 may adjust a modulation format of an optical signal in the OCh link, so as to increase the transport bandwidth of the OCh link; or the adjusting unit 1420 may increase a spectrum width occupied by an optical signal in the OCh link; or the adjusting unit 1420 may increase the number of optical signals in the OCh link, increase a spectrum width occupied by the optical signal, and adjust a modulation format of the optical signal.

Optionally, as another embodiment, the node 1400 may further include a first sending unit 1430 and a first receiving unit 1440. Before the adjusting unit 1420 increases the transport bandwidth of the OCh link, the first sending unit 1430 may send first OCh protocol signaling and first optical signal configuration information to a second node, where the first OCh protocol signaling is used for requesting increasing the transport bandwidth of the OCh link, and the first optical signal configuration information is used for indicating configuration of the optical signal. The first receiving unit 1440 may receive second OCh protocol signaling from the second node, where the second OCh protocol signaling is used for indicating that increasing the transport bandwidth of the OCh link is agreed.

Optionally, as another embodiment, the first receiving unit 1440 may further receive the first OCh protocol signaling and third optical signal configuration information from the second node, where the third optical signal configuration information is used for indicating the configuration of the optical signal. In a case in which it is determined that the first optical signal configuration information is consistent with the third optical signal configuration information, the first sending unit 1430 may further send the second OCh protocol signaling to the second node.

Optionally, as another embodiment, the first OCh protocol signaling and the second OCh protocol signaling both include the following fields: an OCh control signaling indication, an identifier of the OTUCn link, a sequence identifier of an optical signal used for bearing the OTUCn link and an identifier of a corresponding optical subcarrier, and an optical signal adjustment response state indication. The OCh control signaling indication is used for indicating an adjustment manner for the transport bandwidth, and the response state indication is used for indicating whether adjusting the transport bandwidth is agreed.

Optionally, as another embodiment, before the adjusting unit 1420 adds the j OTLs into the OTUCn link, the first sending unit 1430 may send first OTU protocol signaling to the second node, where the first OTU protocol signaling is used for requesting adding the j OTLs into the OTUCn link, and the first OTU protocol signaling carries information of the j OTLs. The first receiving unit 1440 may receive second OTU protocol signaling from the second node, where the second OTU protocol signaling is used for indicating that adding the j OTLs into the OTUCn link is agreed. The first receiving unit 1440 may further receive third OTU protocol signaling from the second node, where the third OTU protocol signaling is used for indicating adding the j OTLs into the OTUCn link.

Optionally, as another embodiment, the first receiving unit 1440 may further receive the first OTU protocol signaling from the second node. The first sending unit 1430 may further send the second OTU protocol signaling to the second node. The first sending unit 1430 may further send the third OTU protocol signaling to the second node.

Optionally, as another embodiment, the first OTU protocol signaling, the second OTU protocol signaling, and the third OTU protocol signaling may all include the following fields: an OTL control signaling indication, the identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, the node 1400 may further include a second sending unit 1450 and a second receiving unit 1460. Before the adjusting unit 1420 adds the j ODLs into the ODUCn link, the second sending unit 1450 may send first ODU protocol signaling to a third node, where the first ODU protocol signaling is used for requesting adding the j ODLs into an ODU link, and the first ODU protocol signaling carries information of the j ODLs. The second receiving unit 1460 may receive second ODU protocol signaling from the third node, where the second ODU protocol signaling is used for indicating that adding the j ODLs into the ODU link is agreed. The second receiving unit 1460 may further receive third ODU protocol signaling from the third node, where the third ODU protocol signaling is used for indicating adding the j ODLs into the ODU link.

Optionally, as another embodiment, the first ODU protocol signaling, the second ODU protocol signaling, and the third ODU protocol signaling may all include the following fields: an ODL control signaling indication, an identifier of the ODUCn link, sequence identifiers of the j ODLs in the ODUCn link, and an ODL adjustment response state indication, where the ODL control signaling indication is used for indicating a manner of adjusting the number of ODLs, and the ODL adjustment response state indication is used for indicating whether adjusting the number of ODLs is agreed.

Optionally, as another embodiment, after adding the j ODLs into the ODUCn link, the adjusting unit 1420 may further increase, according to the Hitless Adjustment of ODUflex HAO protocol, a bandwidth occupied by a lower-order ODU service on the ODUCn link.

Optionally, as another embodiment, in a case in which the determining unit 1410 determines that the line interface rate needs to be decreased, the adjusting unit 1420 may remove j ODLs from the ODUCn link, remove j OTLs from the OTUCn link, and decrease the transport bandwidth of the OCh link, where j is a positive integer.

Optionally, as another embodiment, before the adjusting unit 1420 removes the j ODLs from the ODUCn link, the second sending unit 1450 may send fourth ODU protocol signaling to the third node, where the fourth ODU protocol signaling is used for requesting removing the j ODLs from an ODU link, and the fourth ODU protocol signaling carries information of the j ODLs. The second receiving unit 1460 may receive fifth ODU protocol signaling from the third node, where the fifth ODU protocol signaling is used for indicating that removing the j ODLs from the ODU link is agreed. The second receiving unit 1460 may further receive sixth ODU protocol signaling from the third node, where the sixth ODU protocol signaling is used for indicating removing the j ODLs from the ODU link.

Optionally, as another embodiment, the fourth ODU protocol signaling, the fifth ODU protocol signaling, and the sixth ODU protocol signaling may all include the following fields: an ODL control signaling indication, an identifier of the ODUCn link, sequence identifiers of the j ODLs in the ODUCn link, and an ODL adjustment response state indication. The ODL control signaling indication is used for indicating a manner of adjusting the number of ODLs, and the ODL adjustment response state indication is used for indicating whether adjusting the number of ODLs is agreed.

Optionally, as another embodiment, before the adjusting unit 1420 removes the j OTLs from the OTUCn link, the first sending unit 1430 may send fourth OTU protocol signaling to the second node, where the fourth OTU protocol signaling is used for requesting removing the j OTLs from an OTU link, and the fourth OTU protocol signaling carries information of the j OTLs. The first receiving unit 1440 may receive fifth OTU protocol signaling from the second node, where the fifth OTU protocol signaling is used for indicating that removing the j OTLs from the OTU link is agreed. The first receiving unit 1440 may further receive sixth OTU protocol signaling from the second node, where the sixth OTU protocol signaling is used for indicating removing the j OTLs from the OTU link.

Optionally, as another embodiment, the first receiving unit 1440 may further receive the fourth OTU protocol signaling from the second node. The first sending unit 1430 may further send the fifth OTU protocol signaling to the second node. The first sending unit 1430 may further send the sixth OTU protocol signaling to the second node.

Optionally, as another embodiment, the fourth OTU protocol signaling, the fifth OTU protocol signaling, and the sixth OTU protocol signaling may all include the following fields: an OTL control signaling indication, an identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, the adjusting unit 1420 may decrease the number of optical signals in the OCh link; or the adjusting unit 1420 may adjust a modulation format of an optical signal in the OCh link, so as to decrease the transport bandwidth of the OCh link; or the adjusting unit 1420 may decrease a spectrum width occupied by an optical signal in the OCh link; or the adjusting unit 1420 may decrease the number of optical signals in the OCh link, decrease a spectrum width occupied by the optical signal, and adjust a modulation format of the optical signal.

Optionally, as another embodiment, before the adjusting unit 1420 decreases the transport bandwidth of the OCh link, the first sending unit 1430 may send third OCh protocol signaling and second optical signal configuration information to the second node, where the third OCh protocol signaling is used for requesting decreasing the transport bandwidth of the OCh link, and the second optical signal configuration information is used for indicating configuration of the optical signal. The first receiving unit 1440 may receive fourth OCh protocol signaling from the second node, where the fourth OCh protocol signaling is used for indicating that decreasing the transport bandwidth of the OCh link is agreed.

Optionally, as another embodiment, the first receiving unit 1440 may further receive the third OCh protocol signaling and fourth optical signal configuration information from the second node, where the fourth optical signal configuration information is used for indicating the configuration of the optical signal. In a case in which it is determined that the second optical signal configuration information is consistent with the fourth optical signal configuration information, the first sending unit 1430 may further send the fourth OCh protocol signaling to the second node.

Optionally, as another embodiment, the third OCh protocol signaling and the fourth OCh protocol signaling both include the following fields: an OCh control signaling indication, the identifier of the OTUCn link, a sequence identifier of an optical signal used for bearing the OTUCn link and an identifier of a corresponding optical subcarrier, and a response state indication, where the OCh control signaling indication is used for indicating an adjustment manner for the transport bandwidth, and the response state indication is used for indicating whether adjusting the transport bandwidth is agreed.

Optionally, as another embodiment, before removing the j ODLs from the ODUCn link, the adjusting unit 1420 may further decrease, according to the HAO protocol, a bandwidth occupied by a lower-order ODU service on the ODUCn link.

For other functions and operations of the node 1400 in FIG. 14, reference may be made to the processes in which the first node is involved in FIG. 4*a* to FIG. 7*c*. To avoid repetition, details are not repeatedly described herein.

Figure 15A:
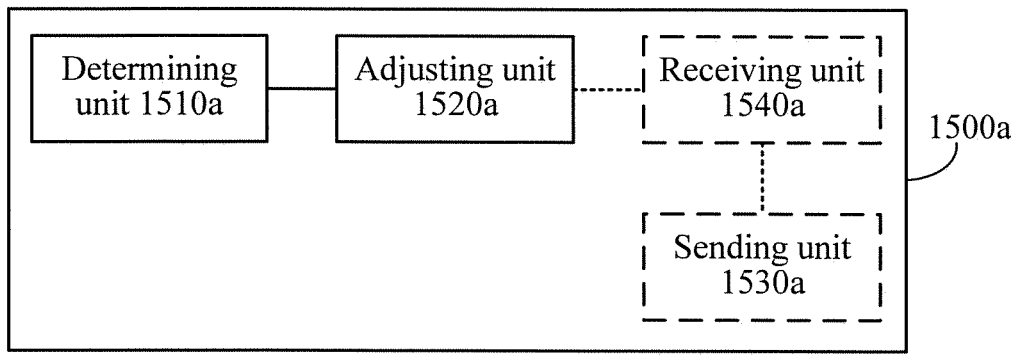
FIG. 15a is a schematic block diagram of a node according to another embodiment of the present invention.

FIG. 15*a* is a schematic block diagram of a node according to another embodiment of the present invention. The node 1500*a* in FIG. 15*a* is a 3R node between a source node and a sink node. The node 1500*a* includes a determining unit 1510*a* and an adjusting unit 1520*a*.

The determining unit 1510*a* determines an adjustment requirement for a line interface rate. According to the adjustment requirement for the line interface rate, the adjusting unit 1520*a* adjusts a transport bandwidth of an OCh link, and adjusts the number of OTLs in an OTUCn link.

In the embodiment of the present invention, according to an adjustment requirement for a line interface rate, a 3R node between a source node and a sink node adjusts a transport bandwidth of an OCh link, and adjusts the number of OTLs in an OTUCn link, which can dynamically adjust a line interface rate between the source node and the sink node.

Optionally, as an embodiment, the adjusting unit 1520*a* may adjust the number of optical signals in the OCh link; or the adjusting unit 1520*a* may adjust a modulation format of an optical signal in the OCh link; or the adjusting unit 1520*a* may adjust a spectrum width occupied by an optical signal in the OCh link; or the adjusting unit 1520*a* may adjust the number of optical signals in the OCh link, a modulation format of the optical signal, and a spectrum width occupied by the optical signal.

Optionally, as another embodiment, in a case in which the determining unit 1510*a* determines that the line interface rate needs to be increased, the adjusting unit 1520*a* may increase the transport bandwidth of the OCh link, and add j OTLs into the OTUCn link, where j is a positive integer.

Optionally, as another embodiment, the adjusting unit 1520*a* may increase the number of optical signals in the OCh link; or the adjusting unit 1520*a* may adjust a modulation format of an optical signal in the OCh link, so as to increase the transport bandwidth of the OCh link; or the adjusting unit 1520*a* may increase a spectrum width occupied by an optical signal in the OCh link; or the adjusting unit 1520*a* may increase the number of optical signals in the OCh link, increase a spectrum width occupied by the optical signal, and adjust a modulation format of the optical signal.

Optionally, as another embodiment, the node 1500*a* may further include a sending unit 1530*a* and a receiving unit 1540*a*. Before the adjusting unit 1520*a* increases the transport bandwidth of the OCh link, the sending unit 1530*a* may send first OCh protocol signaling and fifth optical signal configuration information to a fifth node, where the first OCh protocol signaling is used for requesting increasing the transport bandwidth of the OCh link, and the fifth optical signal configuration information is used for indicating configuration of the optical signal. The receiving unit 1540*a* may receive second OCh protocol signaling from the fifth node, where the second OCh protocol signaling is used for indicating that increasing the transport bandwidth of the OCh link is agreed.

Optionally, as another embodiment, the receiving unit 1540*a* may further receive the first OCh protocol signaling and sixth optical signal configuration information from the fifth node, where the sixth optical signal configuration information is used for indicating the configuration of the optical signal. In a case in which it is determined that the fifth optical signal configuration information is consistent with the sixth optical signal configuration information, the sending unit 1530*a* may further send the second OCh protocol signaling to the fifth node.

Optionally, as another embodiment, the first OCh protocol signaling and the second OCh protocol signaling both include the following fields: an OCh control signaling indication, an identifier of the OTUCn link, a sequence identifier of an optical signal used for bearing the OTUCn link and an identifier of a corresponding optical subcarrier, and an optical signal adjustment response state indication. The OCh control signaling indication is used for indicating an adjustment manner for the transport bandwidth, and the response state indication is used for indicating whether adjusting the transport bandwidth is agreed.

Optionally, as another embodiment, before the adjusting unit 1520*a* adds the j OTLs into the OTUCn link, the sending unit 1530*a* may send first OTU protocol signaling to the fifth node, where the first OTU protocol signaling is used for requesting adding the j OTLs into the OTUCn link, and the first OTU protocol signaling carries information of the j OTLs. The receiving unit 1540*a* may receive second OTU protocol signaling from the fifth node, where the second OTU protocol signaling is used for indicating that adding the j OTLs into the OTUCn link is agreed. The receiving unit 1540*a* may further receive third OTU protocol signaling from the fifth node, where the third OTU protocol signaling is used for indicating adding the j OTLs into the OTUCn link.

Optionally, as another embodiment, the receiving unit 1540*a* may further receive the first OTU protocol signaling from the fifth node. The sending unit 1530*a* may further send the second OTU protocol signaling to the fifth node. The sending unit 1530*a* may further send the third OTU protocol signaling to the fifth node.

Optionally, as another embodiment, the first OTU protocol signaling, the second OTU protocol signaling, and the third OTU protocol signaling may all include the following fields: an OTL control signaling indication, the identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, in a case in which the determining unit 1510a determines that the line interface rate needs to be decreased, the adjusting unit 1520a may remove j OTLs from the OTUCn link, and decrease the transport bandwidth of the OCh link, where j is a positive integer.

Optionally, as another embodiment, before the adjusting unit 1520a removes the j OTLs from the OTUCn link, the sending unit 1530a may send fourth OTU protocol signaling to the fifth node, where the fourth OTU protocol signaling is used for requesting removing the j OTLs from an OTU link, and the fourth OTU protocol signaling carries information of the j OTLs. The receiving unit 1540a may receive fifth OTU protocol signaling from the fifth node, where the fifth OTU protocol signaling is used for indicating that removing the j OTLs from the OTU link is agreed. The receiving unit 1540a may further receive sixth OTU protocol signaling from the fifth node, where the sixth OTU protocol signaling is used for indicating removing the j OTLs from the OTU link.

Optionally, as another embodiment, the receiving unit 1540a may further receive the fourth OTU protocol signaling from the fifth node. The sending unit 1530a may further send the fifth OTU protocol signaling to the fifth node. The sending unit 1530a may further send the sixth OTU protocol signaling to the fifth node.

Optionally, as another embodiment, the fourth OTU protocol signaling, the fifth OTU protocol signaling, and the sixth OTU protocol signaling may all include the following fields: an OTL control signaling indication, an identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, the adjusting unit 1520a may decrease the number of optical signals in the OCh link; or the adjusting unit 1520a may adjust a modulation format of an optical signal in the OCh link, so as to decrease the transport bandwidth of the OCh link; or the adjusting unit 1520a may decrease a spectrum width occupied by an optical signal in the OCh link; or the adjusting unit 1520a may decrease the number of optical signals in the OCh link, decrease a spectrum width occupied by the optical signal, and adjust a modulation format of the optical signal.

Optionally, as another embodiment, before the adjusting unit 1520a decreases the transport bandwidth of the OCh link, the sending unit 1530a may send third OCh protocol signaling and seventh optical signal configuration information to the fifth node, where the third OCh protocol signaling is used for requesting decreasing the transport bandwidth of the OCh link, and the seventh optical signal configuration information is used for indicating configuration of the optical signal. The receiving unit 1540a may receive fourth OCh protocol signaling from the fifth node, where the fourth OCh protocol signaling is used for indicating that decreasing the transport bandwidth of the OCh link is agreed.

Optionally, as another embodiment, the receiving unit 1540a may further receive the third OCh protocol signaling and eighth optical signal configuration information from the fifth node, where the eighth optical signal configuration information is used for indicating the configuration of the optical signal. In a case in which it is determined that the seventh optical signal configuration information is consistent with the eighth optical signal configuration information, the sending unit 1530a may further send the fourth OCh protocol signaling to the fifth node.

Optionally, as another embodiment, the third OCh protocol signaling and the fourth OCh protocol signaling both include the following fields: an OCh control signaling indication, the identifier of the OTUCn link, a sequence identifier of an optical signal used for bearing the OTUCn link and an identifier of a corresponding optical subcarrier, and a response state indication, where the OCh control signaling indication is used for indicating an adjustment manner for the transport bandwidth, and the response state indication is used for indicating whether adjusting the transport bandwidth is agreed.

For other functions and operations of the node 1500a in FIG. 15a, reference may be made to the processes in which the second node or the fourth node is involved in FIG. 4a and FIG. 6a to FIG. 7c. To avoid repetition, details are not repeatedly described herein.

Figure 15B:
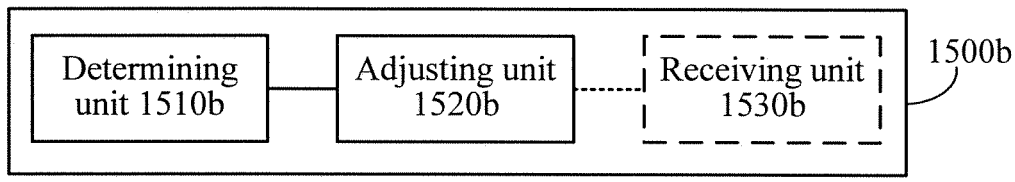
FIG. 15b is a schematic block diagram of a node according to another embodiment of the present invention.

FIG. 15b is a schematic block diagram of a node according to another embodiment of the present invention. The node 1500b in FIG. 15b is a non-3R node between a source node and a sink node. The node 1500b includes a determining unit 1510b and a selection unit 1520b.

The determining unit 1510b determines an adjustment requirement for a line interface rate. The selection unit 1520b performs routing selection on an OCh link according to the adjustment requirement for the line interface rate.

In the embodiment of the present invention, a non-3R node between a source node and a sink node performs routing selection on an OCh link according to an adjustment requirement for a line interface rate, which can dynamically adjust a line interface rate between the source node and the sink node.

Optionally, as an embodiment, the node 1500b may further include a receiving unit 1530b. The determining unit 1510b may receive a notification message from a network management system by using the receiving unit 1530b, where the notification message is used for indicating the adjustment requirement for the line interface rate.

Optionally, as another embodiment, the notification message is further used for indicating an adjustment scheme for the OCh link, where the adjustment scheme for the OCh link includes:

adjusting the number of optical signals in the OCh link; or adjusting a modulation format of an optical signal in the OCh link; or adjusting a spectrum width occupied by an optical signal in the OCh link; or adjusting the number of optical signals in the OCh link, a modulation format of the optical signal, and a spectrum width occupied by the optical signal.

For other functions and operations of the node 1500b in FIG. 15b, reference may be made to the process in which the sixth node is involved in the embodiment in FIG. 4c. To avoid repetition, details are not repeatedly described herein.

Figure 16:
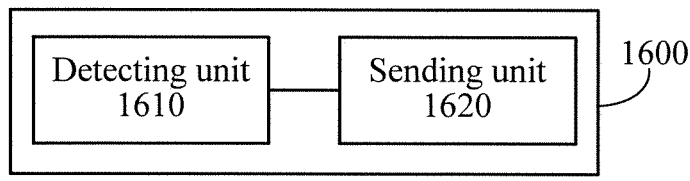
FIG. 16 is a schematic block diagram of a node according to another embodiment of the present invention.

FIG. 16 is a schematic block diagram of a node according to another embodiment of the present invention. The node 1600 in FIG. 16 includes a detecting unit 1610 and a sending unit 1620.

The detecting unit 1610 detects whether a fault occurs in m optical channel data lanes ODLs of an optical channel data unit ODUCn link. In a case in which the detecting unit 1610 determines that the fault occurs in the m ODLs, the sending unit 1620 sends, on the m ODLs, fault notification signaling to a source node, where the fault notification signaling is used for indicating that the fault occurs in the m ODLs, so that the source node performs fault processing on the m ODLs according to the fault notification signaling.

In the embodiment of the present invention, in a case in which it is detected that a fault occurs in m ODLs, fault notification signaling used for indicating that the fault occurs in the m ODLs is sent on the m ODLs to a source node, so that the source node can process the m ODLs in which the fault occurs, so that a service loss can be avoided, and the service transmission performance can be improved.

Optionally, as an embodiment, the detecting unit 1610 may detect whether forward fault alarm signaling exists in the m ODLs, where the forward fault alarm signaling is used for indicating that the fault occurs in the m ODLs.

Optionally, as another embodiment, the detecting unit 1610 may detect whether a signal loss alarm or a frame loss alarm exists in the m OTLs of the optical channel transport unit OTUCn link, where the m OTLs are in one-to-one correspondence with the m ODLs.

Optionally, as another embodiment, in a case in which the detecting unit 1610 determines that the fault in the m ODLs disappears, the sending unit 1620 may further send, on the m ODLs, fault disappearance signaling to the source node, where the fault disappearance signaling is used for indicating that the fault in the m ODLs disappears, so that the source node performs recovery processing on the m ODLs.

For other functions and operations of the node 1600 in FIG. 16, reference may be made to the processes in which the sink node is involved in the method embodiments in FIG. 8 to FIG. 10. To avoid repetition, details are not repeatedly described herein.

Figure 17:
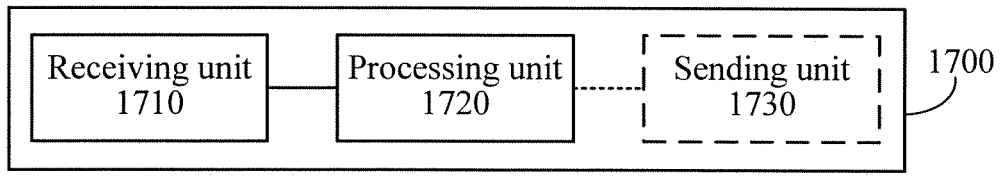
FIG. 17 is a schematic block diagram of a node according to another embodiment of the present invention.

FIG. 17 is a schematic block diagram of a node according to another embodiment of the present invention. The node 1700 in FIG. 17 is a source node. The node 1700 includes a receiving unit 1710 and a processing unit 1720.

The receiving unit 1710 receives, on m optical channel data lanes ODLs in an optical channel data unit ODUCn link, fault notification signaling sent by a sink node, where the fault notification signaling is used for indicating that a fault occurs in the m ODLs. The processing unit 1720 performs fault processing on the m ODLs according to the fault notification signaling.

In the embodiment of the present invention, fault notification signaling sent by a sink node is received on m ODLs in an ODUCn link, and the m ODLs are processed according to the fault notification signaling, so that a service loss can be avoided, and the service transmission performance can be improved.

Optionally, as an embodiment, according to the fault notification signaling, the processing unit 1720 may stop sending data on the m ODLs, and release the m ODLs.

Optionally, as another embodiment, the node 1700 may further include a sending unit 1730. The sending unit 1730 may send idle release signaling to a downstream direction, where the idle release signaling is used for indicating that the m ODLs are released.

Optionally, as another embodiment, the receiving unit 1710 may further receive fault disappearance signaling from the sink node, where the fault disappearance signaling is used for indicating that the fault in the m ODLs disappears. The processing unit 1720 may further perform recovery processing on the m ODLs according to the fault disappearance signaling.

For other functions and operations of the node 1700 in FIG. 17, reference may be made to the processes in which the source node is involved in the method embodiments in FIG. 8 to FIG. 10. To avoid repetition, details are not repeatedly described herein.

Figure 18:
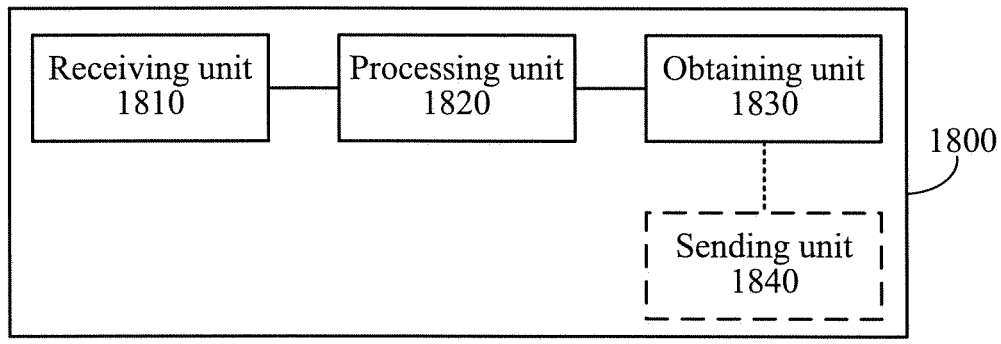
FIG. 18 is a schematic block diagram of a node according to another embodiment of the present invention.

FIG. 18 is a schematic block diagram of a node according to another embodiment of the present invention. The node 1800 in FIG. 18 may include a detecting unit 1810, a processing unit 1820, and an obtaining unit 1830.

The detecting unit 1810 detects whether a fault occurs in a first optical channel transport lane OTL in an OTUCn link, where the first OTL is used for bearing OAM overhead information. In a case in which the detecting unit 1810 determines that the fault occurs in the first OTL, the processing unit 1820 activates a second OTL in the OTUCn link, and deactivates the first OTL, where the second OTL is used for bearing a backup of the OAM overhead information. The obtaining unit 1830 obtains the OAM overhead information from the second OTL.

In the embodiment of the present invention, in a case in which it is detected that a fault occurs in a first OTL used for bearing OAM overhead information, a second OTL in an OTUCn link is activated, and the OAM overhead information is obtained from the second OTL, so that correctness of the OAM overhead information can be ensured, and therefore, robustness of an OTUCn signal can be improved.

Optionally, as an embodiment, the node 1800 may further include a sending unit 1840. The sending unit 1840 may send, on the first OTL, backward fault alarm information to an upstream direction, where the backward fault alarm information is used for indicating that the fault occurs in the first OTL and the second OTL is activated.

Optionally, as another embodiment, in a case in which the detecting unit 1810 determines that the fault in the first OTL disappears, the processing unit 1820 may further deactivate the second OTL, and activate the first OTL. The obtaining unit 1830 may further obtain the OAM overhead information from the first OTL.

Optionally, as another embodiment, the sending unit 1840 may further stop sending, on the first OTL, the backward fault alarm information to the upstream direction.

For other functions and operations of the node 1800 in FIG. 18, reference may be made to the processes in which the fault node is involved in the method embodiments in FIG. 12 to FIG. 13*b*. To avoid repetition, details are not repeatedly described herein.

Figure 19:
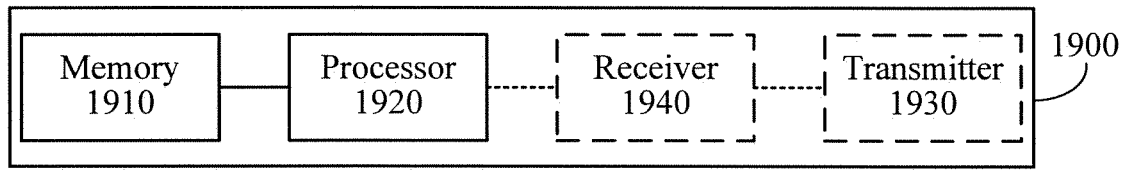
FIG. 19 is a schematic block diagram of a node according to an embodiment of the present invention.

FIG. 19 is a schematic block diagram of a node according to an embodiment of the present invention. The node 1900 in FIG. 19 includes a memory 1910 and a processor 1920.

The processor 1920 invokes executable code stored in the memory 1910, and is configured to determine an adjustment requirement for a line interface rate. The processor 1920 invokes the executable code stored in the memory 1910, and is further configured to: according to the adjustment requirement for the line interface rate, adjust a transport bandwidth of an OCh link, adjust the number of OTLs in an OTUCn link, and adjust the number of ODLs in an ODUCn link, where the OTL is in one-to-one correspondence with the ODL.

In the embodiment of the present invention, according to an adjustment requirement for a line interface rate, a transport bandwidth of an OCh link is adjusted, the number of OTLs in an OTUCn link is adjusted, and the number of ODLs in an ODUCn link is adjusted, so that the line interface rate can be dynamically adjusted.

Optionally, as an embodiment, the processor 1920 may adjust the number of optical signals in the OCh link; or the processor 1920 may adjust a modulation format of an optical signal in the OCh link; or the processor 1920 may adjust a spectrum width occupied by an optical signal in the OCh link; or the processor 1920 may adjust the number of optical signals in the OCh link, a modulation format of the optical signal, and a spectrum width occupied by the optical signal.

Optionally, as another embodiment, in a case in which the line interface rate needs to be increased, the processor 1920 may increase the transport bandwidth of the OCh link, add j OTLs into the OTUCn link, and add j ODLs into the ODUCn link, where j is a positive integer.

Optionally, as another embodiment, the processor 1920 may increase the number of optical signals in the OCh link; or the processor 1920 may adjust a modulation format of an optical signal in the OCh link, so as to increase the transport bandwidth of the OCh link; or the processor 1920 may increase a spectrum width occupied by an optical signal in the OCh link; or the processor 1920 may increase the number of optical signals in the OCh link, increase a spectrum width occupied by the optical signal, and adjust a modulation format of the optical signal.

Optionally, as another embodiment, the node 1900 may further include a transmitter 1930 and a receiver 1940. Before the processor 1920 increases the transport bandwidth of the OCh link, the transmitter 1930 may send first OCh protocol signaling and first optical signal configuration information to a second node, where the first OCh protocol signaling is used for requesting increasing the transport bandwidth of the OCh link, and the first optical signal configuration information is used for indicating configuration of the optical signal. The receiver 1940 may receive second OCh protocol signaling from the second node, where the second OCh protocol signaling is used for indicating that increasing the transport bandwidth of the OCh link is agreed.

Optionally, as another embodiment, the receiver 1940 may further receive the first OCh protocol signaling and third optical signal configuration information from the second node, where the third optical signal configuration information is used for indicating the configuration of the optical signal. In a case in which it is determined that the first optical signal configuration information is consistent with the third optical signal configuration information, the transmitter 1930 may further send the second OCh protocol signaling to the second node.

Optionally, as another embodiment, the first OCh protocol signaling and the second OCh protocol signaling both include the following fields: an OCh control signaling indication, an identifier of the OTUCn link, a sequence identifier of an optical signal used for bearing the OTUCn link and an identifier of a corresponding optical subcarrier, and an optical signal adjustment response state indication. The OCh control signaling indication is used for indicating an adjustment manner for the transport bandwidth, and the response state indication is used for indicating whether adjusting the transport bandwidth is agreed.

Optionally, as another embodiment, before the processor 1920 adds the j OTLs into the OTUCn link, the transmitter 1930 may send first OTU protocol signaling to the second node, where the first OTU protocol signaling is used for requesting adding the j OTLs into the OTUCn link, and the first OTU protocol signaling carries information of the j OTLs. The receiver 1940 may receive second OTU protocol signaling from the second node, where the second OTU protocol signaling is used for indicating that adding the j OTLs into the OTUCn link is agreed. The receiver 1940 may further receive third OTU protocol signaling from the second node, where the third OTU protocol signaling is used for indicating adding the j OTLs into the OTUCn link.

Optionally, as another embodiment, the receiver 1940 may further receive the first OTU protocol signaling from the second node. The transmitter 1930 may further send the second OTU protocol signaling to the second node. The transmitter 1930 may further send the third OTU protocol signaling to the second node.

Optionally, as another embodiment, the first OTU protocol signaling, the second OTU protocol signaling, and the third OTU protocol signaling may all include the following fields: an OTL control signaling indication, the identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, before the processor 1920 adds the j ODLs into the ODUCn link, the transmitter 1930 may send first ODU protocol signaling to a third node, where the first ODU protocol signaling is used for requesting adding the j ODLs into an ODU link, and the first ODU protocol signaling carries information of the j ODLs. The receiver 1940 may receive second ODU protocol signaling from the third node, where the second ODU protocol signaling is used for indicating that adding the j ODLs into the ODU link is agreed. The receiver 1940 may further receive third ODU protocol signaling from the third node, where the third ODU protocol signaling is used for indicating adding the j ODLs into the ODU link.

Optionally, as another embodiment, the first ODU protocol signaling, the second ODU protocol signaling, and the third ODU protocol signaling may all include the following fields: an ODL control signaling indication, an identifier of the ODUCn link, sequence identifiers of the j ODLs in the ODUCn link, and an ODL adjustment response state indication, where the ODL control signaling indication is used for indicating a manner of adjusting the number of ODLs, and the ODL adjustment response state indication is used for indicating whether adjusting the number of ODLs is agreed.

Optionally, as another embodiment, after adding the j ODLs into the ODUCn link, the processor 1920 may further increase, according to the Hitless Adjustment of ODUflex HAO protocol, a bandwidth occupied by a lower-order ODU service on the ODUCn link.

Optionally, as another embodiment, in a case in which it is determined that the line interface rate needs to be decreased, the processor 1920 may remove j ODLs from the ODUCn link, remove j OTLs from the OTUCn link, and decrease the transport bandwidth of the OCh link, where j is a positive integer.

Optionally, as another embodiment, before the processor 1920 removes the j ODLs from the ODUCn link, the transmitter 1930 may send fourth ODU protocol signaling to the third node, where the fourth ODU protocol signaling is used for requesting removing the j ODLs from the ODU link, and the fourth ODU protocol signaling carries information of the j ODLs. The receiver 1940 may receive fifth ODU protocol signaling from the third node, where the fifth ODU protocol signaling is used for indicating that removing the j ODLs from the ODU link is agreed. The receiver 1940 may further receive sixth ODU protocol signaling from the third node, where the sixth ODU protocol signaling is used for indicating removing the j ODLs from the ODU link.

Optionally, as another embodiment, the fourth ODU protocol signaling, the fifth ODU protocol signaling, and the sixth ODU protocol signaling may all include the following fields: an ODL control signaling indication, an identifier of the ODUCn link, sequence identifiers of the j ODLs in the ODUCn link, and an ODL adjustment response state indication. The ODL control signaling indication is used for indicating a manner of adjusting the number of ODLs, and the ODL adjustment response state indication is used for indicating whether adjusting the number of ODLs is agreed.

Optionally, as another embodiment, before the processor 1920 removes the j OTLs from the OTUCn link, the transmitter 1930 may send fourth OTU protocol signaling to the second node, where the fourth OTU protocol signaling is used for requesting removing the j OTLs from an OTU link, and the fourth OTU protocol signaling carries information of the j OTLs. The receiver 1940 may receive fifth OTU protocol signaling from the second node, where the fifth OTU protocol signaling is used for indicating that removing the j OTLs from the OTU link is agreed. The receiver 1940 may further receive sixth OTU protocol signaling from the second node, where the sixth OTU protocol signaling is used for indicating removing the j OTLs from the OTU link.

Optionally, as another embodiment, the receiver 1940 may further receive the fourth OTU protocol signaling from the second node. The transmitter 1930 may further send the fifth OTU protocol signaling to the second node. The transmitter 1930 may further send the sixth OTU protocol signaling to the second node.

Optionally, as another embodiment, the fourth OTU protocol signaling, the fifth OTU protocol signaling, and the sixth OTU protocol signaling may all include the following fields: an OTL control signaling indication, an identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, the processor 1920 may decrease the number of optical signals in the OCh link; or the processor 1920 may adjust a modulation format of an optical signal in the OCh link, so as to decrease the transport bandwidth of the OCh link; or the processor 1920 may decrease a spectrum width occupied by an optical signal in the OCh link; or the processor 1920 may decrease the number of optical signals in the OCh link, decrease a spectrum width occupied by the optical signal, and adjust a modulation format of the optical signal.

Optionally, as another embodiment, before the processor 1920 decreases the transport bandwidth of the OCh link, the transmitter 1930 may send third OCh protocol signaling and second optical signal configuration information to the second node, where the third OCh protocol signaling is used for requesting decreasing the transport bandwidth of the OCh link, and the second optical signal configuration information is used for indicating configuration of the optical signal. The receiver 1940 may receive fourth OCh protocol signaling from the second node, where the fourth OCh protocol signaling is used for indicating that decreasing the transport bandwidth of the OCh link is agreed.

Optionally, as another embodiment, the receiver 1940 may further receive the third OCh protocol signaling and fourth optical signal configuration information from the second node, where the fourth optical signal configuration information is used for indicating the configuration of the optical signal. In a case in which it is determined that the second optical signal configuration information is consistent with the fourth optical signal configuration information, the transmitter 1930 may further send the fourth OCh protocol signaling to the second node.

Optionally, as another embodiment, the third OCh protocol signaling and the fourth OCh protocol signaling both include the following fields: an OCh control signaling indication, the identifier of the OTUCn link, a sequence identifier of an optical signal used for bearing the OTUCn link and an identifier of a corresponding optical subcarrier, and a response state indication, where the OCh control signaling indication is used for indicating an adjustment manner for the transport bandwidth, and the response state indication is used for indicating whether adjusting the transport bandwidth is agreed.

Optionally, as another embodiment, before removing the j ODLs from the ODUCn link, the processor 1920 may further decrease, according to the HAO protocol, a bandwidth occupied by a lower-order ODU service on the ODUCn link.

For other functions and operations of the node 1900 in FIG. 19, reference may be made to the processes in which the first node is involved in FIG. 4*a* to FIG. 7*c*. To avoid repetition, details are not repeatedly described herein.

Figure 20A:
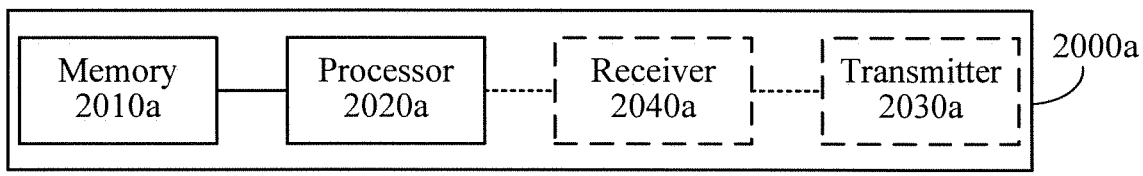
FIG. 20a is a schematic block diagram of a node according to another embodiment of the present invention.

FIG. 20*a* is a schematic block diagram of a node according to another embodiment of the present invention. The node 2000*a* in FIG. 20*a* is a 3R node between a source node and a sink node. The node 2000*a* includes a memory 2010*a* and a processor 2020*a*.

The processor 2020*a* invokes executable code stored in the memory 2010*a*, and is configured to determine an adjustment requirement for a line interface rate. The processor 2020*a* invokes the executable code stored in the memory 2010*a*, and is further configured to: according to the adjustment requirement for the line interface rate, adjust a transport bandwidth of an OCh link, and adjust the number of OTLs in an OTUCn link.

In the embodiment of the present invention, according to an adjustment requirement for a line interface rate, a 3R node between a source node and a sink node adjusts a transport bandwidth of an OCh link, and adjusts the number of OTLs in an OTUCn link, which can dynamically adjust a line interface rate between the source node and the sink node.

Optionally, as an embodiment, the processor 2020*a* may adjust the number of optical signals in the OCh link; or the processor 2020*a* may adjust a modulation format of an optical signal in the OCh link; or the processor 2020*a* may adjust a spectrum width occupied by an optical signal in the OCh link; or the processor 2020*a* may adjust the number of optical signals in the OCh link, a modulation format of the optical signal, and a spectrum width occupied by the optical signal.

Optionally, as another embodiment, in a case in which the line interface rate needs to be increased, the processor 2020*a* may increase the transport bandwidth of the OCh link, and add j OTLs into the OTUCn link, where j is a positive integer.

Optionally, as another embodiment, the processor 2020*a* may increase the number of optical signals in the OCh link; or the processor 2020*a* may adjust a modulation format of an optical signal in the OCh link, so as to increase the transport bandwidth of the OCh link; or the processor 2020*a* may increase a spectrum width occupied by an optical signal in the OCh link; or the processor 2020*a* may increase the number of optical signals in the OCh link, increase a spectrum width occupied by the optical signal, and adjust a modulation format of the optical signal.

Optionally, as another embodiment, the node 2000*a* may further include a transmitter 2030*a* and a receiver 2040*a*. Before the processor 2020*a* increases the transport bandwidth of the OCh link, the transmitter 2030*a* may send first OCh protocol signaling and fifth optical signal configuration information to a fifth node, where the first OCh protocol signaling is used for requesting increasing the transport bandwidth of the OCh link, and the fifth optical signal configuration information is used for indicating configuration of the optical signal. The receiver 2040a may receive second OCh protocol signaling from the fifth node, where the second OCh protocol signaling is used for indicating that increasing the transport bandwidth of the OCh link is agreed.

Optionally, as another embodiment, the receiver 2040a may further receive the first OCh protocol signaling and sixth optical signal configuration information from the fifth node, where the sixth optical signal configuration information is used for indicating the configuration of the optical signal. In a case in which it is determined that the fifth optical signal configuration information is consistent with the sixth optical signal configuration information, the transmitter 2030a may further send the second OCh protocol signaling to the fifth node.

Optionally, as another embodiment, the first OCh protocol signaling and the second OCh protocol signaling both include the following fields: an OCh control signaling indication, an identifier of the OTUCn link, a sequence identifier of an optical signal used for bearing the OTUCn link and an identifier of a corresponding optical subcarrier, and an optical signal adjustment response state indication. The OCh control signaling indication is used for indicating an adjustment manner for the transport bandwidth, and the response state indication is used for indicating whether adjusting the transport bandwidth is agreed.

Optionally, as another embodiment, before the processor 2020a adds the j OTLs into the OTUCn link, the transmitter 2030a may send first OTU protocol signaling to the fifth node, where the first OTU protocol signaling is used for requesting adding the j OTLs into the OTUCn link, and the first OTU protocol signaling carries information of the j OTLs. The receiver 2040a may receive second OTU protocol signaling from the fifth node, where the second OTU protocol signaling is used for indicating that adding the j OTLs into the OTUCn link is agreed. The receiver 2040a may further receive third OTU protocol signaling from the fifth node, where the third OTU protocol signaling is used for indicating adding the j OTLs into the OTUCn link.

Optionally, as another embodiment, the receiver 2040a may further receive the first OTU protocol signaling from the fifth node. The transmitter 2030a may further send the second OTU protocol signaling to the fifth node. The transmitter 2030a may further send the third OTU protocol signaling to the fifth node.

Optionally, as another embodiment, the first OTU protocol signaling, the second OTU protocol signaling, and the third OTU protocol signaling may all include the following fields: an OTL control signaling indication, the identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, in a case in which the line interface rate needs to be decreased, the processor 2020a may remove j OTLs from the OTUCn link, and decrease the transport bandwidth of the OCh link, where j is a positive integer.

Optionally, as another embodiment, before the processor 2020a removes the j OTLs from the OTUCn link, the transmitter 2030a may send fourth OTU protocol signaling to the fifth node, where the fourth OTU protocol signaling is used for requesting removing the j OTLs from an OTU link, and the fourth OTU protocol signaling carries information of the j OTLs. The receiver 2040a may receive fifth OTU protocol signaling from the fifth node, where the fifth OTU protocol signaling is used for indicating that removing the j OTLs from the OTU link is agreed. The receiver 2040a may further receive sixth OTU protocol signaling from the fifth node, where the sixth OTU protocol signaling is used for indicating removing the j OTLs from the OTU link.

Optionally, as another embodiment, the receiver 2040a may further receive the fourth OTU protocol signaling from the fifth node. The transmitter 2030a may further send the fifth OTU protocol signaling to the fifth node. The transmitter 2030a may further send the sixth OTU protocol signaling to the fifth node.

Optionally, as another embodiment, the fourth OTU protocol signaling, the fifth OTU protocol signaling, and the sixth OTU protocol signaling may all include the following fields: an OTL control signaling indication, an identifier of the OTUCn link, sequence identifiers of the j OTLs in the OTUCn link, and an OTL adjustment response state indication. The OTL control signaling indication is used for indicating a manner of adjusting the number of OTLs, and the OTL adjustment response state indication is used for indicating whether adjusting the number of OTLs is agreed.

Optionally, as another embodiment, the processor 2020a may decrease the number of optical signals in the OCh link; or the processor 2020a may adjust a modulation format of an optical signal in the OCh link, so as to decrease the transport bandwidth of the OCh link; or the processor 2020a may decrease a spectrum width occupied by an optical signal in the OCh link; or the processor 2020a may decrease the number of optical signals in the OCh link, decrease a spectrum width occupied by the optical signal, and adjust a modulation format of the optical signal.

Optionally, as another embodiment, before the processor 2020a decreases the transport bandwidth of the OCh link, the transmitter 2030a may send third OCh protocol signaling and seventh optical signal configuration information to the fifth node, where the third OCh protocol signaling is used for requesting decreasing the transport bandwidth of the OCh link, and the seventh optical signal configuration information is used for indicating configuration of the optical signal. The receiver 2040a may receive fourth OCh protocol signaling from the fifth node, where the fourth OCh protocol signaling is used for indicating that decreasing the transport bandwidth of the OCh link is agreed.

Optionally, as another embodiment, the receiver 2040a may further receive the third OCh protocol signaling and eighth optical signal configuration information from the fifth node, where the eighth optical signal configuration information is used for indicating the configuration of the optical signal. In a case in which it is determined that the seventh optical signal configuration information is consistent with the eighth optical signal configuration information, the transmitter 2030a may further send the fourth OCh protocol signaling to the fifth node.

Optionally, as another embodiment, the third OCh protocol signaling and the fourth OCh protocol signaling both include the following fields: an OCh control signaling indication, the identifier of the OTUCn link, a sequence identifier of an optical signal used for bearing the OTUCn link and an identifier of a corresponding optical subcarrier, and a response state indication, where the OCh control signaling indication is used for indicating an adjustment manner for the transport bandwidth, and the response state indication is used for indicating whether adjusting the transport bandwidth is agreed.

For other functions and operations of the node 2000a in FIG. 20a, reference may be made to the processes in which the second node or the fourth node is involved in FIG. 4a to FIG. 7c. To avoid repetition, details are not repeatedly described herein.

Figure 20B:
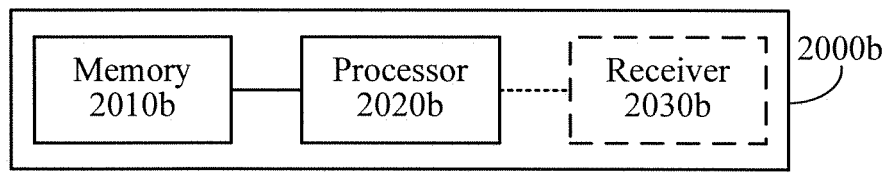
FIG. 20b is a schematic block diagram of a node according to another embodiment of the present invention.

FIG. 20b is a schematic block diagram of a node according to another embodiment of the present invention. The node 2000b in FIG. 20b is a non-3R node between a source node and a sink node. The node 2000b includes a memory 2010b and a processor 2020b.

The processor 2020b invokes executable code stored in the memory 2010b, and is configured to determine an adjustment requirement for a line interface rate. The processor 2020b invokes the executable code stored in the memory 2010b, and is further configured to perform routing selection on an OCh link according to the adjustment requirement for the line interface rate.

In the embodiment of the present invention, a non-3R node between a source node and a sink node performs routing selection on an OCh link according to an adjustment requirement for a line interface rate, which can dynamically adjust a line interface rate between the source node and the sink node.

Optionally, as an embodiment, the node 2000b may further include a receiver 2030b. The processor 2020b may receive a notification message from a network management system by using the receiver 2030b, where the notification message is used for indicating the adjustment requirement for the line interface rate.

Optionally, as another embodiment, the notification message is further used for indicating an adjustment scheme for the OCh link, where the adjustment scheme for the OCh link includes:

adjusting the number of optical signals in the OCh link; or adjusting a modulation format of an optical signal in the OCh link; or adjusting a spectrum width occupied by an optical signal in the OCh link; or adjusting the number of optical signals in the OCh link, a modulation format of the optical signal, and a spectrum width occupied by the optical signal.

For other functions and operations of the node 2000b in FIG. 20b, reference may be made to the process in which the sixth node is involved in the embodiment in FIG. 4c. To avoid repetition, details are not repeatedly described herein.

Figure 21:
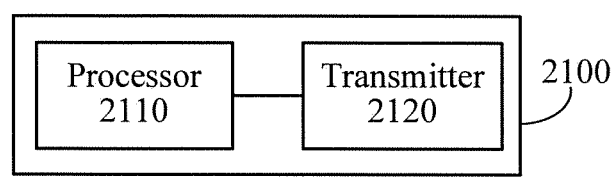
FIG. 21 is a schematic block diagram of a node according to another embodiment of the present invention.

FIG. 21 is a schematic block diagram of a node according to another embodiment of the present invention. The node 2100 in FIG. 21 includes a processor 2110 and a transmitter 2120.

The processor 2110 detects whether a fault occurs in m ODLs of an ODUCn link. In a case in which the processor 2110 determines that the fault occurs in the m ODLs, the transmitter 2120 sends, on the m ODLs, fault notification signaling to a source node, where the fault notification signaling is used for indicating that the fault occurs in the m ODLs, so that the source node performs fault processing on the m ODLs according to the fault notification signaling.

In the embodiment of the present invention, in a case in which it is detected that a fault occurs in m ODLs, fault notification signaling used for indicating that the fault occurs in the m ODLs is sent on the m ODLs to a source node, so that the source node can process the m ODLs in which the fault occurs, so that a service loss can be avoided, and the service transmission performance can be improved.

Optionally, as an embodiment, the processor 2110 may detect whether forward fault alarm signaling exists in the m ODLs, where the forward fault alarm signaling is used for indicating that the fault occurs in the m ODLs.

Optionally, as another embodiment, the processor 2110 may detect whether a signal loss alarm or a frame loss alarm exists on m OTLs in an OTUCn link, where the m OTLs are in one-to-one correspondence with the m ODLs.

Optionally, as another embodiment, in a case in which the processor 2110 determines that the fault in the m ODLs disappears, the transmitter 2120 may further send, on the m ODLs, fault disappearance signaling to the source node, where the fault disappearance signaling is used for indicating that the fault in the m ODLs disappears, so that the source node performs recovery processing on the m ODLs.

For other functions and operations of the node 2100 in FIG. 21, reference may be made to the processes in which the sink node is involved in the method embodiments in FIG. 8 to FIG. 10. To avoid repetition, details are not repeatedly described herein.

Figure 22:
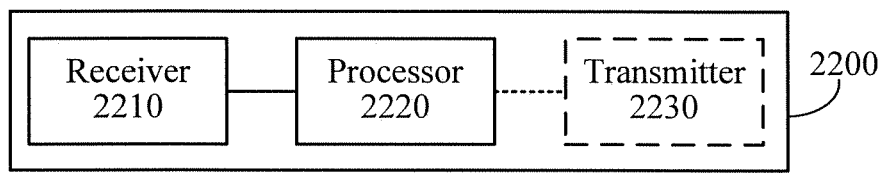
FIG. 22 is a schematic block diagram of a node according to another embodiment of the present invention.

FIG. 22 is a schematic block diagram of a node according to another embodiment of the present invention. The node 2200 in FIG. 22 is a source node. The node 2200 includes a receiver 2210 and a processor 2220.

The receiver 2210 receives, on m ODLs in an ODUCn link, fault notification signaling sent by a sink node, where the fault notification signaling is used for indicating that a fault occurs in the m ODLs. The processor 2220 performs fault processing on the m ODLs according to the fault notification signaling.

In the embodiment of the present invention, fault notification signaling sent by a sink node is received on m ODLs in an ODUCn link, and the m ODLs are processed according to the fault notification signaling, so that a service loss can be avoided, and the service transmission performance can be improved.

Optionally, as an embodiment, according to the fault notification signaling, the processor 2220 may stop sending data on the m ODLs, and release the m ODLs.

Optionally, as another embodiment, the node 2200 may further include a transmitter 2230. The transmitter 2230 may send idle release signaling to a downstream direction, where the idle release signaling is used for indicating that the m ODLs are released.

Optionally, as another embodiment, the receiver 2210 may further receive fault disappearance signaling from the sink node, where the fault disappearance signaling is used for indicating that the fault in the m ODLs disappears. The processor 2220 may further perform recovery processing on the m ODLs according to the fault disappearance signaling.

For other functions and operations of the node 2200 in FIG. 22, reference may be made to the processes in which the source node is involved in the method embodiments in FIG. 8 to FIG. 10. To avoid repetition, details are not repeatedly described herein.

Figure 23:
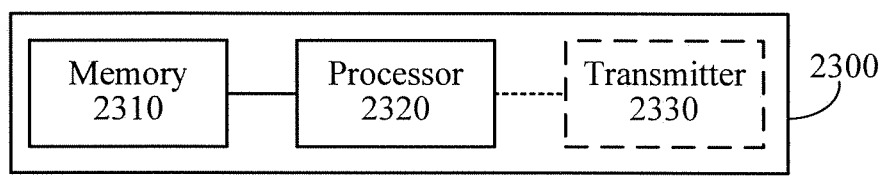
FIG. 23 is a schematic block diagram of a node according to another embodiment of the present invention.

FIG. 23 is a schematic block diagram of a node according to another embodiment of the present invention. The node 2300 in FIG. 23 may include a memory 2310 and a processor 2320.

The processor 2320 invokes executable code stored in the memory 2310, and is configured to detect whether a fault occurs in a first optical channel transport lane OTL in an OTUCn link, where the first OTL is used for bearing OAM overhead information. The processor 2320 invokes executable code stored in the memory 2310, and is further configured to: in a case in which it is determined that the fault occurs in the first OTL, activate a second OTL in the OTUCn link, and deactivate the first OTL, where the second OTL is used for bearing a backup of the OAM overhead information. The processor 2320 invokes the executable code stored in the memory 2310, and is further configured to obtain the OAM overhead information from the second OTL.

In the embodiment of the present invention, in a case in which it is detected that a fault occurs in a first OTL used for bearing OAM overhead information, a second OTL in an OTUCn link is activated, and the OAM overhead information is obtained from the second OTL, so that correctness of the OAM overhead information can be ensured, and therefore, robustness of an OTUCn signal can be improved.

Optionally, as an embodiment, the node 2300 may further include a transmitter 2330. The transmitter 2330 may send, on the first OTL, backward fault alarm information to an upstream direction, where the backward fault alarm information is used for indicating that the fault occurs in the first OTL and the second OTL is activated.

Optionally, as another embodiment, in a case in which it is determined that the fault in the first OTL disappears, the processor 2320 may further deactivate the second OTL, and activate the first OTL. The processor 2320 may further obtain the OAM overhead information from the first OTL.

Optionally, as another embodiment, the transmitter 2330 may further stop sending, on the first OTL, the backward fault alarm information to the upstream direction.

For other functions and operations of the node 2300 in FIG. 23, reference may be made to the processes in which the fault node is involved in the method embodiments in FIG. 12 to FIG. 13b. To avoid repetition, details are not repeatedly described herein.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not repeatedly described herein.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
    receiving, by an optical transport network (OTN) node, an adjustment requirement for a line interface rate for an OTN service, the adjustment requirement comprising an increase or decrease of the line interface rate;
    adjusting, by the OTN node, the line interface rate according to the adjustment requirement for the line interface rate by adjusting a transport bandwidth of an optical channel (OCh) link, adjusting the number of optical channel transport lanes (OTLs) in an optical channel transport unit (OTUCn) link, and adjusting the number of optical channel data lanes (ODLs) in an optical channel data unit (ODUCn) link, wherein the OTLs are in one-to-one correspondence with the ODLs; and
    transmitting, by the OTN node, the OTN service using the adjusted line interface rate.

2. The method according to claim 1, wherein adjusting a transport bandwidth of an OCh link comprises:
    adjusting, by the OTN node, the number of optical signals in the OCh link; or
    adjusting, by the OTN node, a modulation formnat of an optical signal in the OCh link; or
    adjusting, by the OTN node, a spectrum width occupied by an optical signal in the OCh link; or
    adjusting, by the OTN node, the number of optical signals in the OCh link, a modulation format of the optical signal, and a spectrum width occupied by the optical signal.

3. A method comprising:
    receiving, by an optical transport network (OTN) node, an adjustment requirement for a line interface rate for an OTN service, the adjustment requirement comprising an increase or decrease of the line interface rate, wherein the OTN node is a 3R node between a source node and a sink node;

adjusting, by the OTN node, the line interface rate according to the adjustment requirement for the line interface rate by adjusting a transport bandwidth of an optical channel (OCh) link and adjusting the number of optical channel transport lanes (OTLs) in an optical channel transport unit (OTUCn) link; and transmitting, by the OTN node, the OTN service using the adjusted line interface rate.

4. The method according to claim 3, wherein adjusting a transport bandwidth of an OCh link comprises:

adjusting, by the OTN node, the number of optical signals in the OCh link; or adjusting, by the OTN node, a modulation format of an optical signal in the OCh link; or adjusting, by the OTN node, a spectrum width occupied by an optical signal in the OCh link; or adjusting, by the OTN node, the number of optical signals in the OCh link, a modulation format of the optical signal, and a spectrum width occupied by the optical signal.

5. A node, comprising:

at least one processor configured to:

receive an adjustment requirement for a line interface rate for an optical transport network (OTN) service, the adjustment requirement comprising an increase or decrease of the line interface rate; and according to the adjustment requirement for the line interface rate, adjust a transport bandwidth of an optical channel (OCh) link, adjust the number of optical channel transport lanes (OTLs) in an optical channel transport unit (OTUCn) link, and adjust the number of optical channel data lanes (ODLs) in an optical channel data unit (ODUCn) link, wherein the OTLs are in one-to-one correspondence with the ODLs; and a transmitter configured to transmit the OTN service using the adjusted line interface rate.

6. The node according to claim 5, wherein the at least one processor is further configured to:

adjust the number of optical signals in the OCh link; or adjust a modulation format of an optical signal in the OCh link; or adjust a spectrum width occupied by an optical signal in the OCh link; or adjust the number of optical signals in the OCh link, a modulation format of the optical signal, and a spectrum width occupied by the optical signal.

7. A node comprising:

at least one processor configured to:

receive an adjustment requirement for a line interface rate for an optical transport network (OTN) service, the adjustment requirement comprising an increase or decrease of the line interface rate; and according to the adjustment requirement for the line interface rate, adjust a transport bandwidth of an optical channel (OCh) link, and adjust the number of optical channel transport lanes (OTLs) in an optical channel transport unit (OTUCn) link; and a transmitter configured to transmit the OTN service using the adjusted line interface rate, wherein the node is a 3R node between a source node and a sink node.

8. The node according to claim 7, wherein the at least one processor is further configured to:

adjust the number of optical signals in the OCh link; or adjust a modulation format of an optical signal in the OCh link; or adjust a spectrum width occupied by an optical signal in the OCh link; or adjust the number of optical signals in the OCh link, a modulation format of the optical signal, and a spectrum width occupied by the optical signal.

* * * * *